United States Patent
Ben-David et al.

(10) Patent No.: US 10,556,415 B2
(45) Date of Patent: Feb. 11, 2020

(54) METHOD AND APPARATUS FOR BUILDING A 3D OBJECT FROM LAYERS OF PRE-STRIPPED SUBSTRATE

(71) Applicant: HIGHCON SYSTEMS LTD., Yavne (IL)

(72) Inventors: David Ben-David, Rehovot (IL); Eli Ireni, Raanana (IL); Michael Zimmer, Beit Elazari (IL); Michael Karp, Petah Tikva (IL); Claudio Rottman, Modiin (IL)

(73) Assignee: HIGHCON SYSTEMS LTD, Yavne (IL)

( * ) Notice: Subject to any disclaimer, the term of this patent is extended or adjusted under 35 U.S.C. 154(b) by 0 days.

(21) Appl. No.: 15/751,059

(22) PCT Filed: Aug. 26, 2015

(86) PCT No.: PCT/IB2015/056481
§ 371 (c)(1),
(2) Date: Feb. 7, 2018

(87) PCT Pub. No.: WO2017/033046
PCT Pub. Date: Mar. 2, 2017

(65) Prior Publication Data
US 2018/0297348 A1    Oct. 18, 2018

(51) Int. Cl.
*B32B 37/18* (2006.01)
*B26F 3/00* (2006.01)
(Continued)

(52) U.S. Cl.
CPC ............ *B32B 37/18* (2013.01); *B29C 64/147* (2017.08); *B29C 64/245* (2017.08);
(Continued)

(58) Field of Classification Search
USPC ....... 156/249, 250, 256, 263, 265, 267, 269, 156/308.2, 309.6
See application file for complete search history.

(56) References Cited

U.S. PATENT DOCUMENTS 3,019,824 A    2/1962   Bakke
4,078,956 A    3/1978   Scheck
(Continued)

FOREIGN PATENT DOCUMENTS

CA    792063 A    8/1968
CN    103855324 A    6/2014
(Continued)

OTHER PUBLICATIONS

Machine Translation (by EPO and Google) for DE102005030765 published on Nov. 9, 2006.
(Continued)

*Primary Examiner* — Sing P Chan
(74) *Attorney, Agent, or Firm* — Marc Van Dyke

(57) ABSTRACT

Embodiments of the present invention relate to a system and method for manufacturing a three-dimensional object from a stack of pre-stripped layers of substrate. Each object layer is formed by (i) providing substrate comprising waste portion(s) and substrate-retained portion(s) that are attached to each other and separated from one another by cut(s) within the substrate; (ii) subsequently, subjecting the subject of each layer to a stripping process which selectively strips away substrate-waste portion(s) from the substrate-retained portion(s). After stripping, the object layer is added to a stack of previously-stacked object layers to grow the stack. This process is repeated to further grow the stack. Object layers of the stack are bonded to each other to build the three-dimensional object therefrom. Apparatus and methods for stripping are also described—any teaching or combination of teaching(s) related to stripping substrate may be
(Continued)

employed in any additive-manufacturing process described herein.

20 Claims, 60 Drawing Sheets

(51) Int. Cl.
| | |
|---|---|
| B26D 7/18 | (2006.01) |
| B26D 3/08 | (2006.01) |
| B29C 64/393 | (2017.01) |
| B29C 64/245 | (2017.01) |
| B29C 64/147 | (2017.01) |
| B29C 64/141 | (2017.01) |
| B33Y 40/00 | (2015.01) |
| B33Y 10/00 | (2015.01) |
| B32B 38/10 | (2006.01) |
| B32B 41/00 | (2006.01) |
| B32B 38/04 | (2006.01) |
| B32B 37/12 | (2006.01) |
| B32B 38/00 | (2006.01) |

(52) U.S. Cl.
CPC ........ *B29C 64/393* (2017.08); *B32B 38/0004* (2013.01); *B32B 41/00* (2013.01); *B32B 2041/04* (2013.01)

(56) References Cited

U.S. PATENT DOCUMENTS

| | | | |
|---|---|---|---|
| 5,101,747 A | 4/1992 | Gerber | |
| 5,108,358 A | 4/1992 | Mounce | |
| 5,730,817 A * | 3/1998 | Feygin | B32B 37/1045 156/64 |
| 6,193,923 B1 * | 2/2001 | Leyden | B29C 41/12 264/401 |
| 6,575,218 B1 * | 6/2003 | Burns | B22F 3/005 156/512 |
| 7,111,534 B1 | 9/2006 | Simpson | |
| 8,061,247 B2 | 11/2011 | Coursey | |
| 2005/0077673 A1 | 4/2005 | Pache | |
| 2007/0267801 A1 | 11/2007 | Wakabayashi | |
| 2010/0037741 A1 | 2/2010 | Luquette | |
| 2014/0041493 A1 | 2/2014 | Dulaney | |

FOREIGN PATENT DOCUMENTS

| | | |
|---|---|---|
| DE | 102005030765 B3 | 11/2006 |
| EP | 0132938 A1 | 2/1985 |
| GB | 1133946 A | 11/1968 |
| GB | 1501034 A | 2/1978 |
| GB | 2139992 A | 11/1984 |

OTHER PUBLICATIONS

Translation of Abstract of CN103855324 [CN application published Jun. 11, 2014].

Google machine translation of CN103855324B [CN application published on Jun. 11, 2014].

Co-pending 15504659 [published in entirely Aug. 28, 2019].

* cited by examiner

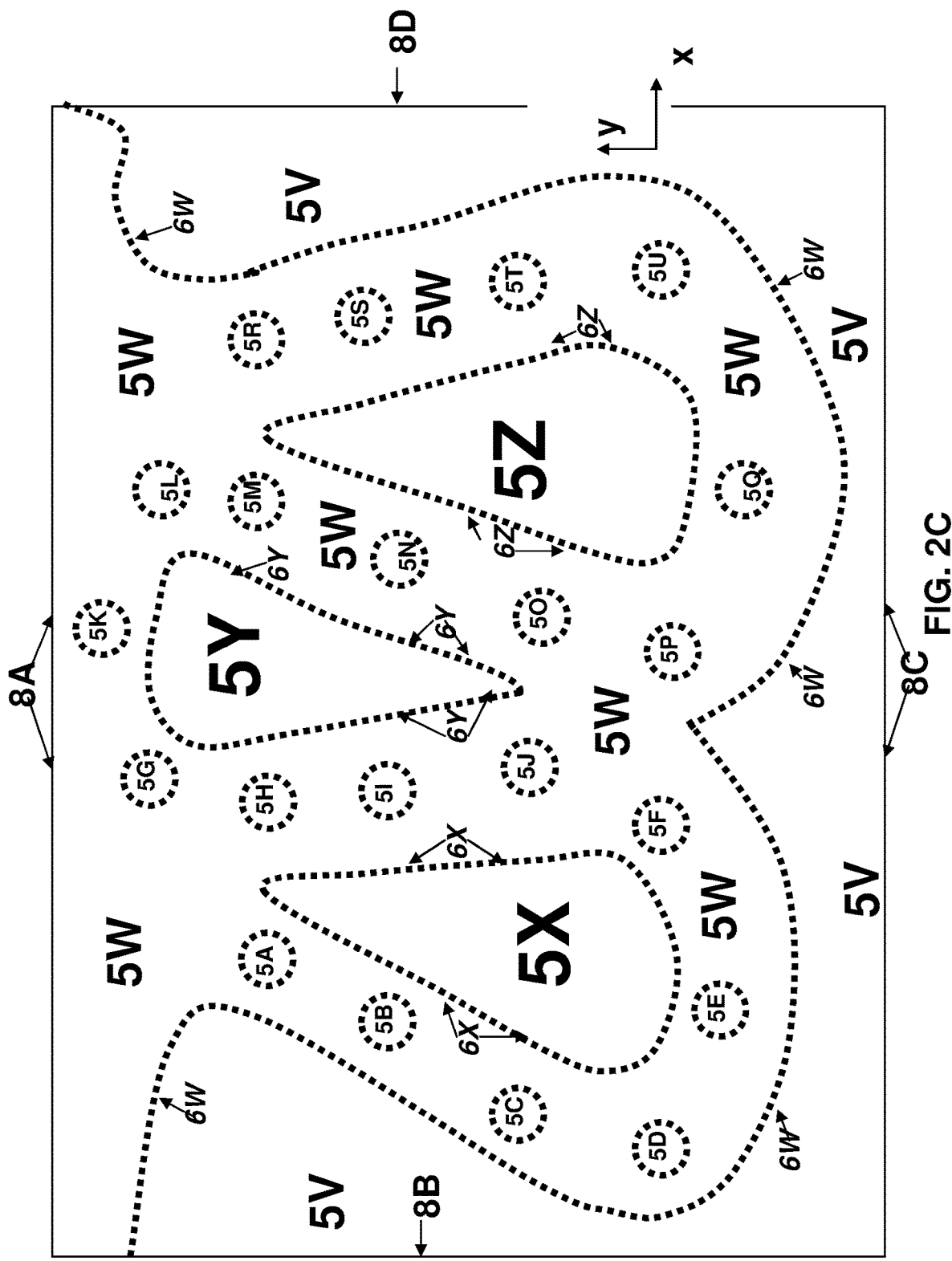

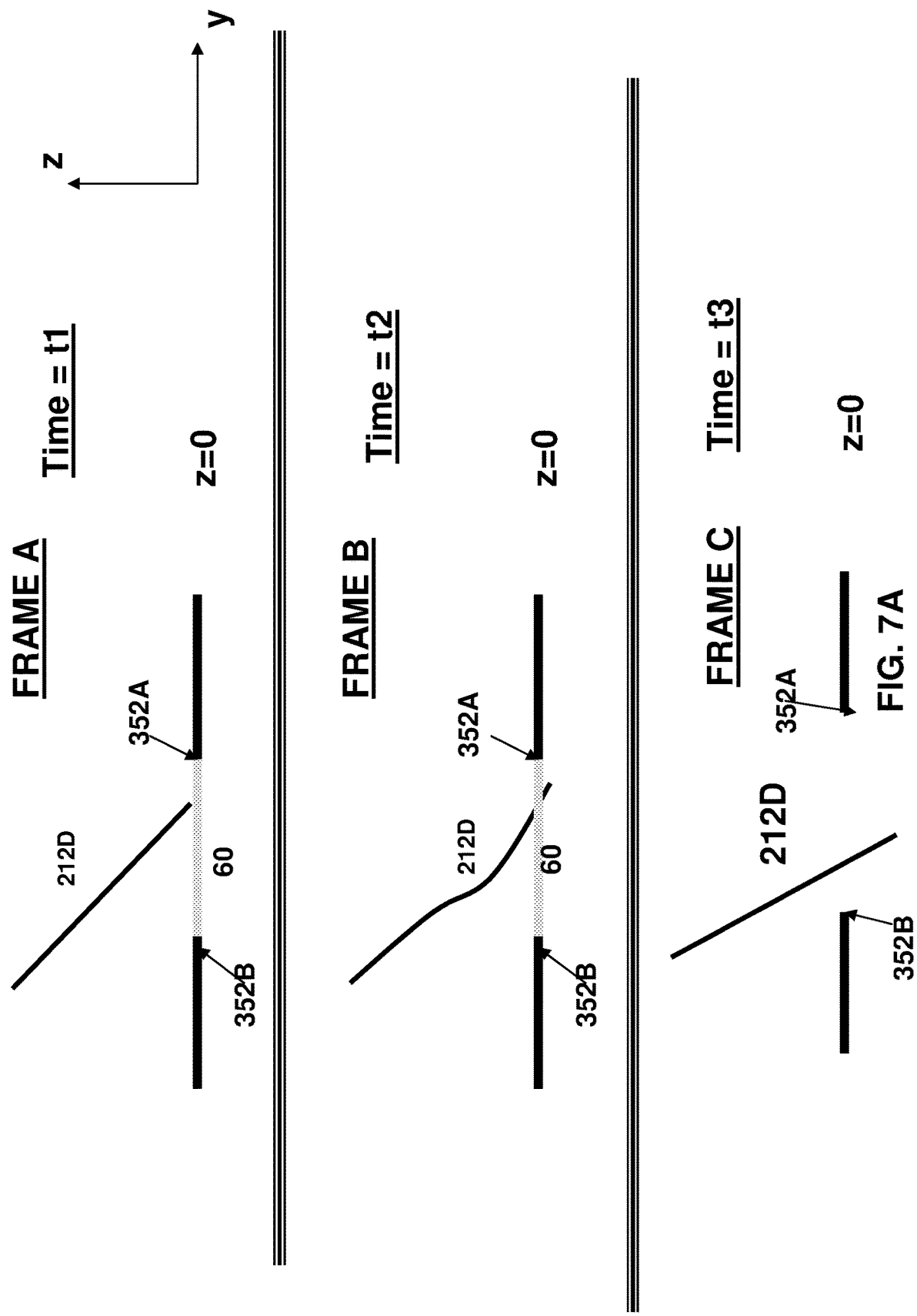

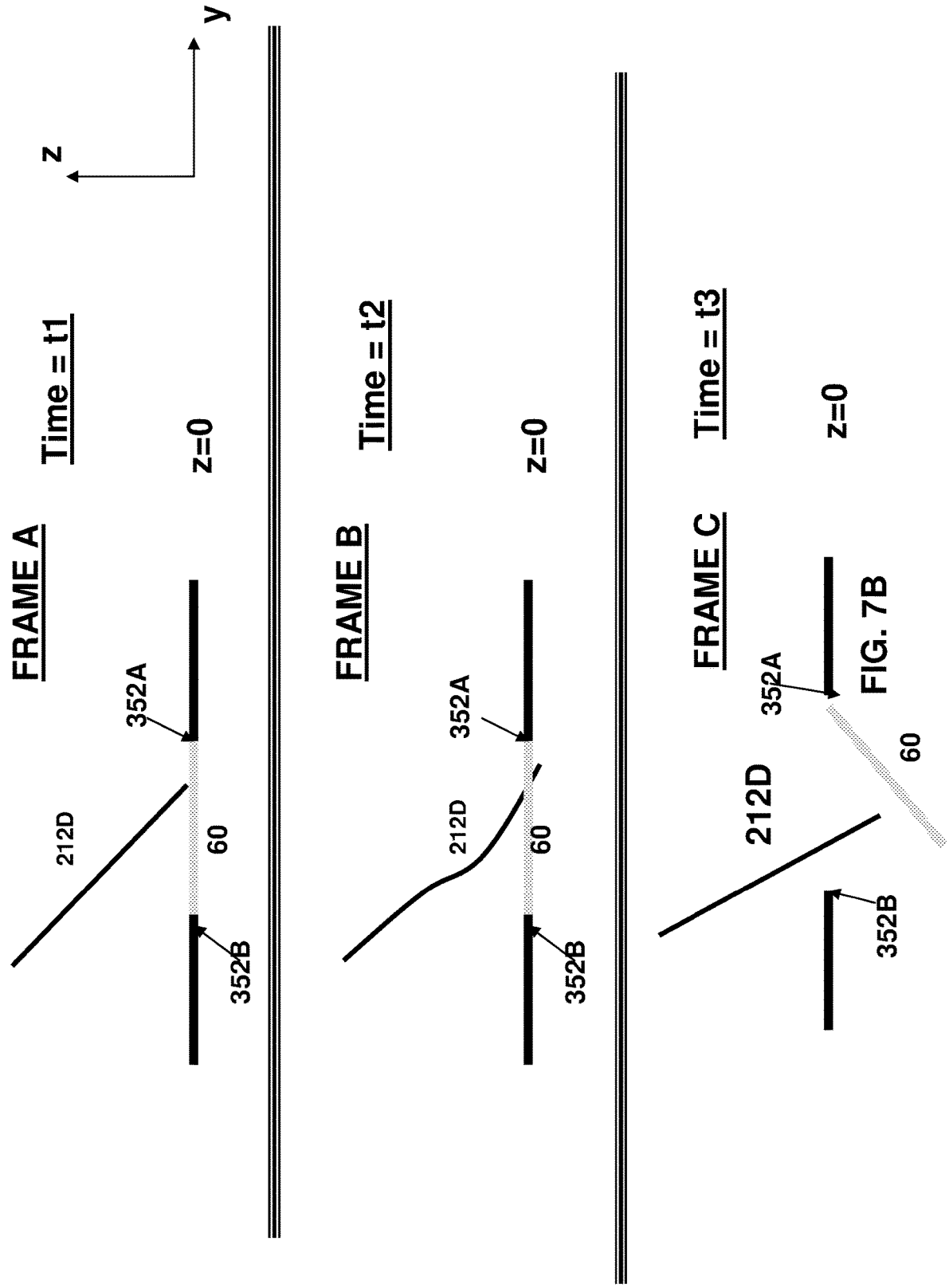

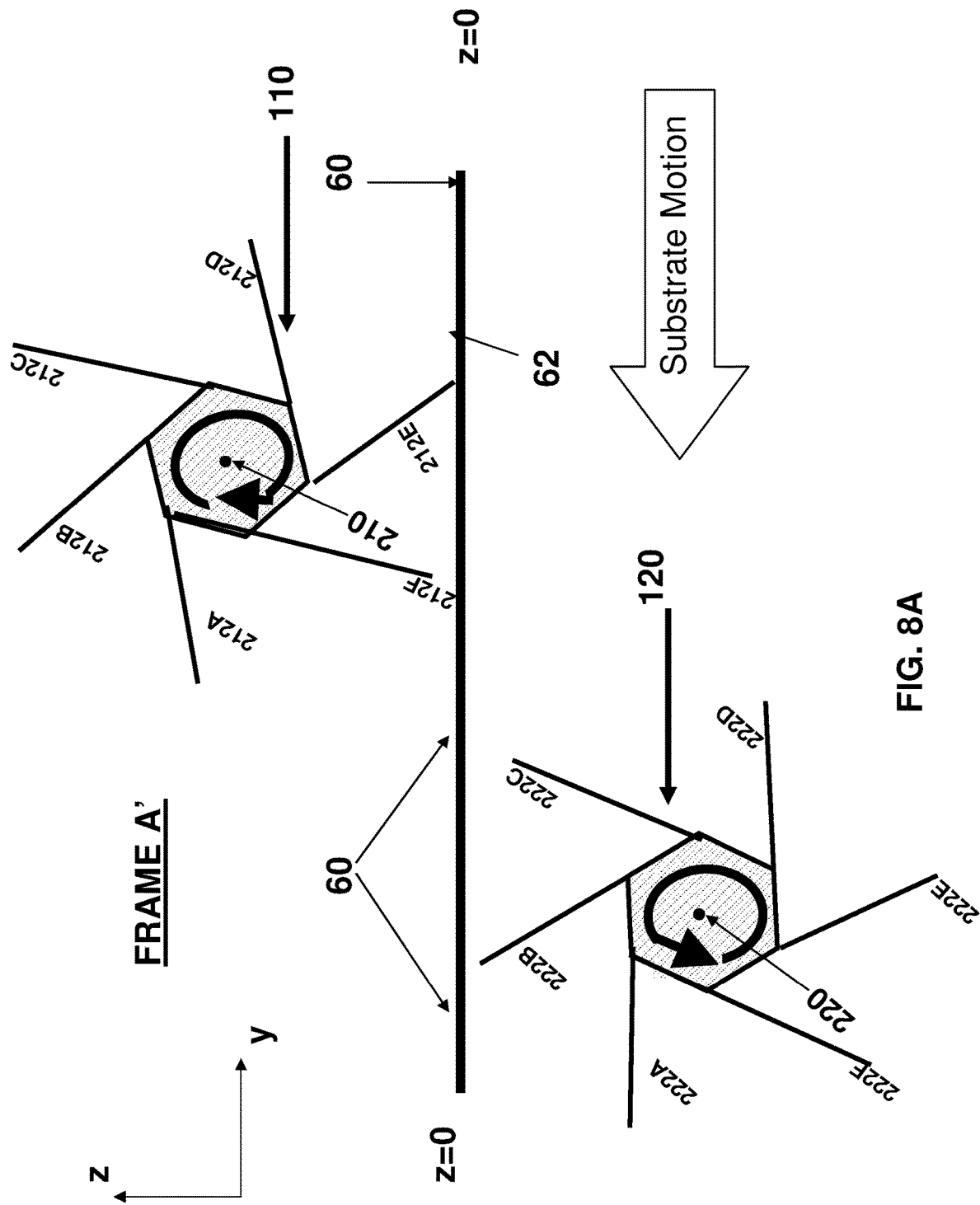

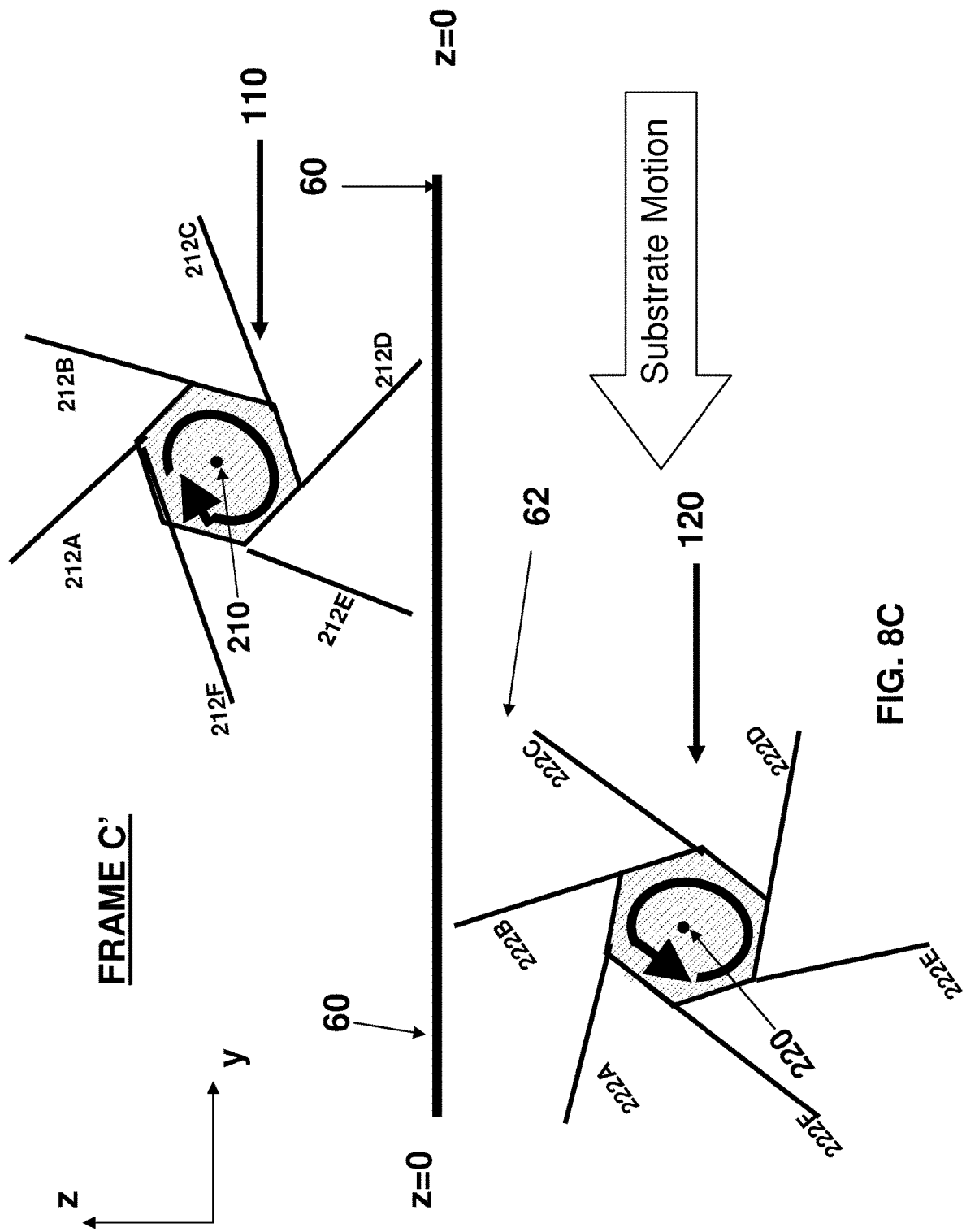

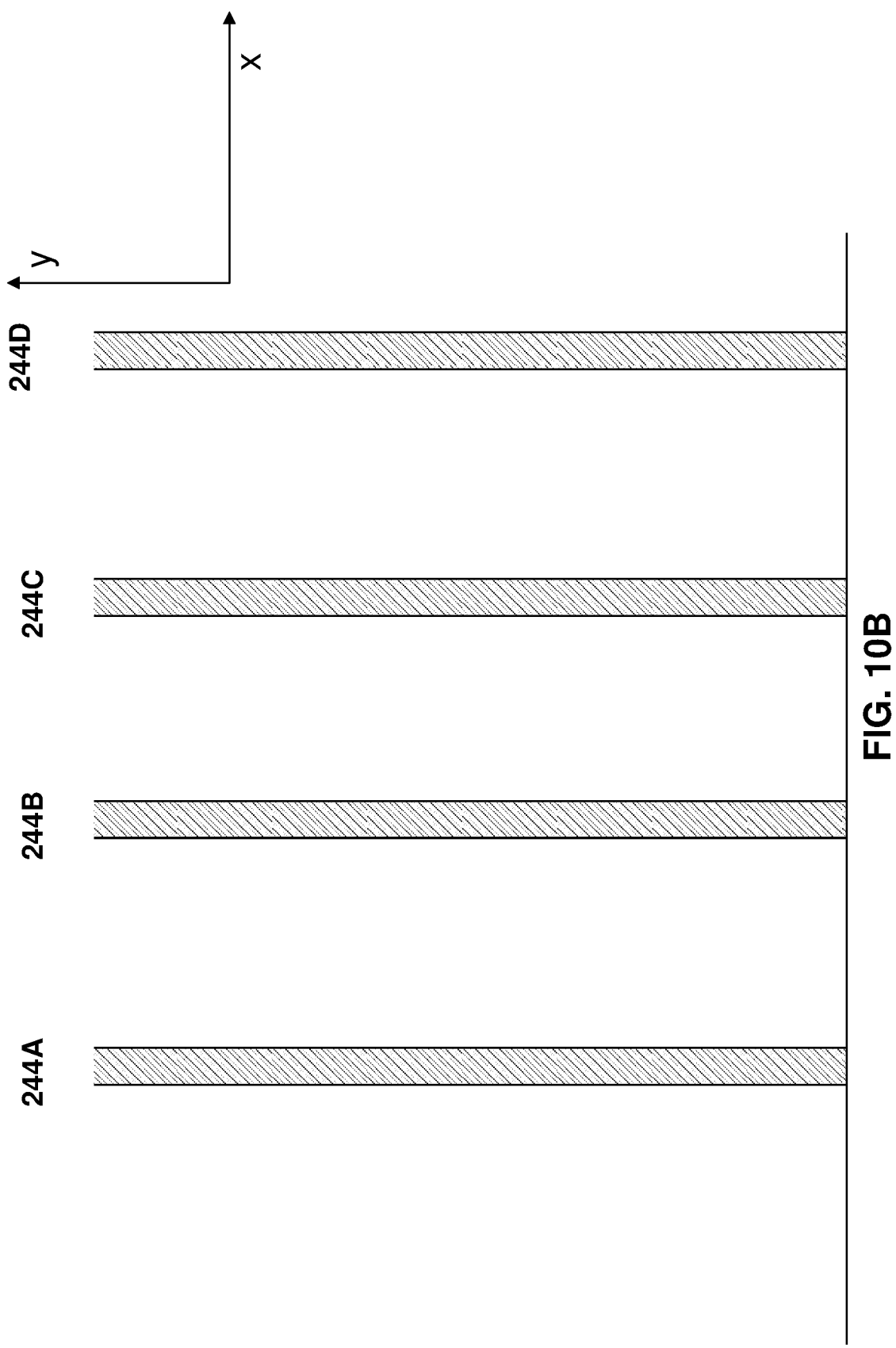

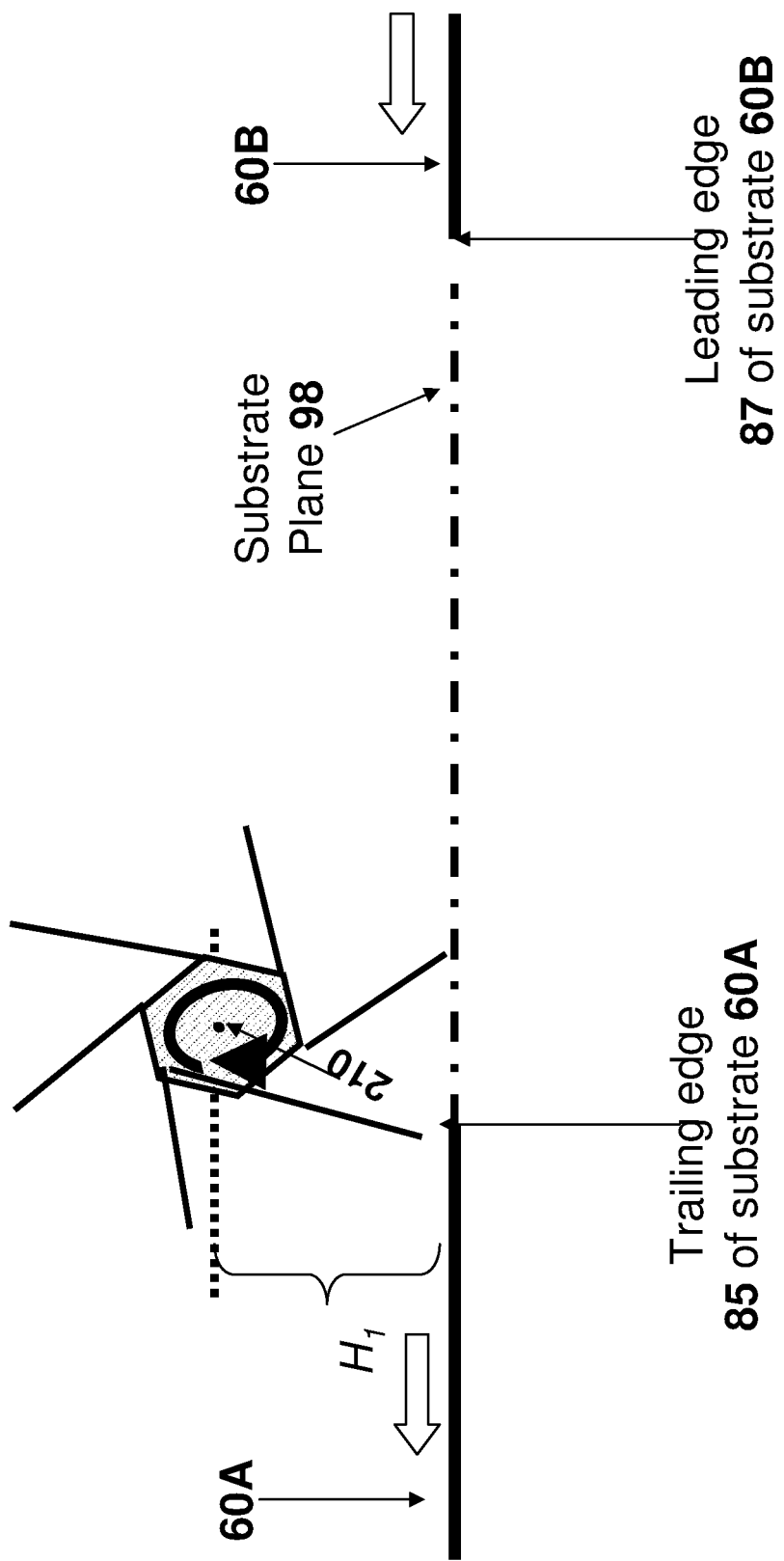

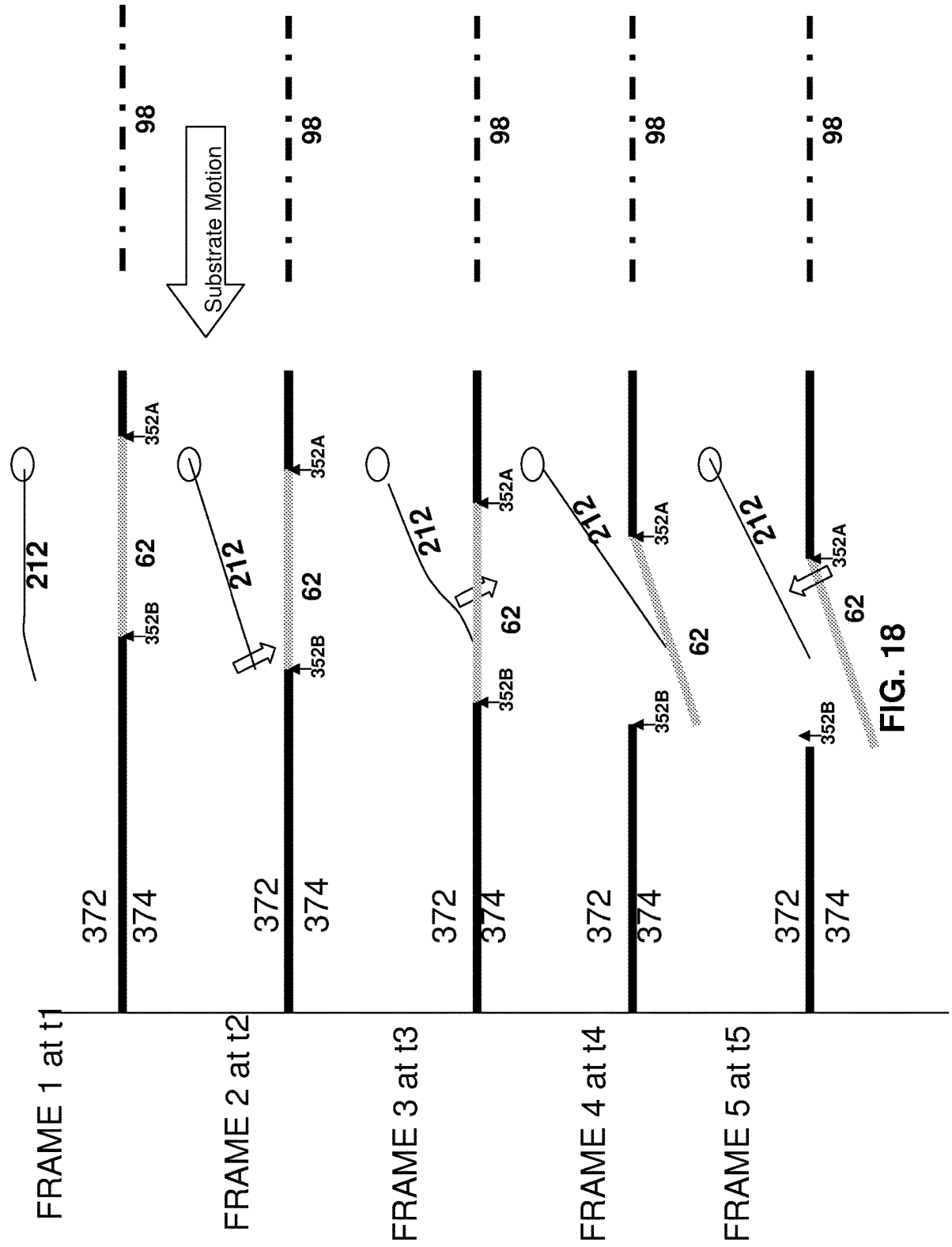

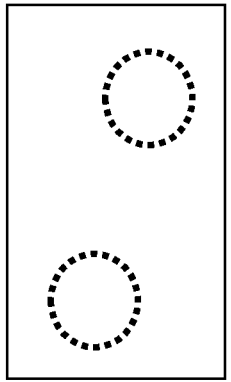
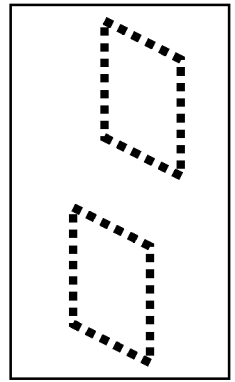
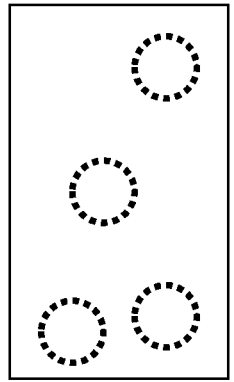
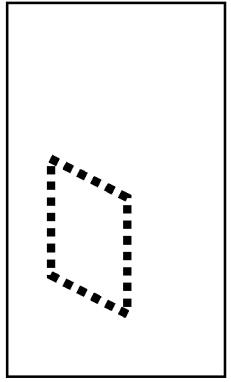
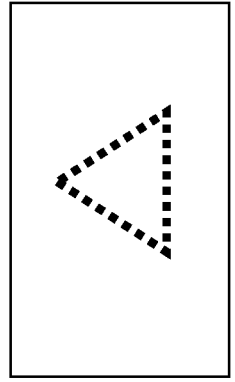
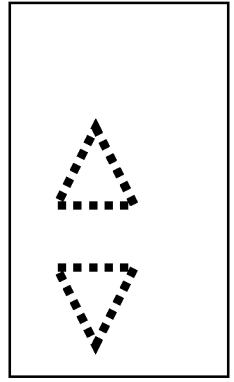
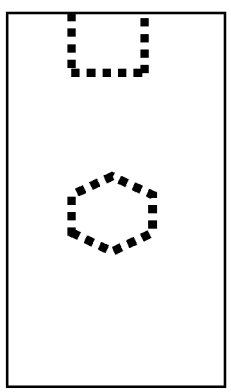
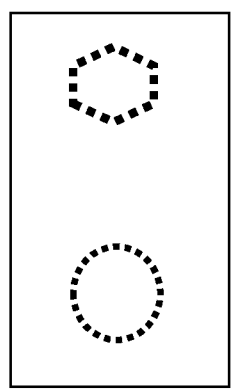
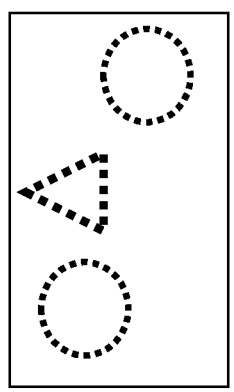
FIG. 29

EXAMPLE 1 — 'ERROR-FREE STRIPPING'
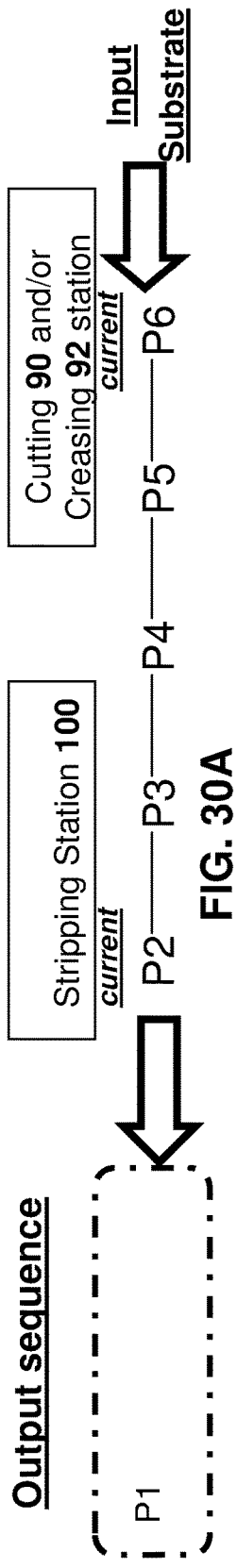
FIG. 30A — FRAME "A" at time=$t_1$
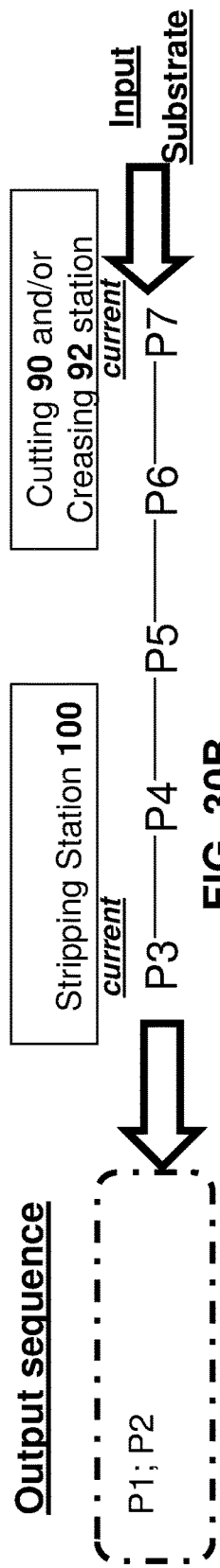
FIG. 30B — FRAME "B" at time=$t_2$
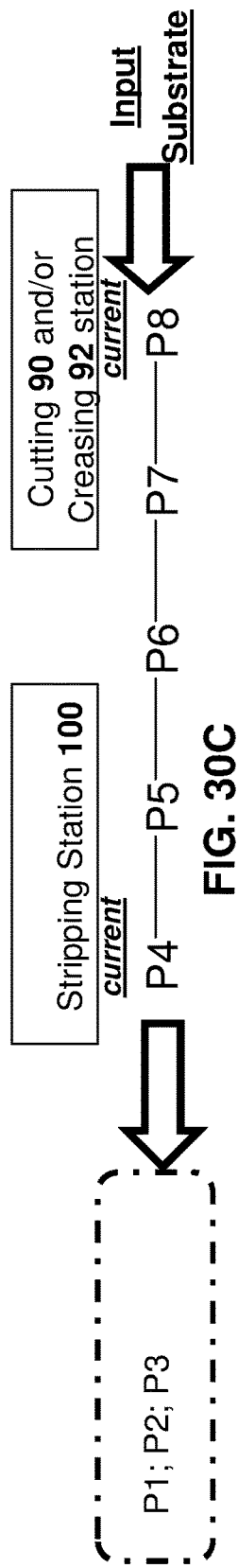
FIG. 30C — FRAME "C" at time=$t_3$

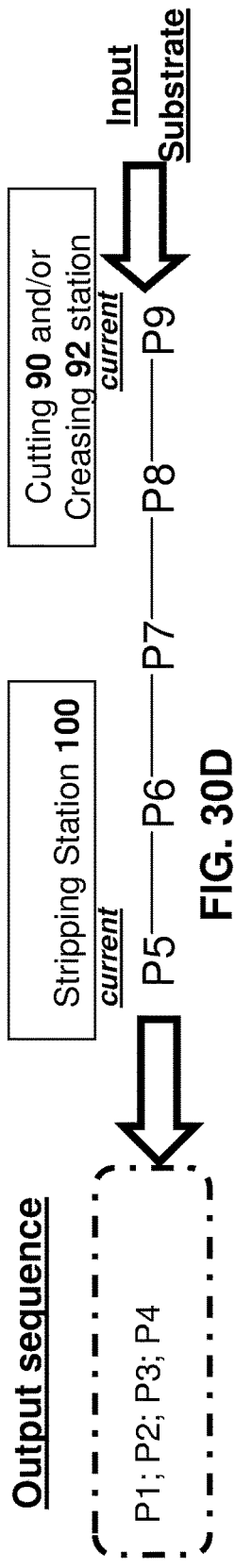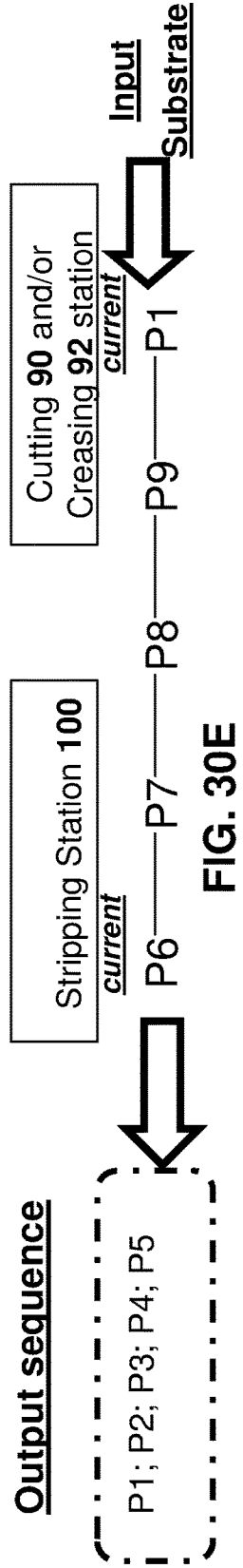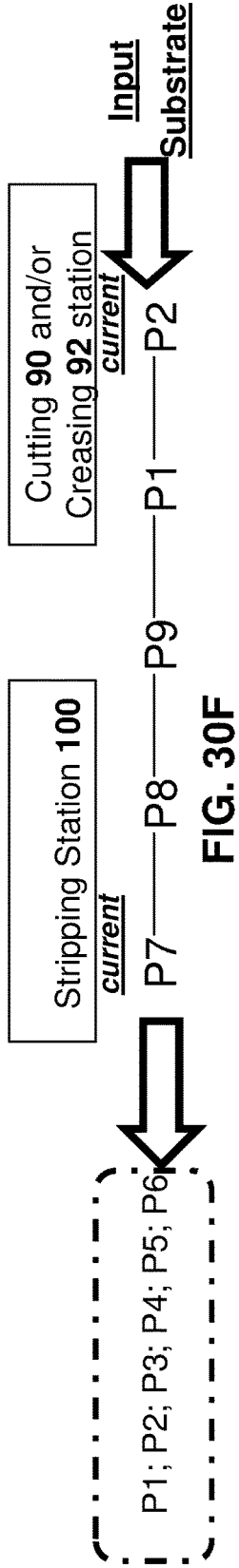

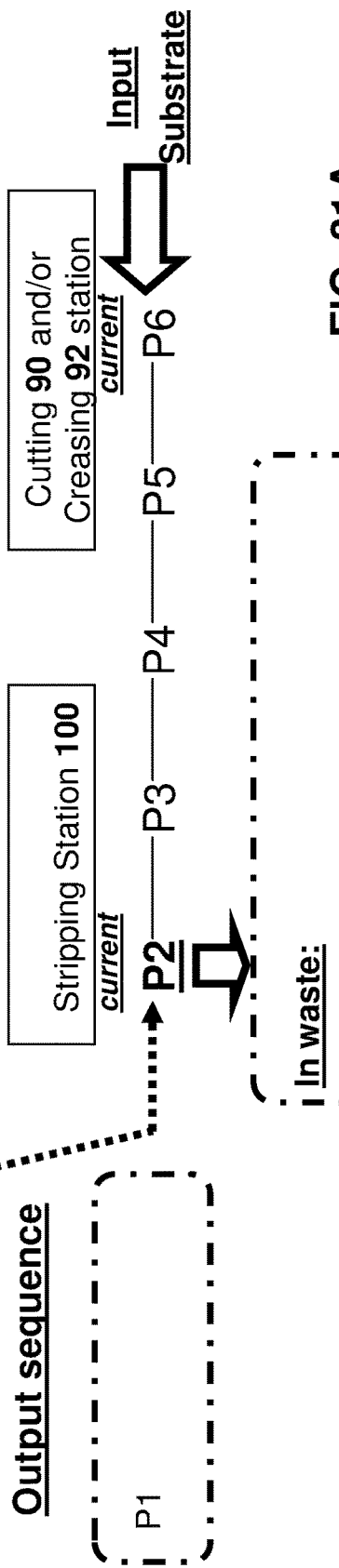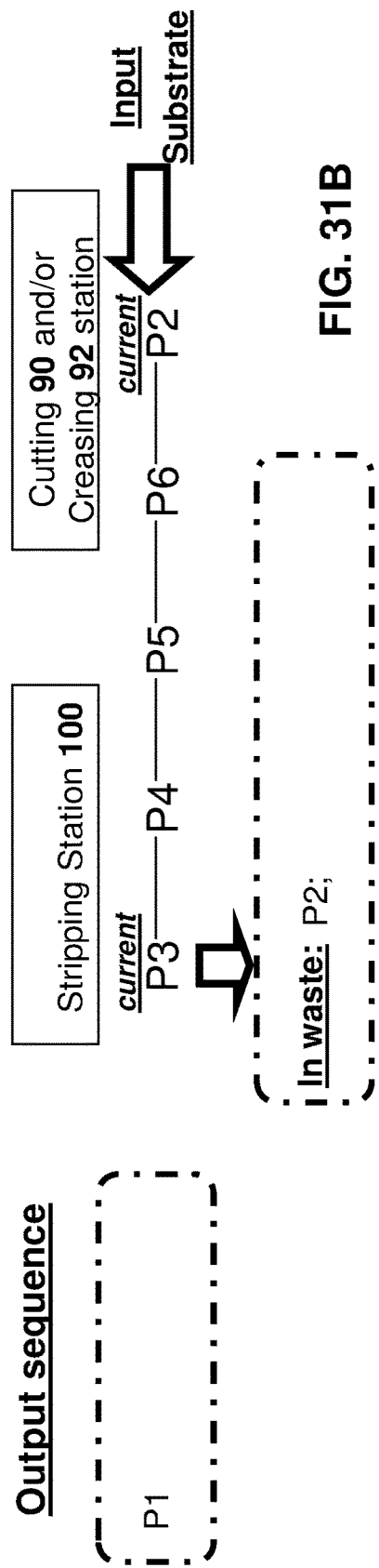

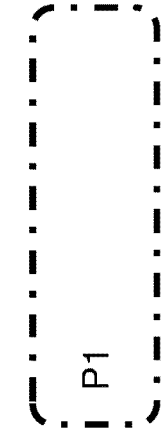
FIG. 31C / FIG. 31D

EXAMPLE 2 — 'RECOVERING FROM STRIPPING ERROR'
FRAME "E" at time=$t_5$
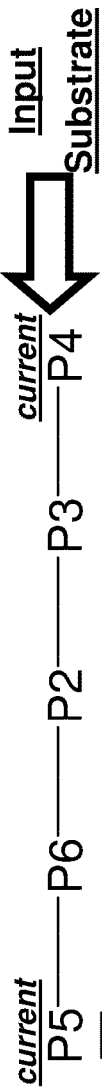
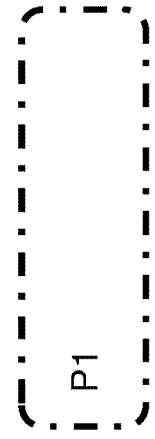
FIG. 31E
FRAME "F" at time=$t_6$
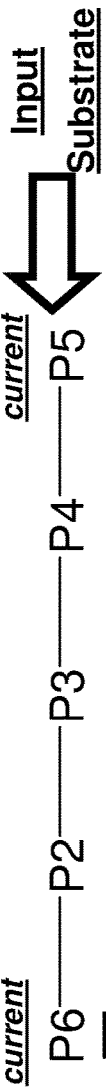
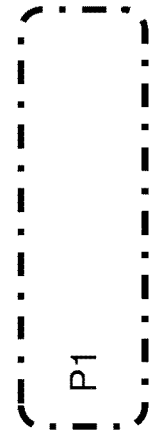
FIG. 31F

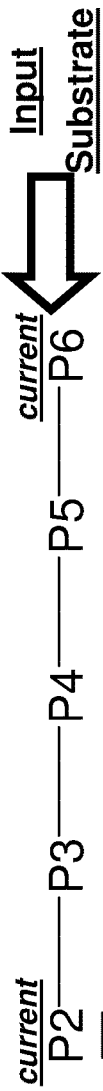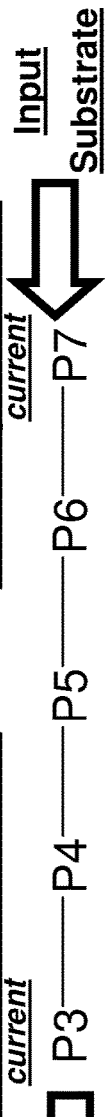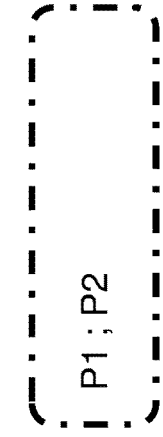

METHOD AND APPARATUS FOR BUILDING A 3D OBJECT FROM LAYERS OF PRE-STRIPPED SUBSTRATE

FIELD AND BACKGROUND

Additive Manufacturing

Embodiments of the present invention relate to methods and apparatus for additive manufacture by stacking object-layers of substrate and bonding the object-layers to one another to build the 3D object.

The following issued patents and patent publications provide potentially relevant background material, and are all incorporated by reference in their entirety: U.S. Pat. Nos. 5,730,817, 5,876,550. US 20110094441. US 20150165689, US 20150134096, EP1415791, U.S. Pat. Nos. 5,015,312, 6,543,506, US20080229941, US20090261067, US20090303507, US20110094441, WO2013174526, WO2014131848, and WO2014131848.

Stripping

In some embodiments, the method and apparatus employ one or more presently-disclosed techniques for stripping away waste portion(s) of substrate.

U.S. Pat. No. 9,045,292, assigned to Highcon Systems Ltd and listing David Ben-David and Yaki Stern as inventors, discloses a method and system for stripping and blanking a cardboard.

The following issued patents and patent publications provide potentially relevant background material, and are all incorporated by reference in their entirety: U.S. Pat. No. 8,783,144, DE35369891, US2007028741, U.S. Pat. Nos. 3,543,623, 4,480,518, 4,840,098, 4,991,478, 5,503,053, and WO2010024695. Some or all of the prior art document disclose examples of 'stripping apparatus.'

SUMMARY

Embodiments of the present invention relate to a system and method for manufacturing a three-dimensional object from a stack of pre-stripped layers of substrate. Each object layer is formed by (i) providing substrate comprising waste portion(s) and substrate-retained portion(s) that are attached to each other and separated from one another by cut(s) within the substrate; (ii) subsequently, subjecting the subject of each layer to a stripping process which selectively strips away substrate-waste portion(s) from the substrate-retained portion(s). After stripping, the object layer is added to a stack of previously-stacked object layers to grow the stack. This process is repeated to further grow the stack. Object layers of the stack are bonded to each other to build the three-dimensional object therefrom.

A novel stripping process is disclosed herein—although the invention is not limited to embodiments that employ this novel stripping process, the inventors have found that this stripping process, in some embodiments, is particularly useful in high-throughput environments. In some embodiments, during the stripping process one or more soft and/or flexible impact element(s) collide with the substrate—e.g. so that momentum transferred from the impact element(s) to the substrate strips away waste portion(s). For example, the substrate may be stripped while in horizontal-motion.

In contrast to other additive manufacturing processes which rely exclusively on post-stacking stripping to remove waste portions, when individual layers of substrate are pre-stripped it is possible to strip away 'surrounded' waste portions—i.e. waste portions that are entirely surrounded (i.e. in the substrate plane) by other portion(s) of substrate. Fully-surrounded waste portion(s) stripping targets may be difficult or impossible to access (so as to strip away) after stacking. In contrast, a method is now disclosed where such stripping targets are stripped away from substrate-retained portions before stacking to form replace each substrate-surrounded stripping target with a respective void.

In some embodiments, the object layers from the pre-stripped substrate may be stacked so as to align the substrate-surrounded voids with each other, thereby forming a canal along the stack-axis of the stack.

The present inventors have experimented with systems configured to perform the presently-stripping process. Although the process may be extremely fast and efficient, there are some situations where the stripping process is not 100% reliable, and stripping errors (e.g. failure to strip waste-portion(s) from the substrate) may occur. When single-layers of substrate are improperly stripped and subsequently stacked (and bonded) to form a 3D object, the presence of stripping errors can be particularly problematic—for example, blocking one of the aforementioned canals.

Embodiments of the present invention relate to methods and apparatus for reducing the likelihood and/or severity of stripping errors. Alternatively or additionally, methods and apparatus for recovering from stripping errors are disclosed herein.

A system for additive manufacture comprises: a. mechanized stripping apparatus configured to (i) receive pre-stripping substrate comprising substrate-waste portion(s) and substrate-retained portion(s) that are attached to each other and separated from one another by cut(s) within the substrate; and (ii) to transform the pre-stripping substrate into post-stripping substrate by selectively stripping away the substrate-waste portion(s) from the substrate-retained portion(s); and b. a stacking station configured to add an object-layer of the post-stripping substrate to a stack of previously-stacked object-layers so as to grow the stack of object-layers; c. a substrate handling arrangement configured to: (i) transport previously-cut substrate to the mechanized stripping apparatus; and (ii) to transport post-stripping substrate from the mechanized stripping apparatus to the stacking station, wherein the mechanized stripping apparatus, the stacking station and the stacking handling arrangement are configured to repeat the stripping, the substrate-transporting and the adding to further grow the stack, and wherein the system further comprises a bonding device configured to bond the stacked object-layers to build a three-dimensional object therefrom.

In some embodiments, the mechanized stripping apparatus, the stacking station and substrate handling arrangement are configured to sustain a stack-growth rate of at least 10 sheets/minute or at least 20 sheets/minute or at least 30 sheets/minute for at least 1 minute or at least 3 minutes or at least 5 minutes or at least 10 minutes or at least 30 minutes or at least one hour.

In some embodiments, the additive-manufacturing-system further comprises an inspection system configured to detect stripping errors in the post-stripping substrate; and/or a controller configured to selectively route post-stripping substrate to the stack or away from the stack in response to output of the inspection system.

In some embodiments, the additive-manufacturing-system further comprises a cutting station configured to form the cut(s) in the substrate to generate the pre stripping substrate, wherein the substrate handling arrangement is configured to transport the pre-stripping substrate from the cutting station to the mechanized stripping apparatus.

In some embodiments, the bonding apparatus (i) applies at least one of pressure, UV radiation and heat and/or (ii) delivers an adhesive material and/or (iii) delivers at least one of a polymer adhesive, a water based adhesive and an epoxy adhesive and/or (iv) activates an adhesive material and/or (v) welds layers together and/or (vi) bonds layers together by sintering.

In some embodiments, the bonding apparatus (i) heats adhesive material and/or at least one location on or in the stack to at least 100 degrees Celsius or at least 150 degrees Celsius and/or (ii) applies at least 10 megaPascal (MPa) of pressure or at least 20 MPa of pressure or at least 30 MPa or pressure or pressure or at least 50 MPa of pressure or at least 100 MPa of pressure.

In some embodiments, the bonding apparatus comprises a heated roller.

In some embodiments, (i) the substrate handling arrangement is adapted to horizontally support a flat, thin substrate so as to define a substrate-plane; and (ii) the stripping apparatus includes at least one flexible and/or soft impact-element and a rotation-drive positioned and configured to rotate the flexible impact-element around a rotation-axis so as repeatedly drive a peripheral portion of the impact-element across the substrate-plane.

In some embodiments, the stripping apparatus comprises (i) a group of flexible and/or soft impact-element(s) that are respectively and rotatably mounted to a respective rotation-axis; and (ii) a rotation-drive system configured to drive rotation of the flexible and/or soft impact-element(s) around the rotation-axis, the stripping apparatus defining a stripping-location thereunder; and (ii) the substrate handling arrangement is adapted to deliver substrate to the stripping location so that, at the stripping location, the substrate is maintained at a substrate plane, the stripping apparatus and the sheet-based substrate handling arrangement configured so that when substrate is located simultaneously at the stripping-location and the substrate-plane the rotation-drive system rotates the flexible and/or soft impact-element(s) so that they repeatedly collide with the substrate, thereby stripping away portion(s) of substrate.

In some embodiments, i. the stripping apparatus is vertically movable so that (A) when the rotation axis is in a first and lower height-range, the rotating flexible and/or soft impact-element(s) reach the substrate plane at the stripping location and (B) when the rotation axis is in a second and higher height-range, the rotating flexible and/or soft impact-element(s) always remain above the substrate plane at the stripping location; ii. the stripping apparatus comprises a translation-drive system configured to raise and lower the stripping apparatus to respectively raise and lower the rotation-axis thereof to move the rotation axis back and forth between the first and second height-ranges; and iii. the substrate handling arrangement is adapted to deliver sheets of substrate to the stripping location, each sheet having a respective leading-edge and trailing edge; iv. the system further comprises a controller configured to regulate operation of the translation-drive system to: (A) raise the stripping apparatus from the first height-range to the second height-range in response to a trailing edge of a first substrate-sheet exiting the stripping location; and (B) subsequently, lower the stripping apparatus from the second height-range to the first height-range in response to a leading edge of a subsequent substrate-sheet reaching the stripping location.

In some embodiments, the stripping apparatus comprises (i) a group of flexible and/or soft impact-element(s) that are respectively and rotatably mounted to a respective rotation-axis; and (ii) a rotation-drive system configured to drive rotation of the flexible and/or soft impact-element(s) around the rotation-axis, the stripping apparatus defining a stripping-location thereunder; and b. the substrate handling arrangement is adapted to deliver substrate to the stripping location so that, at the stripping location, the substrate is maintained at a substrate plane, the stripping apparatus and the sheet-based substrate handling arrangement configured so that when substrate is located simultaneously at the stripping-location and the substrate-plane the rotation-drive system rotates the flexible and/or soft impact-element(s) so that they repeatedly collide with the substrate, thereby stripping away portion(s) of substrate.

In some embodiments, the additive-manufacturing-system further comprises an inspection system configured (i) to analyze a condition of post-stripping substrate and/or (ii) to detect an extent of stripping-error(s) in the post-stripping substrate.

In some embodiments, the additive-manufacturing-system further comprises e. a stripping-apparatus-controller configured to update operating-parameter(s) of the stripping apparatus in response to the detected extent of stripping-errors.

In some embodiments, the inspection system and the controller are configured as a closed-loop control system to iteratively update operating parameter(s) so as to minimize an extent of extent of stripping-error(s) in the post-stripping substrate.

In some embodiments, the operating-parameter(s) include at least one of a rotation-speed and an elevation of the rotation axis above the substrate plane at the stripping location.

In some embodiments, the additive-manufacturing-system further comprises an inspection system configured to detect an extent of stripping-error(s) in post-stripping substrate sheet(s) from which portion(s) of substrate have been stripped away by the stripping apparatus; and/or a system-controller configured to regulate operation of the substrate handling arrangement and/or of the stacker, the system-controller being configured, in response to and in accordance with the detected extent of stripping-error(s) to as to prevent at least some post-stripping sheets from (i) being supplied the stacker and/or (ii) from being stacked by the stacker.

In some embodiments, the additive-manufacturing-system further comprises a cutting station configured to form cut(s) in sheets of substrate according to a sequence of per-sheet cut-patterns, the substrate handling arrangement being adapted to deliver substrate the sheets including the cut(s) therein from the cutting station to the stripping location, wherein the system-controller further regulates behavior of the cutting station by updating the cutting sequence in response to detect an extent of stripping-error(s) in post-stripping substrate sheets.

In some embodiments, the additive-manufacturing-system is configured so that in response to a higher extent-of-error(s) in post-stripping substrate sheet(s), the system-controller: i. prevents the post-stripping substrate sheet(s) having the higher extent-of-error(s) in post-stripping substrate sheet(s) from being supplied to or stacked by the stacker; and/or ii. causes the cutting station to return to an earlier location in the cutting sequence and to proceed to cut subsequent sheet(s) according to the sequence starting from the earlier location.

In some embodiments, the mechanized stripping apparatus comprises first and second stripping assemblies, each stripping assembly including a respective group of flexible and/or soft impact-element(s) that are respectively and rotatably mounted to a respective rotation-axis, the first and second stripping assemblies respectively defining first and second stripping-locations thereunder; (A) the substrate handling arrangement adapted to (i) deliver substrate to the first stripping location so that substrate is maintained at a first substrate-plane when at the first stripping location; and (ii) subsequently deliver substrate from the first to the second stripping location so that the substrate is maintained at a second substrate-plane when located at the second stripping location; and (C) wherein the system further comprises one or more drive system(s), the drive system(s) configured to respectively drive rotational motion, at first and second rotation-rates, of the flexible and/or soft impact-element(s) of the first and second stripping assemblies around their respective rotation-axes, wherein the stripping assemblies, substrate-handling system and drive-system(s) are configured so that i. rotation of the flexible and/or soft impact-element(s) of the first stripping assembly around a rotation axis thereof causes the flexible and/or soft impact-element(s) thereof to repeatedly reach the first substrate-plane to repeatedly collide with substrate simultaneously disposed at the first stripping location and at the first substrate-plane, thereby stripping away first portion(s) of the substrate; and ii. rotation of the flexible and/or soft impact-element(s) of the second stripping assembly around a rotation axis thereof causes the flexible and/or soft impact-element(s) thereof to repeatedly reach the second substrate-plane to repeatedly collide with substrate simultaneously disposed at the second stripping location and at the second substrate-plane, thereby stripping away second portion(s) of the substrate after the first portion(s) have been stripped away, wherein the drive system(s) operates so that the second rotation-rate exceeds the first rotation rate.

In some embodiments, a ratio between the second and first rotation rates is at least 1.1 or at least 1.25 or at least 1.5 or at least 2 or at least 3 or at least 5 or at least 7.5 or at least 10.

In some embodiments, the additive-manufacturing-system further comprises d. an inspection system configured to analyze post-stripping substrate to detect stripping error(s); and/or e. a controller configured to control substrate handling arrangement so that the delivery of substrate from the first to the second stripping location is conditional upon a level of the stripping error(s) exceeding a error-threshold.

In some embodiments, the stripping apparatus is configured so that i. in the absence of rotational motion, for at least one configuration, the impact element sags under its own weight; and ii. rotation-drive sufficiently rotates impact-element so as to fully extent the impact element to eliminate the sag.

In some embodiments, wherein the impact element are configured so that: i. when the impact element is stationary, for at least one orientation, the impact element sags under its own weight; and ii. centrifugal force of the rotating of the flexible and/or soft impact element(s) causes the impact element to fully extend so as to eliminate the sag.

In some embodiments, a Shore D hardness of the first and/or second impact element is between 60 and 90

A method comprises employing any presently-disclosed system of any previous claim to form a solid object from sheets of paper or from layers of cardboard.

A method comprises employing any presently-disclosed system of to form a solid object having a tensile strength of at least 20 MPa or at least 30 mPA or at least 40 MPa or at least 50 Mpa.

A method of additive manufacture comprises a. producing an object-layer from substrate by: i. providing a thin substrate having cut(s) therein to define boundary(ies) between substrate-waste portion(s) and substrate-retained portion(s) of the substrate; ii. subsequently stripping away one or more substrate-waste portion(s) from the substrate-retained portion(s); b. subsequently adding the produced object-layer to a stack of one or more previously-stacked object layer(s) to grow the stack of layers; c. repeating steps (a) and (b) to further grow the stack of layers; and d. bonding layers of the stack to build a three-dimensional object from the object wherein the stripping away comprises the following step: at a time when the substrate is locally-flat and supported to define a substrate plane thereof, rotating at least one flexible and/or soft impact element(s) so as to repeatedly drive a peripheral portion of the impact element across the substrate plane so as to strip away at least one portion of the substrate.

In some embodiments, i. for a plurality of object-layers, the stripping comprises stripping away an enclosed substrate waste-portion to form an enclosed void within substrate-retained portion(s); and ii. upon stacking of the object-layers, the enclosed voids form a canal along a stack-axis of the stack.

In some embodiments, the bonding comprises introducing an adhesive material into the canal.

In some embodiments, upon introduction into the canal, the adhesive material is a flowable and is activated in-situ within the canal.

In some embodiments, a liquid adhesive material is introduced into the canal and dries therein to contribute to the bonding.

In some embodiments, the bonding is performed so that an inter-layer structural-integrity is provided primarily by a presence of the adhesive material within one or more of the canals.

In some embodiments, impact between the impact element and the substrate at the substrate plane bends the impact element.

In some embodiments, i. when the impact element is stationary, for at least one orientation, the impact element sags under its own weight; and ii. centrifugal force of the rotating of the flexible and/or soft impact element(s) causes the impact element to fully extend so as to eliminate the sag.

In some embodiments, a second portion of the substrate is stripped away from a first portion of the substrate to form two distinct pieces of substrate such that: (i) before impact(s) by the rotating impact element(s), the first and second portions are held to each other by individual fibers and/or by static friction and/or by mechanical locking and (ii) impact(s) by the impact element(s) provides sufficient force so as to completely strip away the second portion from the first portion.

In some embodiments, a Shore D hardness of the impact element is between 60 and 90.

In some embodiments, the substrate is coated with an activatable adhesive material on one or both sides thereof, and the stripping comprises colliding a flexible and/or soft impact element(s) or portion(s) thereof with the substrate at a location coated with the adhesive material.

In some embodiments, at the time of the collision(s) the adhesive material is inactive and wherein the subsequent bonding comprises activating the adhesive material.

In some embodiments, performed (i) to form a solid object from sheets of paper or from layers of cardboard and/or (ii) to form a solid object having a tensile strength of at least 20 MPa or at least 30 mPA or at least 40 MPa or at least 50 Mpa.

In some embodiments, the bonding is performed by an adhesive material that is activated by any combination of phase-change, pressure, heating, UV-curing.

In some embodiments, the bonding comprises employing at least one of a liquid adhesive material (e.g. UV dark curing—epoxy) or a solid (e.g. phase-change) adhesive material.

In some embodiments, each layer is bonded to an adjacent object-layer upon addition to the stack.

In some embodiments, the bonding of layer step (d) is delayed so that object-layers are only bonded to the stack only after being sandwiched between adjacent object-layers thereof.

In some embodiments, the added produced object-layer is added to the top of the stack.

In some embodiments, the added produced object-layer is added to the bottom of the stack.

In some embodiments, the stack is heterogeneous with respect to at least one of layer thickness and layer material.

Stripping methods and apparatus are now disclosed. It is appreciated that any teaching or combination(s) related to teaching may be employed in the context of additive manufacturing and combined with step(s) thereof.

A method for stripping away portions of a substrate, the method comprises: at a time when a locally-flat, thin substrate is supported to define a substrate plane: rotating at least one flexible and/or soft impact element(s) so as to repeatedly drive a peripheral portion of the impact element across the substrate plane so as to strip away at least one portion of the substrate.

In some embodiments, impact between the impact element and the substrate at the substrate plane bends the impact element.

In some embodiments, when the peripheral portion of the impact element reaches the substrate plane and contacts the substrate, a vector of motion of the peripheral portion of impact element is non-perpendicular to the substrate plane, preferably non-perpendicular by at least 10 degrees.

In some embodiments, when the impact element is stationary, for at least one orientation, the impact element sags under its own weight; and ii. centrifugal force of the rotating of the flexible and/or soft impact element(s) causes the impact element to fully extend so as to eliminate the sag.

In some embodiments, a second portion of the substrate is stripped away from a first portion of the substrate to form two distinct pieces of substrate such that: (i) before impact(s) by the rotating impact element(s), the first and second portions are held to each other by individual fibers and/or by static friction and/or by mechanical locking and (ii) impact(s) by the impact element(s) provides sufficient force so as to completely strip away the second portion from the first portion.

An apparatus for stripping away portions of a substrate, comprises: a. stripping assembly comprising (i) a group of flexible and/or soft impact-element(s) that are respectively and rotatably mounted to a respective rotation-axis; and (ii) a rotation-drive system configured to drive rotation of the flexible and/or soft impact-element(s) around the rotation-axis, the stripping assembly defining a stripping-location thereunder; and b. a substrate handling arrangement adapted to deliver substrate to the stripping location so that, at the stripping location, the substrate is maintained at a substrate plane, the stripping assembly and the sheet-based substrate handling arrangement configured so that when substrate is located simultaneously at the stripping-location and the substrate-plane the rotation-drive system rotates the flexible and/or soft impact-element(s) so that they repeatedly collide with the substrate, thereby stripping away portion(s) of substrate.

In some embodiments, the stripping assembly is vertically movable so that (A) when the rotation axis is in a first and lower height-range, the rotating flexible and/or soft impact-element(s) reach the substrate plane at the stripping location and (B) when the rotation axis is in a second and higher height-range, the rotating flexible and/or soft impact-element(s) always remain above the substrate plane at the stripping location; ii. the stripping assembly comprises a translation-drive system configured to raise and lower the stripping assembly to respectively raise and lower the rotation-axis thereof to move the rotation axis back and forth between the first and second height-ranges; iii. the substrate handling arrangement is adapted to deliver sheets of substrate to the stripping location, each sheet having a respective leading-edge and trailing edge; and iv. the system further comprises a controller configured to regulate operation of the translation-drive system to: (A) raise the stripping assembly from the first height-range to the second height-range in response to a trailing edge of a first substrate-sheet exiting the stripping location; and (B) subsequently, lower the stripping assembly from the second height-range to the first height-range in response to a leading edge of a subsequent substrate-sheet reaching the stripping location.

A system for stripping away portions of a substrate, the apparatus comprising: a. stripping assembly comprising (i) a group of flexible and/or soft impact-element(s) that are respectively and rotatably mounted to a respective rotation-axis; and (ii) a rotation-drive system configured to drive rotation of the flexible and/or soft impact-element(s) around the rotation-axis, the stripping assembly defining a stripping-location thereunder; and b. a substrate handling arrangement adapted to deliver substrate to the stripping location so that, at the stripping location, the substrate is maintained at a substrate plane, the stripping assembly and the sheet-based substrate handling arrangement configured so that when substrate is located simultaneously at the stripping-location and the substrate-plane the rotation-drive system rotates the flexible and/or soft impact-element(s) so that they repeatedly collide with the substrate, thereby stripping away portion(s) of substrate.

In some embodiments, the system further comprises: an inspection system configured (i) to analyze a condition of post-stripping substrate and/or (ii) to detect an extent of stripping-error(s) in the post-stripping substrate.

In some embodiments, the system further comprises: e. a stripping-assembly-controller configured to update operating-parameter(s) of the stripping assembly in response to the detected extent of stripping-errors.

In some embodiments, the stripping-assembly-controller, the inspection system and the controller are configured as a closed-loop control system to iteratively update operating parameter(s) so as to minimize an extent of extent of stripping-error(s) in the post-stripping substrate.

In some embodiments, the operating-parameter(s) include at least one of a rotation-speed and an elevation of the rotation axis above the substrate plane at the stripping location.

In some embodiments, the system further comprises: a stacker, wherein (i) the substrate handling arrangement is configured to supply the stacker by delivering thereto post-stripping sheets of substrate from the stripping location; and (ii) the stacker is configured to form or grow a stack from the post-stripping sheets of substrate.

In some embodiments, the system further comprises: an inspection system configured to detect an extent of stripping-error(s) in post-stripping substrate sheet(s) from which portion(s) of substrate have been stripped away by the stripping assembly; and/or a system-controller configured to regulate operation of the substrate handling arrangement and/or of the stacker, the system-controller being configured, in response to and in accordance with the detected extent of stripping-error(s) to as to prevent at least some post-stripping sheets from (i) being supplied the stacker and/or (ii) from being stacked by the stacker.

In some embodiments, the system further comprises: a cutting station configured to form cut(s) in sheets of substrate according to a sequence of per-sheet cut-patterns, the substrate handling arrangement being adapted to deliver substrate the sheets including the cut(s) therein from the cutting station to the stripping location, wherein the system-controller further regulates behavior of the cutting station by updating the cutting sequence in response to detect an extent of stripping-error(s) in post-stripping substrate sheets.

In some embodiments, in response to a higher extent-of-error(s) in post-stripping substrate sheet(s), the system-controller: i. prevents the post-stripping substrate sheet(s) having the higher extent-of-error(s) in post-stripping substrate sheet(s) from being supplied to or stacked by the stacker; and/or ii. causes the cutting station to return to an earlier location in the cutting sequence and to proceed to cut subsequent sheet(s) according to the sequence starting from the earlier location.

In some embodiments, the system further comprises: e. a stripping-assembly-controller configured to dynamically update operating parameter(s) of the stripping assembly in response to differences between (i) properties of earlier substrate; and (ii) properties of later substrate.

In some embodiments, the system further comprises: the operating-parameter(s) include at least one (or both of) of a rotation-speed and an elevation of the rotation axis above the substrate plane at the stripping location.

In some embodiments, after handling a thinner (thicker) sheet of substrate, the stripping-assembly-controller responds to an incoming thicker (thinner) sheet of substrate by causing the stripping assembly to (i) reduce (increase) a vertical displacement between the rotation axis and the substrate plane and/or (ii) to increase (reduce) a rotation-speed.

In some embodiments, after handling sheet of substrate characterized by smaller (larger) internal-waste portion(s), the stripping-assembly-controller responds to an incoming sheet of substrate by characterized by larger (smaller) internal-waste portion(s), by causing the stripping assembly to (i) reduce (increase) a vertical displacement between the rotation axis and the substrate plane and/or (ii) to reduce (increase) a rotation-speed.

In some embodiments, after handling substrate sheet of a first material, the stripping-assembly-controller responds to an incoming substrate sheet of a second material by modifying operating parameter(s) of the stripping assembly.

An apparatus for stripping away portions of a substrate comprises: a. first and second stripping assemblies, each stripping assembly including a respective group of flexible and/or soft impact-element(s) that are respectively and rotatably mounted to a respective rotation-axis, the first and second stripping assemblies respectively defining first and second stripping-locations thereunder; b. a substrate handling arrangement adapted to (i) deliver substrate to the first stripping location so that substrate is maintained at a first substrate-plane when at the first stripping location; and (ii) subsequently deliver substrate from the first to the second stripping location so that the substrate is maintained at a second substrate-plane when located at the second stripping location; and c. one or more drive system(s), the drive system(s) configured to respectively drive rotational motion, at first and second rotation-rates, of the flexible and/or soft impact-element(s) of the first and second stripping assemblies around their respective rotation-axes, wherein the stripping assemblies, substrate-handling system and drive-system(s) are configured so that i. rotation of the flexible and/or soft impact-element(s) of the first stripping assembly around a rotation axis thereof causes the flexible and/or soft impact-element(s) thereof to repeatedly reach the first substrate-plane to repeatedly collide with substrate simultaneously disposed at the first stripping location and at the first substrate-plane, thereby stripping away first portion(s) of the substrate; ii. rotation of the flexible and/or soft impact-element(s) of the second stripping assembly around a rotation axis thereof causes the flexible and/or soft impact-element(s) thereof to repeatedly reach the second substrate-plane to repeatedly collide with substrate simultaneously disposed at the second stripping location and at the second substrate-plane, thereby stripping away second portion(s) of the substrate after the first portion(s) have been stripped away, wherein the drive system(s) operates so that the second rotation-rate exceeds the first rotation rate.

In some embodiments, a ratio between the second and first rotation rates is at least 1.1 or at least 1.25 or at least 1.5 or at least 2 or at least 3 or at least 5 or at least 7.5 or at least 10 or at least 20.

In some embodiments, collisions between flexible and/or soft impact-element(s) of the first and second stripping assemblies respectively transfer downward momentum to substrate respectively at the first and second stripping location such that a ratio between (i) an average per-collision momentum-magnitude transferred to substrate at the first stripping location and the first substrate-plane and (ii) an average per-collision momentum-momentum transferred to substrate at the second stripping location and the second substrate-plane, is at least 1.1 or at least 1.25 or at least 1.5 or at least 2 or at least 3 or at least 5 or at least 7.5 or at least 10.

In some embodiments, a ratio between a maximum mass of impact element(s) of the first stripping assembly and a maximum mass of impact element(s) of the second stripping assembly is at least 1.1 or at least 1.25 or at least 1.5 or at least 2 or at least 3 or at least 5 or at least 7.5 or at least 10.

In some embodiments, a ratio between an average mass of impact element(s) of the first stripping assembly and an average mass of impact element(s) of the second stripping assembly is at least 1.1 or at least 1.25 or at least 1.5 or at least 2 or at least 3 or at least 5 or at least 7.5 or at least 10.

In some embodiments, the apparatus further comprises: d. an inspection system configured to analyze post-stripping substrate; and/or e. a controller configured to control substrate handling arrangement so that the delivery of substrate from the first to the second stripping location is conditional upon output of the inspection system.

In some embodiments, the apparatus further comprises: d. an inspection system configured to analyze post-stripping substrate to detect stripping error(s); and/or e. a controller configured to control substrate handling arrangement so that the delivery of substrate from the first to the second stripping location is conditional upon a level of the stripping error(s) exceeding a error-threshold.

In some embodiments, a Shore D hardness of the impact element is between 60 and 90.

An apparatus for stripping away portions of a substrate comprises: (a) a substrate handling arrangement adapted to horizontally support a flat, thin substrate so as to define a substrate-plane; and (b) a first and second stripping assemblies, each stripping assembly including a respective flexible impact-element and a rotation-drive positioned and configured to rotate the flexible impact-element around a rotation-axis so as to repeatedly drive a peripheral portion of the impact-element across the substrate-plane, wherein the first and second stripping elements are disposed on opposite sides of the substrate plane so that during operation when substrate is present on the substrate plane: i. an impact element of the first stripping assembly collides with the substrate so as to rotate a portion of the substrate out of the substrate plane so that the rotated potion is partially dislodged from of the remaining substrate portion; and ii. subsequently, an impact element of the second stripping assembly completely disengages the partially dislodged rotation portion of substrate from the remaining substrate portion.

An apparatus for stripping away portions of a substrate comprises: a substrate handling arrangement adapted to horizontally support a flat, thin substrate so as to define a substrate-plane; and (b) a first and second stripping assemblies, each stripping assembly including a respective flexible impact-element and a rotation-drive configured to respectively rotate the flexible impact-element around a respective rotation-axis, the first stripping assembly situated so that the rotation drive thereof repeatedly drives a peripheral portion of the impact-element across the substrate-plane, wherein the first and second stripping elements are disposed on opposite sides of the substrate plane so that during operation when substrate is present on the substrate plane: i. an impact element of the first stripping assembly collides with the substrate so as to rotate a portion of the substrate out of the substrate plane so that the rotated potion is partially dislodged from of the remaining substrate portion and ii. subsequently, an impact element of the second stripping assembly completely disengage the partially dislodged rotation portion of substrate from the remaining substrate portion.

In some embodiments, the rotation drives of the first and second stripping assemblies rotate respective impacts-elements thereof in opposite directions.

In some embodiments, the second stripping assembly is configured and situated so that the impact element of the second stripping assembly collides with the remaining substrate portion or with the partially dislodged portion so as to completely disengage the partially dislodged rotation portion of substrate from the remaining substrate portion.

An apparatus for stripping away portions of a substrate, the apparatus comprising: a. a substrate handling arrangement adapted to horizontally support a flat, thin substrate so as to define a substrate-plane; and (b) a stripping assembly including at least one flexible and/or soft impact-element and a rotation-drive positioned and configured to rotate the flexible impact-element around a rotation-axis so as repeatedly drive a peripheral portion of the impact-element across the substrate-plane.

In some embodiments, the substrate-handling arrangement is further configured to horizontally propel the supported substrate along a substrate movement direction.

In some embodiments, i. in the absence of rotational motion, for at least one configuration, the impact element sags under its own weight; and ii. rotation-drive sufficiently rotates impact-element so as to fully extent the impact element to eliminate the sag.

An apparatus for stripping away portions (e.g. partially cut portions) of a substrate comprises: a. a substrate handling arrangement adapted to horizontally support a flat, thin substrate so as to define a substrate-plane; and b. a first stripping assembly, positioned on one side of said substrate plane, including at least one flexible and/or soft impact-element and a rotation-drive positioned and configured to rotate the flexible impact-element around a rotation-axis so as repeatedly drive a peripheral portion of the impact-element across the substrate-plane; c. a second stripping assembly, positioned on a second side of said substrate plane, opposite to said one side of said substrate plane, including at least one flexible and/or soft impact-element and a rotation-drive positioned and configured to rotate the flexible impact-element around a rotation-axis, in a direction opposite to the direction of rotation of the first stripping assembly, so as repeatedly drive a peripheral portion of the impact-element across at least one of: (i) the substrate plane and (ii) a neighboring plane that is parallel to the substrate-plane and situated on the second side thereof.

In some embodiments, the neighboring plane is vertically displaced from the substrate plane by at most 2 cm, or at most 1 cm, or at most 5 mm, or at most 3 mm, or at most 1 mm.

Some embodiments relate to a method of mechanically stripping away a portion of a substrate, the substrate having first and second surfaces that respectively face away from each other to first and second sides of the substrate. In some embodiments, the method comprises a. applying a first force to the first substrate surface so as to partially dislodge a completely-inner piece of the substrate by rotating, in a rotation direction, the completely-inner piece around a pivot-location via which the partially-dislodged piece remains attached to the remaining substrate; and b. subsequently and in a region-of-space that is on the second side of the remaining substrate, applying a second force upon the partially-dislodged substrate on the first substrate surface thereof to completely strip away the partially-dislodged piece of substrate from the remaining substrate.

In some embodiments, the first force and the second force are respectively applied by first and second impact-elements that are distinct from each other.

In some embodiments, respective contact locations of the first and second impact elements that respectively apply the first and second force are not rigidly attached to each other.

In some embodiments, during an entirety of a force-relevant time-period that begins upon commencement of application of the first force and ends upon completion of application of the second force, a impact-element:substrate contact-location of the second impact-element remains in the region-of-space on the second side of the remaining substrate.

In some embodiments, the first contact element remains disengaged from the substrate when the second impact element applies the second force.

In some embodiments, the first and/or second contact element is an elongate contact element that radially extends from rotation axis around which the first and/or second contact element respectively rotates.

In some embodiments, the first and/or second elements is a flap that respectively rotates around a respective axis.

In some embodiments, the first and second elements are each flaps that respectively rotate around first and second rotation axes, the first and second rotation elements being respectively disposed on first and second sides of the remaining-substrate.

In some embodiments, a ratio between: a. a displacement between the first and second rotation axes in a direction perpendicular to a local plane of the substrate; and ii. a square root of an area of the completely-inner piece of substrate that is stripped away from the remaining substrate, is at least 1 or at least 1.5 or at least 2.

In some embodiments, the first and/or second rotation axis is substantially parallel to a local plane of the substrate In some embodiments, application of the first force by the first impact element bends the first impact element.

In some embodiments, for the first and/or second impact element: i. when the impact element is stationary, for at least one orientation, the impact element sags under its own weight; and ii. centrifugal force of the rotating of the flexible and/or soft impact element(s) causes the impact element to fully extend so as to eliminate the sag.

In some embodiments, a Shore D hardness of the first and/or second impact element is between 60 and 90

In some embodiments, the first and second forces are respectively applied in first and second collision events that are distinct from each other.

In some embodiments, application of the second force to the partially-dislodged substrate applies a torque thereto around the pivot-location in a torque-direction having a component along the rotation-direction of the first force.

In some embodiments, before application of the first force, the substrate is mechanically weakened and/or pre-cut and a boundary between the stripped away completely-inner piece of substrate and the remaining substrate is defined by the contour of the mechanical weakening and/or pre-cutting.

In some embodiments, (i) immediately before application of the first force, the completely-inner piece of substrate and the remaining substrate are held to each other by individual fibers and/or by static friction and/or by mechanical locking and (ii) impact(s) by the impact element(s) provides sufficient force so as to completely strip away the completely-inner piece of substrate from the remaining substrate In some embodiments, a direction of the first force is non-perpendicular to a local plane of the substrate where the first force is applied, an angle between a direction of the first force and the perpendicular of the local plane being at least 10 degrees.

In some embodiments, a direction of the first force is non-parallel to a local plane of the substrate where the first force is applied, an angle between a direction of the first force and the local plane being at least 10 degrees.

A method for stripping away portions of a substrate comprises: at a time when a locally-flat, thin substrate is supported to define a substrate plane: rotating at least one flexible and/or soft impact element(s) around a rotation axis on a first side of the substrate so as to repeatedly cause a peripheral portion of the impact element to collide with the substrate, wherein: i. for each of at least some of the collisions between the impact element and the substrate strip, the impact element crosses the substrate plane to partially dislodge or strip away a respective completely-inner piece from the substrate; ii. the method is performed so that the flexible and/or soft impact element undergoes only partial rotation and repeatedly changes rotation-direction at least twice between subsequent collisions.

In some embodiments, a majority of the collisions between the impact element and the substrate do not subject the substrate to substrate-separations and/or for a majority of collisions the impact element remains on the first side of the substrate without completely or partially dislodging portions of substrate.

In some embodiments, relative to the rotation axis, the substrate is in horizontal motion (e.g. at a constant horizontal velocity of at least 10 cm/sec or at least 25 cm/sec or at least 50 cm/sec) along the substrate plane when each collision between the impact element and the substrate occurs.

A method of mechanically stripping away a portion of a substrate, the substrate having first and second surfaces that respectively face away from each other to first and second sides of the substrate, the method comprising: for each impact element of an array of one or more flexible and/or soft impact-elements, repeatedly rotating the flexible and/or soft impact element around a rotation axis so as to repeatedly collide a peripheral portion of the impact element with the first surface of the substrate so that: a. each collision transfers momentum of the substrate; b. for a first subset of the collisions, the entire impact element remains on the first side of the substrate so that the peripheral portion moves across the first surface without partially or completely separating any of the substrate; and c. for a second subset of the collisions, momentum of the collision partially dislodges a piece of the substrate and/or strips away a piece of the substrate so as to open an orifice through the substrate so the peripheral portion of the impact element passes through the orifice from the first side of the substrate to the second side thereof.

In some embodiments, i. each impact element of the array is continuously and simultaneously, for at least x cycles, rotated at a repetition rate of at least y Hz so that during each cycle the impact element collides with the substrate from the first side thereof; ii. a value of x is at least 100 or at least 500 or at least 1,000; iii. a value of y is at least 20, or at least 50, or at least 75, or at least 100 or at least 200 or at least 300 or at least 500.

In some embodiments, the array of impact-elements comprises at least 2 or at least 3 or at least 5 impact elements disposed around the rotation axis.

In some embodiments, the impact element(s) are elongate impact elements that radial extend from the rotation axis.

In some embodiments, each rotation cycle is a full rotation cycle (i.e. where the impact element rotates in a single direction) In some embodiments, each rotation cycle is a partial rotation cycle where the impact element changes rotation direction during the partial rotation cycle—i.e. back-and-forth motion. For example, the impact elements repeatedly changes rotation direction.

In some embodiments, the impact elements are mounted (e.g. to a chassis of the substrate handling system) and/or the impact elements are suspended above substrate plane.

In some embodiments, performed when the rotation axis and the substrate are in relative motion—i.e. relative horizontal motion.

A substrate handling system comprises: a. a first conveyer system comprising a first plurality of parallel strips laterally spaced from each other and mounted over a first plurality of rollers, a set of needles protruding from each of the strips so that substrate horizontally resting on the ends of the needles is horizontally transported by rotational motion of the strips over the rollers; and b. a second conveyer system comprising a second plurality of parallel strips laterally spaced from each other and mounted over a second plurality of rollers, the second conveyer system lacking needles protruding from the strips, and first and second conveyer system configured so that substrate is: i. horizontally transported on the first conveyer system while the substrate rests on the needles; ii. subsequently is transferred from the first conveyer system to the second conveyer system; and iii. horizontally transported on the first conveyer system while the substrate rests (e.g. directly) on the second conveyer system.

In some embodiments, the system further comprises c. a cutting station mounted above or below the first conveyer system; and d. a stripping station of any preceding claim mounted above or below the second conveyer system.

In some embodiments, the stripping occurs to a portion of substrate in motion (e.g. horizontal motion driven by the substrate handling system) at a linear velocity (i.e. either absolute velocity or relative velocity relative to any rotation axis) of at least 3 mm/sec or at least 10 mm/sec or at least 100 mm/sec or at least 1,000 mm/sec or at least 5,000 mm/sec or at least 10,000 mm/sec.

In some embodiments, a width of any impact element is at most 5 mm or at most 3 mm or at most 2 mm.

Some embodiments relate to a method of mechanically stripping away a portion of a substrate, the substrate having first and second surfaces that respectively face away from each other to first and second sides of the substrate. In some embodiments, the method comprises: for a first impact-element array of at least 10 (or at least 20 or at least 30) distinct flexible and/or soft impact elements, simultaneously maintaining every impact element of the impact-element array in continuous complete or partial rotational motion at a rotation rate of at least z RPM (a value of z is at least 10) so that peripheral portion of each flexible and/or soft impact element repeatedly collides with the first surface of the substrate so that: a. for a first subset of the collisions, the entire impact element remains on the first side of the substrate so that the peripheral portion moves across the first surface without partially or completely separating any of the substrate; and b. for a second subset of the collisions, momentum of the collision partially dislodges a piece of the substrate and/or strips away a piece of the substrate so as to open an orifice through the substrate so the peripheral portion of the impact element passes through the orifice from the first side of the substrate to the second side thereof.

In some embodiments, for every impact element of the array, both a thickness and a width thereof is at most 5 mm or at most 4 mm or at most 3 mm.

In some embodiments, each impact element of the impact-element array rotates around a common rotation axis In some embodiments, every impact element of the impact-element array is simultaneously maintained in continuous complete or partial rotational motion at a rotation rate of at least z RPM for at least 1 minute or at least 5 minutes or at least 10 minutes or at least 30 minutes.

In some embodiments, a value of z is at least is 25 rotations per minute or at least 50 rotations per minute or at 75 rotations per minute or at least 100 rotations per minute or at least 200 rotations per minute or at least 300 rotations per minute or at least 500 rotations per minute or at least 700 rotations per minute or at least 1000.

In some embodiments, a gap distance between neighboring impact-elements of the first impact-element array is at most 1 mm or at most 0.5 mm or at most 0.3 mm.

In some embodiments, a thickness of each impact element of the first impact-array in a lateral direction is at most 5 mm, and the impact elements cover every 1 cm portion along a 15 cm lateral axis.

In some embodiments, the method further comprises" for a second impact-element array of at least 10 (or at least 20 or at least 30) distinct flexible and/or soft impact elements, simultaneously maintaining every impact element of the impact-element array in continuous complete or partial rotational motion at a rotation rate of at least w RPM (a value of w is at least 10) so that peripheral portion of each flexible and/or soft impact element repeatedly collides with the second surface of the substrate so that: a. for a first subset of the collisions of the second impact-element array, the entire impact element remains on the second side of the substrate so that the peripheral portion moves across the second surface without partially or completely separating any of the substrate; and b. for a second subset of the collisions of the second impact-element array, momentum of the collision completely strips away partially-dislodges substrate that was partially dislodged by a collision between an impact element of the first impact-element array.

In some embodiments, every impact element of the impact-element array is simultaneously maintained in continuous complete or partial rotational motion at a rotation rate of at least w RPM for at least 1 minute or at least 5 minutes or at least 10 minutes or at least 30 minutes.

In some embodiments, a value of w is at least is 25 rotations per minute or at least 50 rotations per minute or at 75 rotations per minute or at least 100 rotations per minute or at least 200 rotations per minute or at least 300 rotations per minute or at least 500 rotations per minute or at least 700 rotations per minute or at least 1000 rotations per minute.

In some embodiments, the substrate is based on cellulose fibers.

In some embodiments, the substrate selected from the group consisting of paper, cardboard, paperboard, and pulp-based materials.

BRIEF DESCRIPTION OF THE DRAWINGS

FIGS. 2C, 2H and 2I illustrate single layers of substrate comprising waste region(s) and substrate-retained region(s) separated from each other by cut(s).

FIGS. 4A-4C and 8A-8C are schematic side-views of and second rotation-based stripping assemblies.

FIGS. 7A-7B illustrate an impact element immediately before contact with the substrate plane, upon contact/crossing with the substrate plane and immediately after crossing substrate plane.

FIGS. 10A-10B illustrate substrate is supported by an array of laterally separated strips or straps

FIGS. 15A-15C, 16 and 17A-17B relate to technique where a stripping assembly is transitioned from engage mode to disengage mode and from disengage mode to engage mode by modifying a height thereof.

FIG. 18 illustrate back-and-forth partial rotational motion of an impact-element.

FIG. 29 is a specific example illustrating 9 cutting patterns.

FIGS. 30A-30F describe an example of error-free stripping.

FIGS. 31A-31H describe an example of recovery from stripping error(s).

DETAILED DESCRIPTION OF EMBODIMENTS

Figure 1A:
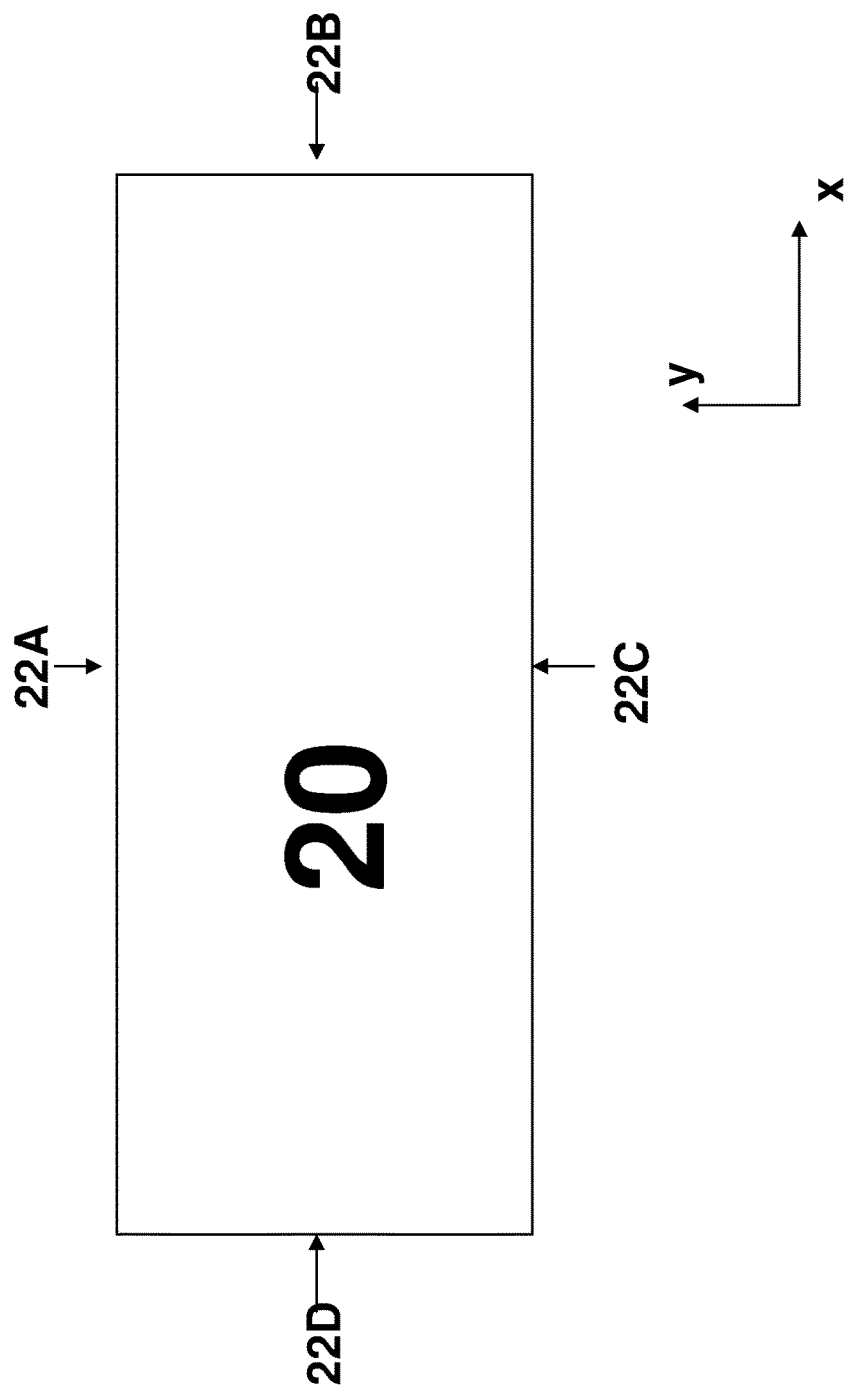
FIG. 1A (prior-art) illustrates a rectangular piece of substrate.

The claims below will be better understood by referring to the present detailed description of example embodiments with reference to the figures. The description, embodiments and figures are not to be taken as limiting the scope of the claims. It should be understood that not every feature is necessary in every implementation. It should also be understood that throughout this disclosure, where a process or method is shown or described, the steps of the method may be performed in any order or simultaneously, unless it is clear from the context that one step depends on another being performed first. As used throughout this application, the word "may" is used in a permissive sense (i.e., meaning "having the potential to"), rather than the mandatory sense (i.e. meaning "must").

A novel stripping process is disclosed herein—although the invention is not limited to embodiments that employ this novel stripping process, the inventors have found that this stripping process, in some embodiments, is particularly useful in high-throughput environments. In some embodiments, during the stripping process one or more soft and/or flexible impact element(s) collide with the substrate—e.g. so that momentum transferred from the impact element(s) to the substrate strips away waste portion(s). For example, the substrate may be stripped while in horizontal-motion. For example, web substrate in-motion caused by rotation of a feeding cylinder may be stripped while in-horizontal-motion or sheet substrate resting on a moving conveyer belt may be stripped as it passes under or over a stripping assembly.

Definitions

For convenience, in the context of the description herein, various terms are presented here. To the extent that definitions are provided, explicitly or implicitly, here or elsewhere in this application, such definitions are understood to be consistent with the usage of the defined terms by those of skill in the pertinent art(s).

Embodiments of the present invention relate to methods and apparatus for stripping away a portion of a 'substrate'.

For the present disclosure, 'substrate' may be sheet-based or web-based. and is typically based on cellulose fibers (e.g. paper such as heavy-duty paper, cardboard, paperboard, pulp-based materials). Substrate is based on cellulose fibers is 'cellulose-fiber-based' substrate. In other embodiments, 'substrate' may refer to thin sheets (or web) of plastic, metal (e.g. metal foil such as aluminum foil), rubber, polyester substrate or any other material known in the art of substrate handling.

The substrate material may be corrugated or uncorrugated.

The term 'cardboard' is a generic term for a heavy-duty paper of various strengths, ranging from a simple arrangement of a single thick sheet of paper to complex configurations featuring multiple corrugated and uncorrugated layers.

Examples include:
Containerboard, used in the production of corrugated fiberboard.
Folding boxboard, made up of multiple layers of chemical and mechanical pulp.
Solid bleached board is made purely from bleached chemical pulp and usually has a mineral or synthetic pigment.
Solid unbleached board is typically made of unbleached chemical pulp.
White lined chipboard is typically made from layers of waste paper or recycled fibers, most often with two to three layers of coating on the top and one layer on the reverse side. Because of its recycled content it will be grey from the inside.
Binder's board, a paperboard used in bookbinding for making hardcovers.

In different embodiments, a thickness of 'substrate' (e.g. a 'thin' substrate) may be at least 0.1 mm or at least 0.5 mm or at least 1 mm or at least 5 mm or at least 1 cm and/or at most 5 cm or at most 3 cm or at most 1 cm or at most 7.5 mm at most 5 mm or at most 3 mm or at most 1 mm or at most 0.5 mm. In one preferred, the thickness is between 4 mm and 9 mm.

In different embodiments, the substrate is such that a ratio between (i) a greater of a length and width of 'substrate' and (i) a thickness of the 'substrate' is at least 10 or at least 50 or at least 100 or at least 500 or at least 1,000 or at least 5,000 or at least 10,000 or at least 50,000 or at least 100,000. Alternatively or additionally, in some embodiments, the substrate is such that a ratio between (i) a lesser of a length and width of 'substrate' and (i) a thickness of the 'substrate' is at least 10 or at least 50 or at least 100 or at least 500 or at least 1,000 or at least 5,000 or at least 10,000 or at least 50,000 or at least 100,000.

In some embodiments, substrate is transported by a substrate handling arrangement—this may include any web or sheet substrate-transport-system (STS) known in the art. For example, the handling arrangement may include a conveyer belt for transporting (e.g. horizontally and/or vertically) sheets of substrate. In different embodiments, the substrate handling arrangement may include any combination of (i) conveyer belt(s); (ii) robotic arm; (iii) a vacuum apparatus (e.g. for lifting substrate such as sheets of substrate); (iv) rotating cylinders; and (v) any other apparatus and/or element known in the art for transporting substrate.

"Electronic circuitry" may include any combination of analog electrical circuitry, digital electrical circuitry, software/executable code module (i.e. stored on a computer-readable medium) and/or firmware and/or hardware element(s) including but not limited to field programmable logic array (FPLA) element(s), hard-wired logic element(s), field programmable gate array (FPGA) element(s), and application-specific integrated circuit (ASIC) element(s). Any instruction set architecture may be used including but not limited to reduced instruction set computer (RISC) architecture and/or complex instruction set computer (CISC) architecture. In some embodiments, a 'controller' may include 'electronic circuitry.'

A 'group' is one or more. By way of example, a 'group' of impact element(s) refers to one or more impact elements.

The term 'stripping apparatus' may refer to any prior art apparatus (e.g. disclosed in any prior art document listed in the 'Background section') and/or may include any feature or combination of feature(s) of such prior art stripping apparatus. Alternatively or additionally (and in some embodiments preferably), the 'stripping apparatus' is provided according to any teaching or combination of teaching(s) disclosed therein—e.g. comprises presently disclosed apparatus and/or apparatus to configure any presently disclosed method. In different embodiments, stripping apparatus comprises one or more stripping 'station(s)' and/or one or more stripping 'assembly(ies).'

Some embodiments relate to 'bonding' between layers of substrate. The term 'bond' is meant to binding, fastening, confining, or holding together adjacent layers of substrate. In different embodiments, the bonding may be chemical, mechanical or any combination thereof.

Discussion of FIGS. 1-36

Embodiments of the present invention relate to a system and method for manufacturing a three-dimensional object from a stack of pre-stripped layers of substrate. Each object layer is formed by (i) providing substrate comprising waste portion(s) and substrate-retained portion(s) that are attached to each other and separated from one another by cut(s) within the substrate; (ii) subsequently, subjecting the subject of each layer to a stripping process which selectively strips away substrate-waste portion(s) from the substrate-retained portion(s). After stripping, the object layer is added to a stack of previously-stacked object layers to grow the stack. This process is repeated to further grow the stack. Object layers of the stack are bonded to each other to build the three-dimensional object therefrom.

Although not a requirement, in some embodiments, it is particularly advantageous to employ one or more (i.e. any combination of) presently-closed technique for stripping away waste portion(s) of substrate. Any feature of combination of feature(s) related to methods and apparatus for stripping disclosed herein may be provided in the context of stripping substrate, subsequently stacking the pre-stripped substrate, and forming a 3D layered object from the stacked substrate.

Figure 2A:
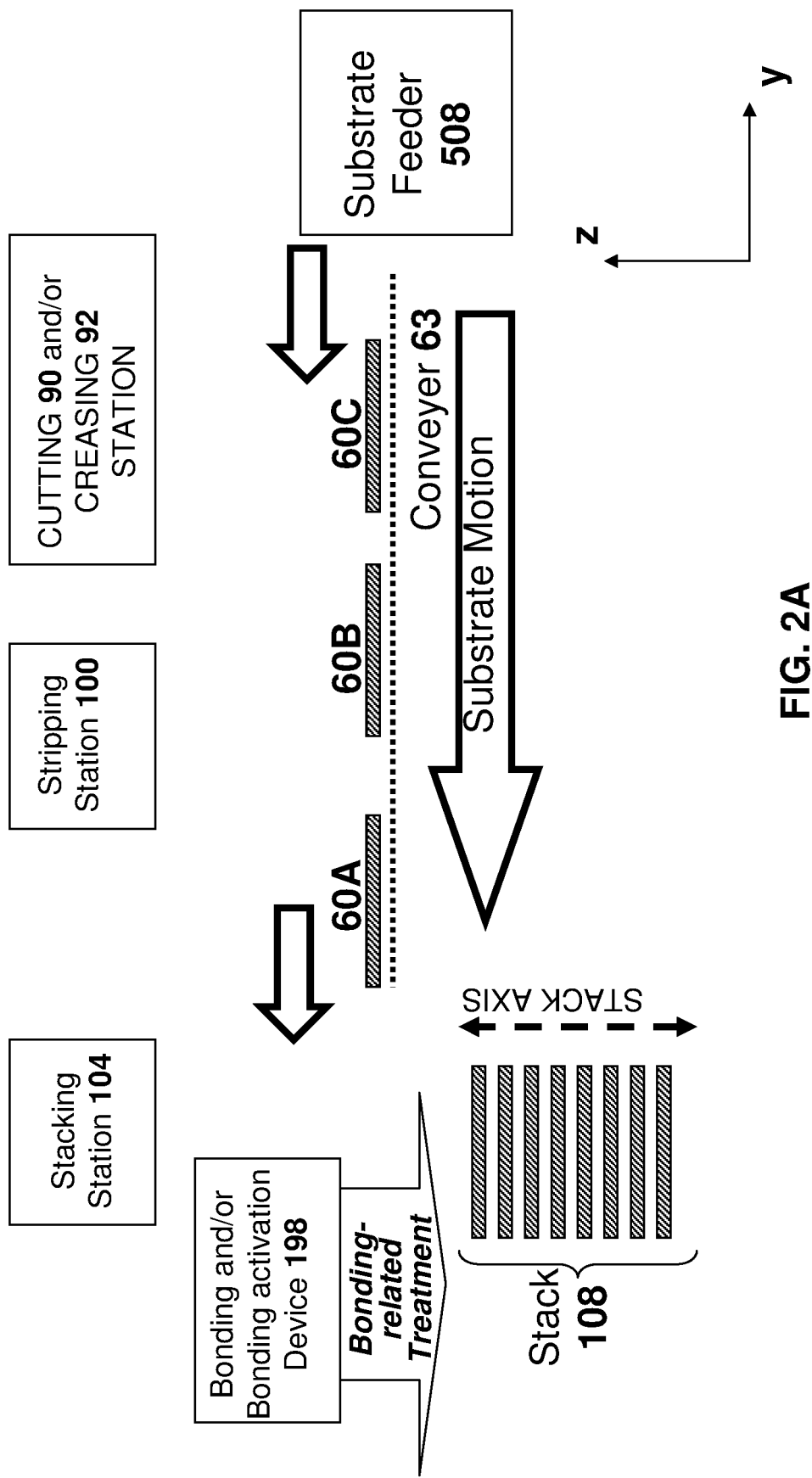
FIG. 2A illustrates a system for additive manufacturing.

For discussing a technique for additive manufacture with reference to FIG. 2A, some general comments about pre-treating (e.g. cutting) substrate are now provided. Once substrate is pre-treated (e.g. cut), waste portion(s) may be subsequently removed therefrom during a stripping process. The 3D-object may be formed by stacking and bonding layers of pre-stripped substrate.

It is known in the art to pre-treat substrate by pre-cutting, partitioning, mechanically-weakening and the like. FIG. 1A (prior-art) illustrates a rectangular piece of substrate 20 having a perimeter 22A-22D.

Figure 1B:
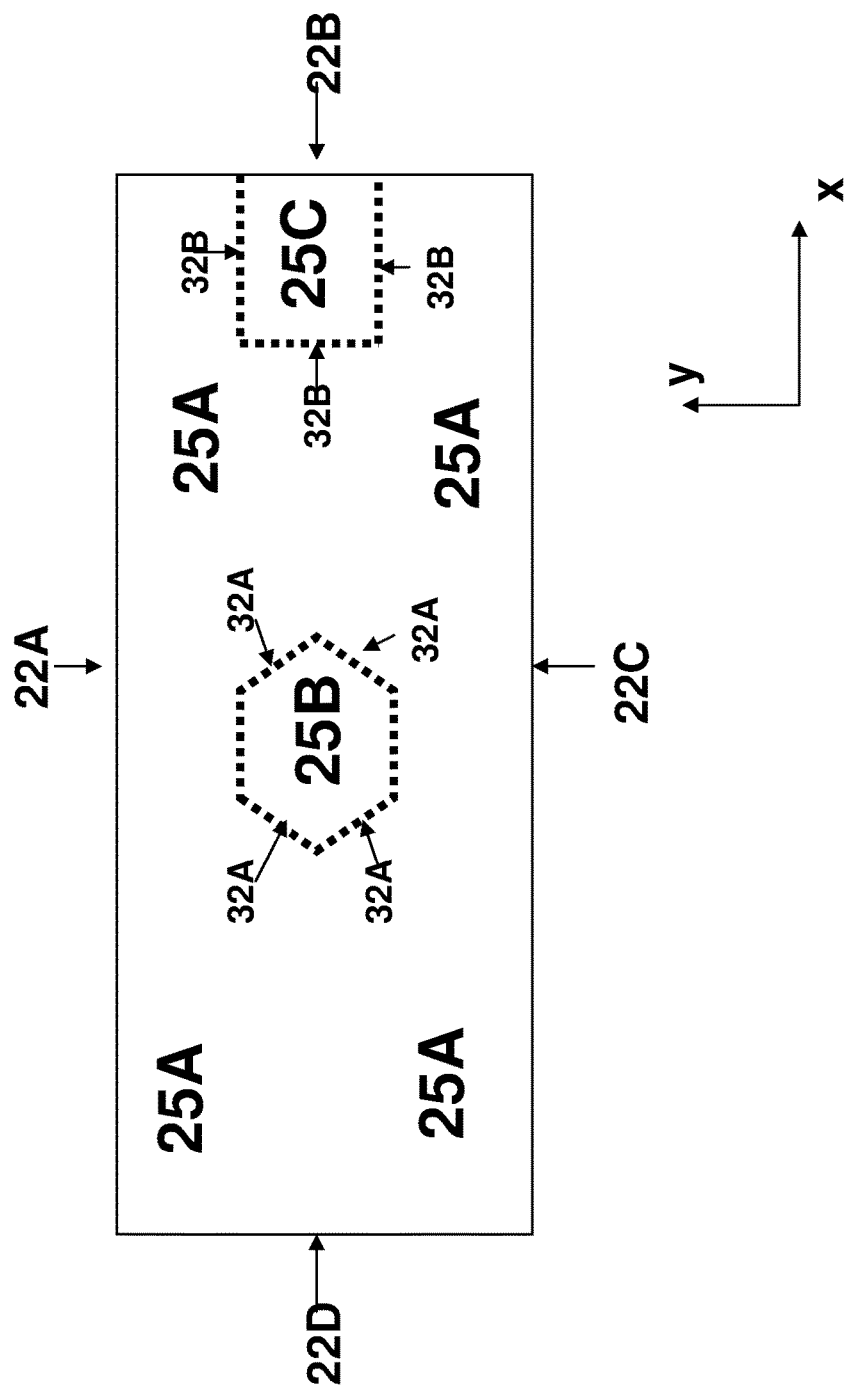
FIG. 1B illustrates cuts within the rectangular piece of substrate.

In FIG. 1B the substrate 20 is partitioned into a main portion 25A, a small 'enclosed' portion 25B (or 'completely inner' portion), and a side portion 25B. In particular, closed curve 32A (in this example, shaped hexagonally) and/or open curve 32B may be a cut or a partition or mechanical weakening. For example, the cut may be a 'full cut' so that the only force or the primary force between enclosed portion 25B (or alternatively side portion 25C) and main portion 25A are individual fibers (e.g. individual 'isolated' micron-sized fibers) or static friction or geometric locking. These are static forces which maintain the enclosed portion 25B (or side portion 25C) engaged to the remaining substrate. It is possible to strip away one portion of the substrate from the other substrate to separate the portions.

For example, if region 25B is stripped away from region 25A, then region 25B is considered a waste portion and region 25A is considered a 'substrate-retained' portion of substrate—these two portions after separated from each other by curt 32A.

After substrate within enclosed portion 25B is stripped away, a void replaces substrate within enclosed portion 25B—this void is referred to an 'substrate-enclosed void' or simply a 'enclosed void.'

Embodiments relate to stripping of substrate—e.g. laser cut or die-cut substrate (pre-creased or not precreased).

Embodiments of the invention relate to subjecting layers of substrate to a 'lamination process' to form a laminate. For any embodiment disclosed herein, the 'additive manufacturing' may be a lamination process to form a laminate.

Lamination is the technique of manufacturing a material in multiple layers, so that the composite material achieves improved strength, stability, sound insulation, appearance or other properties from the use of differing materials. A laminate is usually permanently assembled by heat, pressure, welding, or adhesives.

Figure 2B:
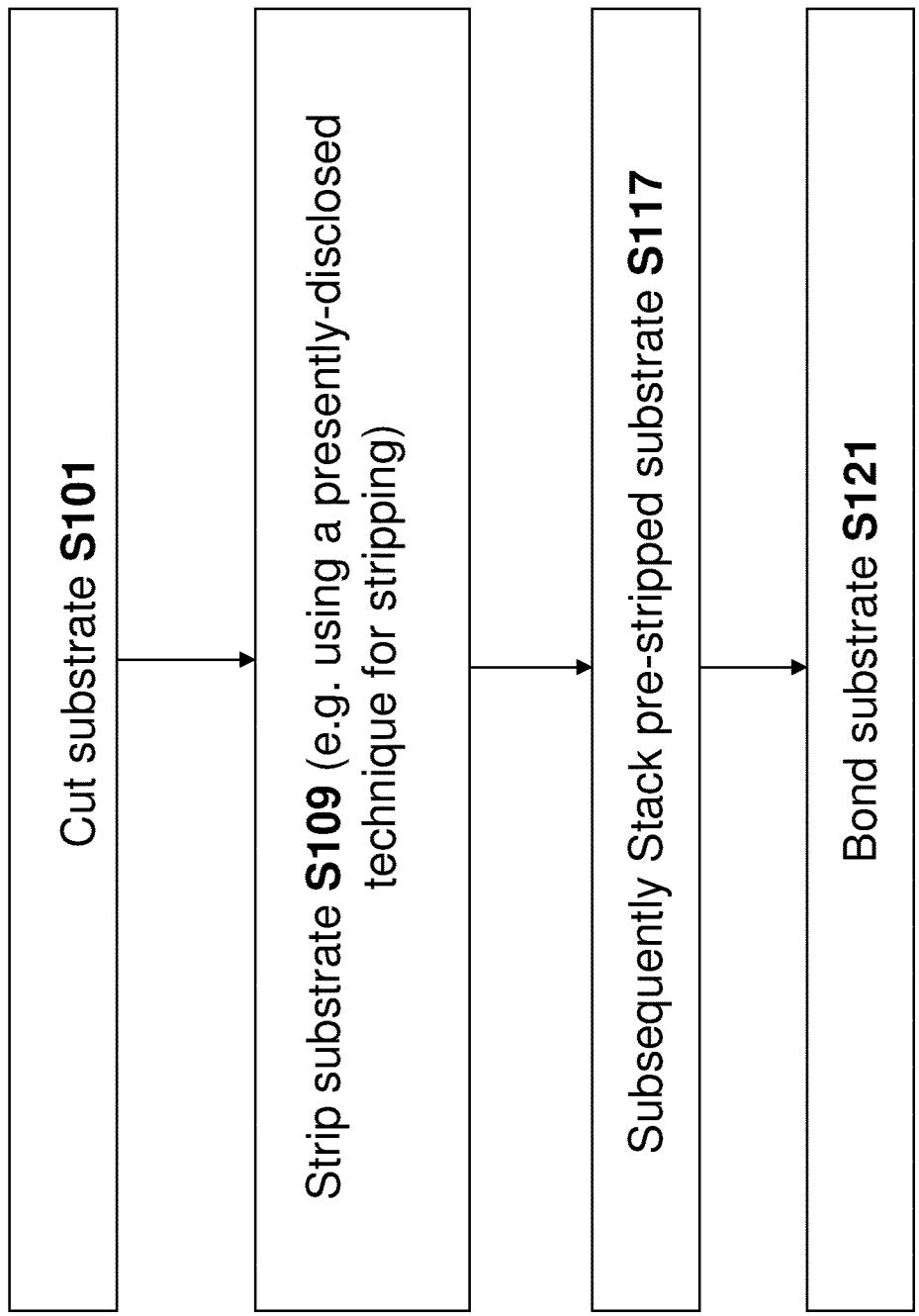
FIG. 2B is a flow-chart of a method for additive manufacturing.
Figure 2D:
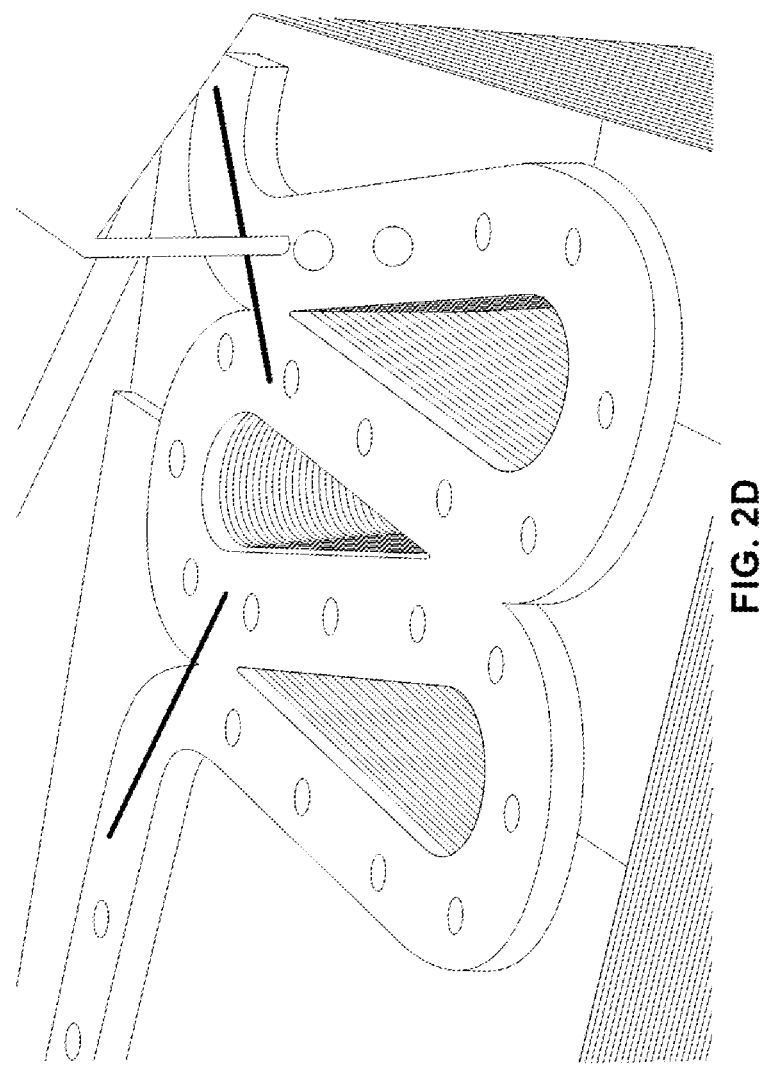
FIGS. 2D-2G are views of a 3D object manufactured by the presently-disclosed technique.
Figure 2E:
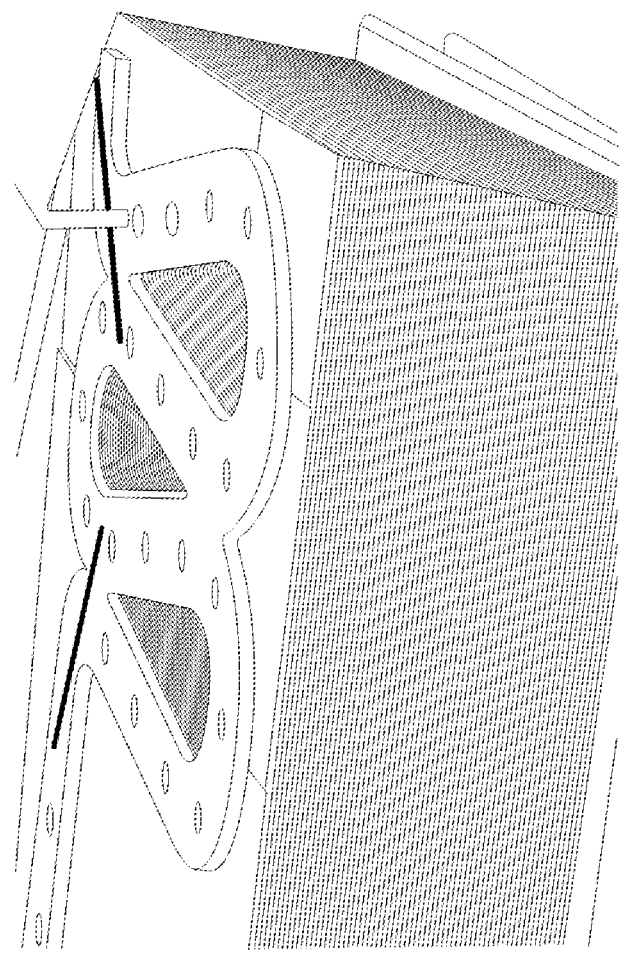
Figure 2F:
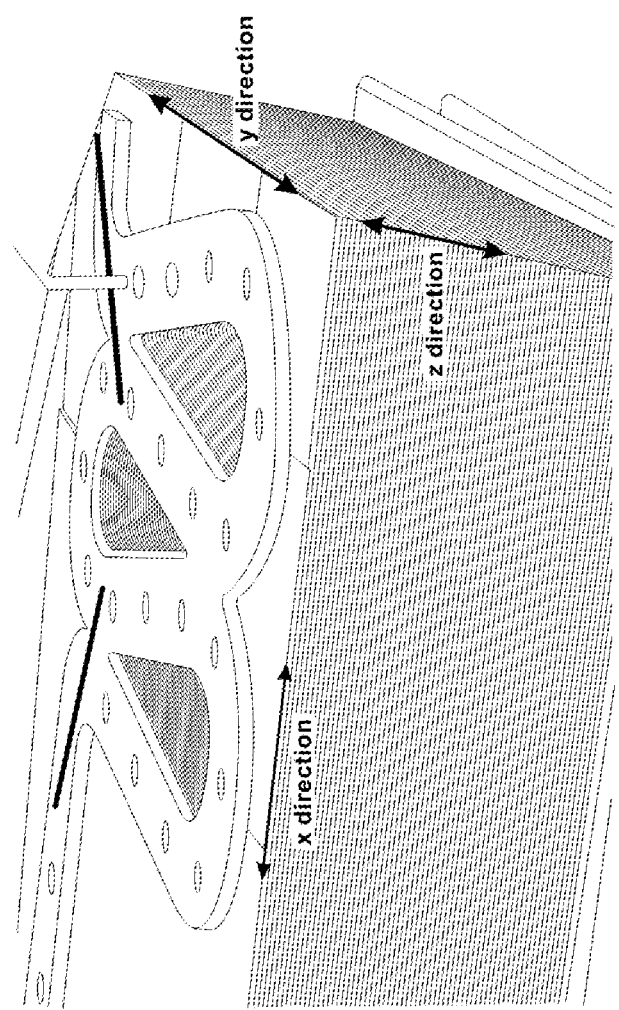
Figure 2G:
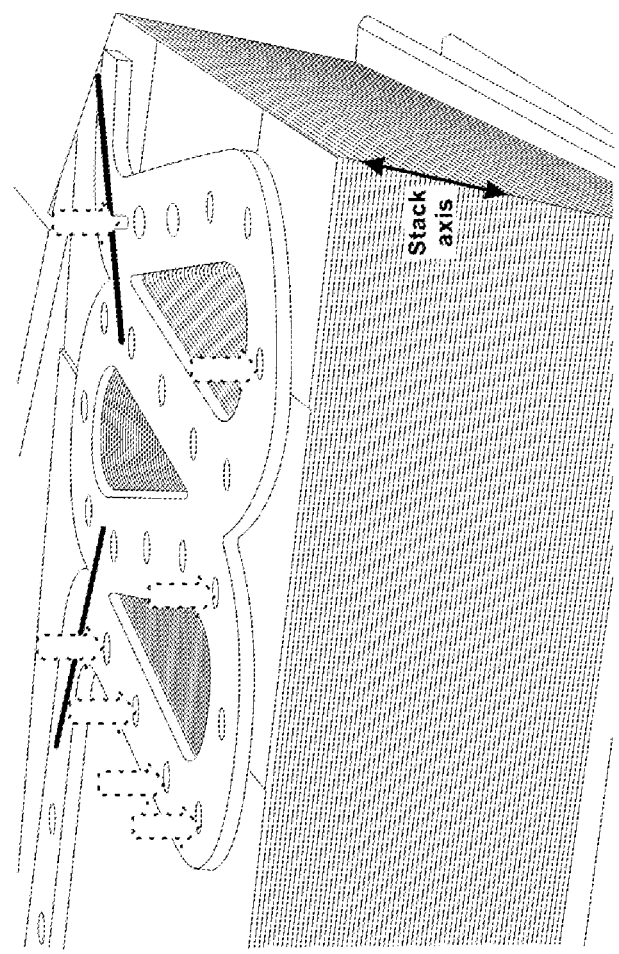

FIG. 2A is a schematic diagram of a system for additive manufacture—FIG. 2B is a flow-chart of a related method.

As illustrated in FIG. 2A, the system comprises: (A) a cutting 90 and/or creasing 92 station (B) a stripping station 100 (C) a stacking station 104, and (D) a bonding and/or bonding activation device 198. In some embodiments, the stripping station 100 is horizontally displaced from the stacking station 104. In some embodiments, the stripping station 100 is horizontally displaced from the cutting 90 and/or creasing 92 station.

As illustrated in FIG. 2A, substrate 60 is conveyed between the stations on a conveyer system 63 (e.g. comprising a belt). The post-stripping substrate may be stacked at stacking station 104 to form a stack 108 of substrate. As illustrated in FIG. 26B, the order of the steps may be first cutting S101, then stripping S109 and then stacking S117. In any embodiment discussed herein, post-stripping substrate may be aggregated into a stack 108, for example, at a stacking station 104. As noted above, during or after stacking, the stacked substrate (i.e. object-layers formed from substrate) is bonded in step S121 to form the 3D object.

In some embodiments, one or more (i.e. any combination of) presently-disclosed 'stripping-related' teachings are employed in step S109.

Also illustrated in FIG. 2A is the 'stack axis' which is parallel to the z-axis.

As will be noted below, the bonding may be performed concomitant with the stacking, and/or subsequent thereto. For example, one or both sides of substrate or portion(s) thereto may be treated with or coated with an adhesive material—this material may be active or inactive and activatable under certain conditions. In some embodiments, upon stacking the layer immediately bonds with an adjacent layer—e.g. due to the presence of the adhesive material on the stacked layer and/or the adjacent layer. Alternatively, the bonding may be delayed.

Optional bonding and/or bonding activation device 198 treats the stack, or one or more layer(s) thereof, in a manner that facilitates bonding between object-layers. In some embodiments, device 198 may provide heat and/or pressure and/or radiation (e.g. UV light). Alternatively or additionally, device 198 may deliver a mechanical fastener to mechanically bond layers to together. In one example related to heat, a hot gas (e.g. air) is delivered (e.g. blown) to the stack. In one example related to pressure, a roller device and/or a press delivers pressure.

In some embodiments, device 198 is useful for activating an adhesive material. One example relates to temperature-sensitive adhesive material may—in this example, device 198 delivers heat may be provided to activate the adhesive. In another example, UV curing to a material causes adjacent layers to bond. In yet another example, a chemical material may activate inactive adhesive material. Thus, in some embodiments, device 198 may be operative to deliver a chemical 'activating agent'—e.g. by pouring or providing a stream of pressurized fluid or in any other manner.

In some embodiments, the stacked substrate from which the 3D object is built is homogeneous with respect to substrate-material and/or substrate-thickness and/or cutting or stripping patterns in a single layer of substrate. Alternatively, the stacked substrate from which the 3D object is built may be heterogeneous with respect to substrate-material (see FIG. 21A) and/or substrate-thickness (see FIG. 21B) and/or cutting or stripping patterns in a single layer of substrate (see FIG. 21C).

In another example, discussed below, the stacking forms one or more canals along a stack-axis of the stacked substrate. Adhesive material (e.g. 'flowable' material such as liquid or powder) may be automatically or manually introduced (e.g. by pouring) into the canal—thus, in some embodiments, device 198 may be operative to deliver the adhesive material (e.g. in an active or inactive form)—e.g. by pouring or providing a stream of pressurized fluid or in any other manner.

FIG. 2C is an example of a substrate (e.g. sheet of substrate or portion of a substrate web) including the following enclosed regions: 5A-5U, and 5X-5Y. The substrate includes four edges 8A-8D. The following regions of substrate border one or more of the edges: 5V and 5W. In the example of FIG. 2C, cut 6W separates between regions 5V and 5W. Cut 6X separates between regions 5X and 5W. Cut 6Y separates between regions 5Y and 5W. Cut 6Z separates between regions 5Z and 5W.

In some embodiments, a plurality of such substrate layers may be stripped to remove all enclosed regions to form enclosed voids, and stacked (e.g at stacking station 104) so that enclosed voids of each layer vertically line up with each other. Upon stacking, these voids may form a canal along the stacking axis. Active or inactive adhesive material may be introduced into the canal to contribute to bonding (e.g. by pouring in glue). This may play a minor role or the primary role in providing structural integrity of the 3D, or in some embodiments, the structural integrity may be provided primarily as a result of the introduction of the adhesive material into the canal(s).

The resulting 3D objects are illustrated in FIGS. 2D-2G.

In some embodiments, (i) respective cuts around regions 5A-5U are formed; (ii) subsequently, these regions are stripped away; (iii) subsequently cuttings 6A-6Z are formed; (iv) subsequently, regions 5X-5Z are stripped away—this all occurs before stacking.

Thus, in some embodiments, before stacking (i) the substrate is first subjected to a first cutting(s) to define a first set of waste portion(s) (e.g. regions 5A-5U); (ii) the substrate is then subjected to a first stripping process (e.g. according to presently-disclosed teachings) to strip away waste portion(s) of the first set; (iii) the substrate is then subject to a second cutting(s) to define a second set of waste portion(s) (e.g. regions 5X-5Z); (iv) the substrate is then subjected to a stripping process (e.g. according to presently-disclosed teachings) to strip away waste portion(s) of the second. Subsequently, the subject may be stacked to grow the stack and bonded as part of the 3D-object.

Not wishing to be bound by theory, since appropriate operating parameter(s) for 'small' waste portions may differ from those appropriate for 'large' portions, This technique of first cutting, then stripping, then cutting, the stripping again may obviate this difficulty and reduce the number of stripping errors, facilitating a fast-manufacturing process for 3D-objects.

Figure 2H:
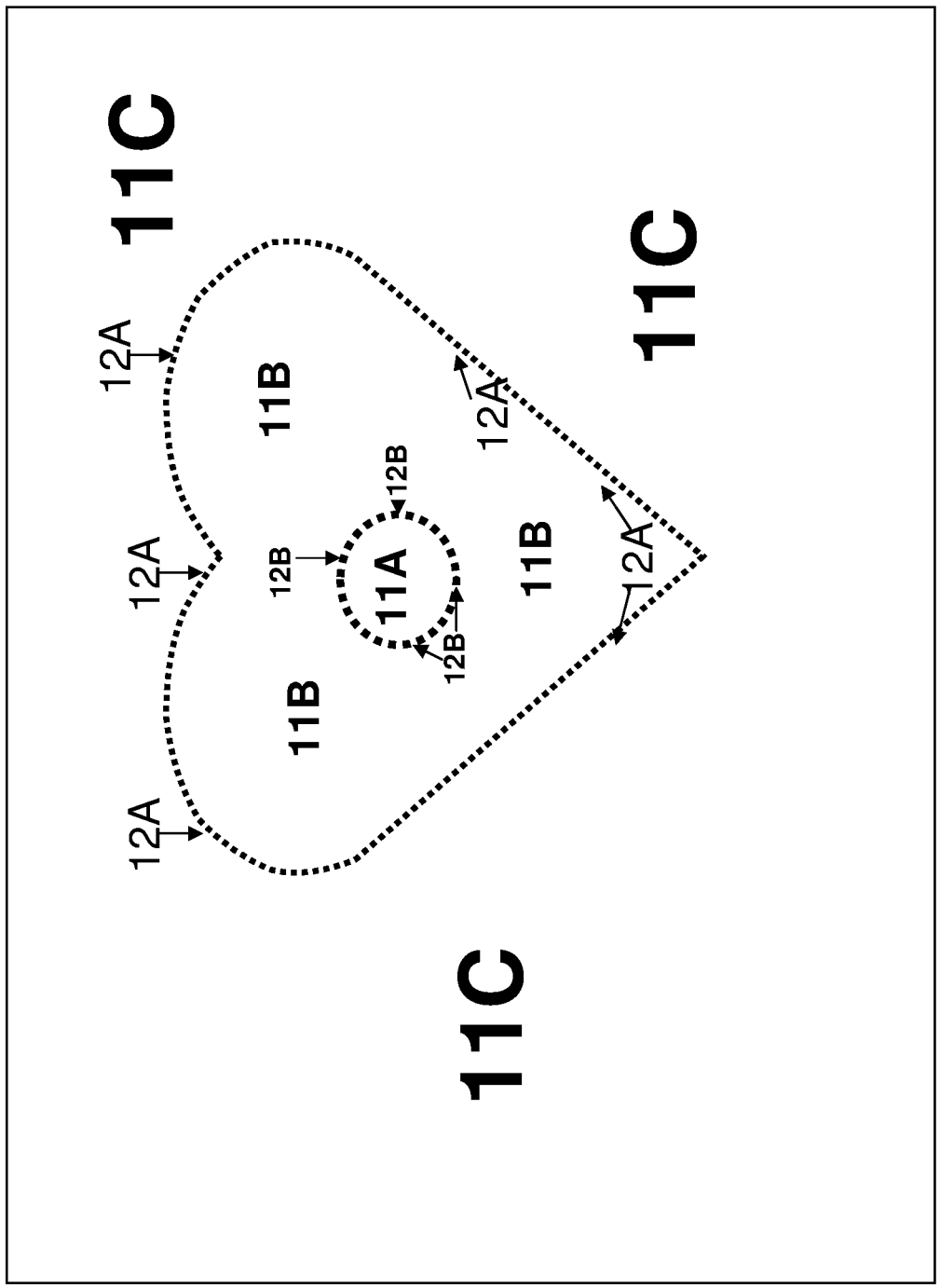

Another example of a single layer of substrate is shown in FIG. 2H where cut 12A separates between regions 11A and 11C and where cut 12B separates between regions 11B and 11C.

In various embodiments, pre-stripped substrate is stacked, and later, bonded to form a 3D object. Thus, the stripping occurs before the stacking. Optionally, an additional stripping process occurs after stacking and optionally after bonding. For example, region 11C may be stripped away so that an outer border of the 3D object is defined by 12A of each layer as stacked.

In some embodiments, region 11C is somewhat 'large' and may be 'difficult' to strip after stacking (and optionally bounding). In order to reduce mechanical resistance encountered by material stripped after stacking (and optional bounding), it is possible to form an alternating pattern of regions shown in FIG. 2I where substrate in the 'darker' region is retained and substrate in the 'lighter' or dotted regions is stripped away (e.g. by any technique disclosed herein) before stacking.

Figure 2I:
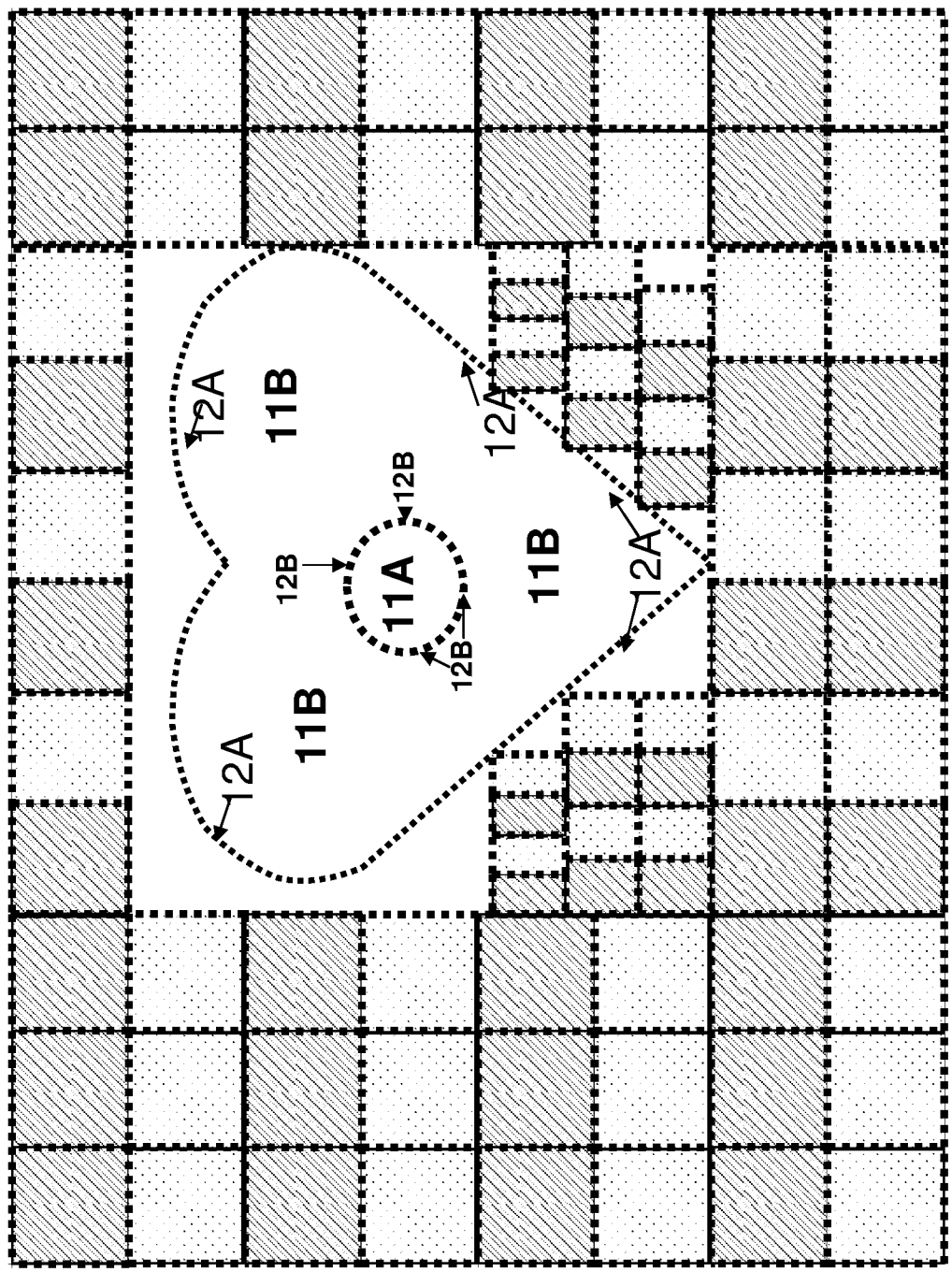

Thus, in some embodiments, the method comprises before the stacking: cutting the substrate to forming a cross-hatch pattern to define a plurality of tiles, stripping away only some of the tiles (e.g. using any stripping apparatus of method presently disclosed) (e.g. to retain an overall structure of the substrate and/or to retain the edge-borders of a sheet of substrate) to mechanically weaken a region of the substrate (i.e. where in the 'region of substrate' some tiles have been stripped away and others have not). Subsequently, after this stripping for 'mechanical', the substrate is stacked (i.e. as an 'object layer'). After stacking, a post-stacking (e.g. post-bonding) process of 'blanking' or stripping away an 'external region' is performed where the 'external region' is the mechanically weakened portion of substrate that was mechanically weakened as a result of the formation of the cross-hatch pattern and the stripping away of only some of the tiles. These tiles are illustrated in FIG. 2I—the 'darker' tiles may be stripped away while the 'lighter' tiles may be stripped away—nevertheless, it is desirable to perform this to retain the shape (e.g. rectangular) of the substrate sheet to retain the edges—thus, in some embodiments, there should be at least a strip of substrate at the edges (e.g. rectangular edges).

Although FIG. 2A illustrates cutting and/or creasing station this is not required—in some embodiments, pre-cut substrate may be used. Thus, in some embodiments, step S101 is not required—instead, pre-cut substrate may be used.

In different embodiments, the additive manufacturing process may be performed to provide one or more (i.e. any combination) of the following future: (i) the 3D object is manufactured from at least 50 or at least 100 or at least 500 or at least 1000 or at least 5000 or at least 10,000 object-layers, a majority of which or all of which have been pre-stripped; (ii) the resulting solid object is a 'laminate'; (iii) the process includes applying at least one of pressure, UV radiation and heat and/or delivering an adhesive material and/or delivering at least one of a polymer adhesive, a water based adhesive and an epoxy adhesive and/or activating an adhesive material and/or welding layers together and/or bonding layers together by sintering; (iv) the resulting layers of the object are 'permanently bonded together' and cannot be separated without destroying the structural integrity of object layers; (v) to bond, adhesive material and/or at least one location on or in the stack is heated to at least 100 degrees Celsius or at least 150 degrees Celsius; (vi) to bond, at least 10 megaPascal (MPa) of pressure or at least 20 MPa of pressure or at least 30 MPa or pressure or pressure or at least 50 MPa of pressure or at least 100 MPa of pressure are applied; (vii) the bonding includes applying pressure and/or heat from a roller (e.g. heated roller); and (viii) the method is performed to generate solid object having a tensile strength of at least 20 MPa or at least 30 mPA or at least 40 MPa or at least 50 Mpa.

A Discussion of Stripping Techniques

A number of presently disclosed stripping techniques are disclosed. In any embodiment, the stripping technique may be practiced in the context of the method described in FIG. 2B. In any embodiment, adhesive material (e.g. inactive) may be present on the substrate surface at a location where impact elements collide with the substrate surface.

Figure 3A:
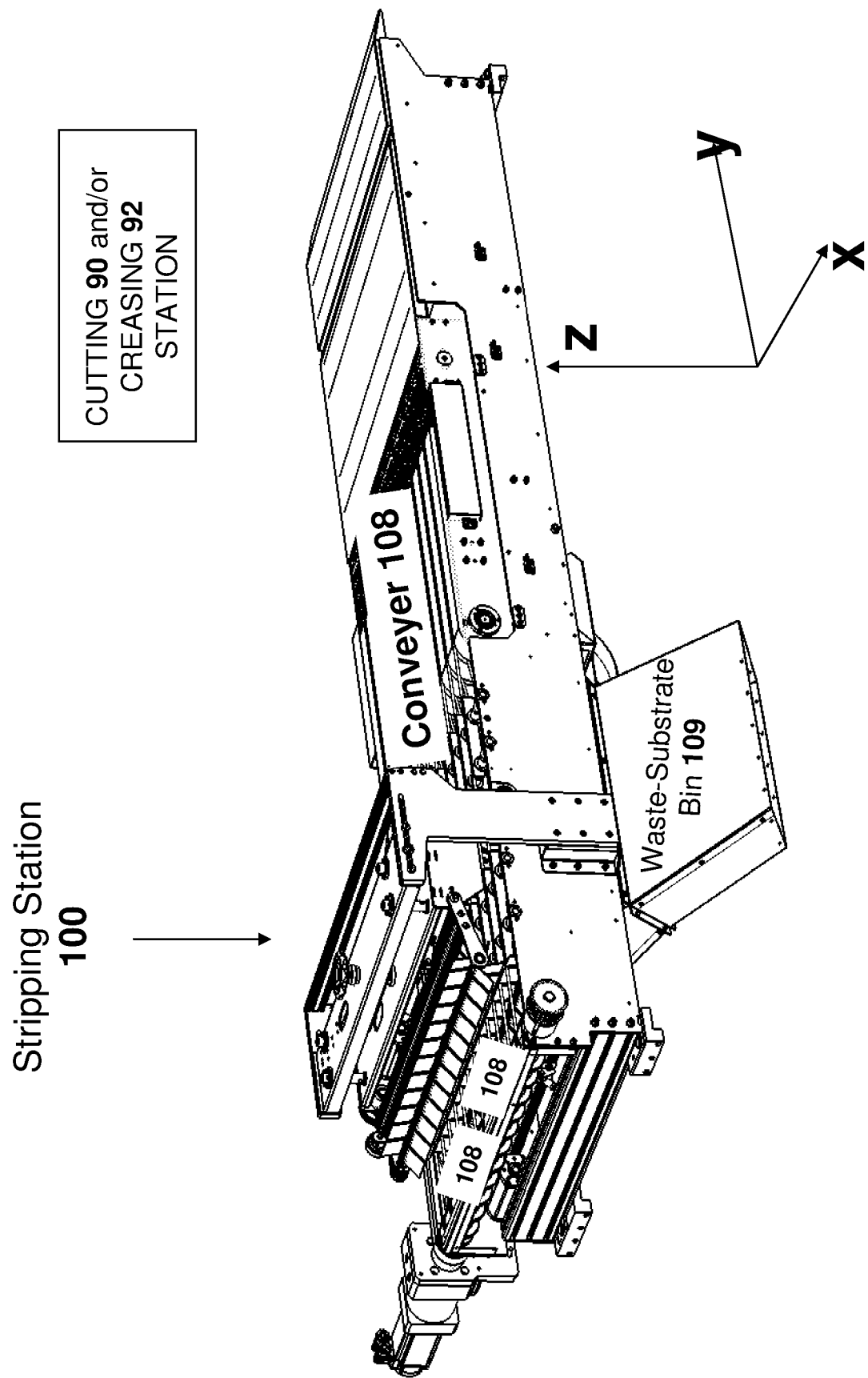
FIG. 3A illustrates a multi-station substrate handling system

FIG. 3A illustrates a multi-station substrate-handling system including cutting 90 (e.g. for making a 'full cut') and/or creasing 92 station (for both only their location is schematically shown in the figure) and stripping station 100 for separating one portion of the substrate from another. A conveyer system 108 (e.g. comprising one or more strips or straps or belts mounted over wheel(s)—e.g. so-called 'endless' strip or strap or belt) or roller(s) may be used to transport the substrate from one station to another, or to move the substrate as it is being cut and/or creased (at station(s) 90 and/or 92) and/or to move the substrate as it is being cut and/or crease and/or subjected to a stripping process to separate one portion of the substrate from another portion of the substrate (e.g. in accordance with a cut or crease curve or line or one-dimensional manifold).

Figure 3B:
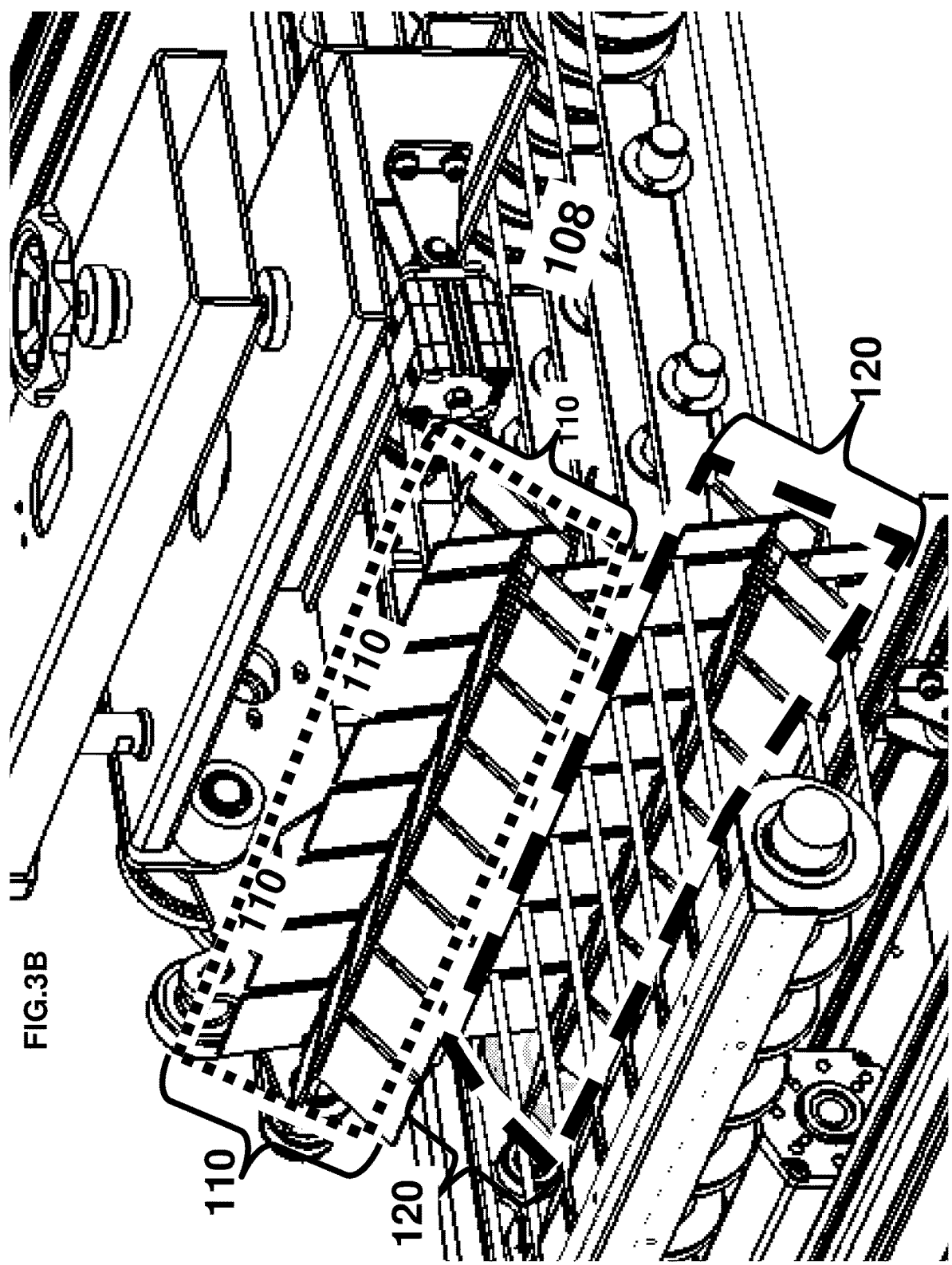
FIG. 3B illustrates a stripping station including a conveyer.

Conveyer 108 is illustrated schematically in FIG. 3B. In some embodiments, the speed of the substrate is synchronized so that the speed (e.g. linear—in FIG. 3A along the y-axis) at which the substrate moves at cutting and/or creasing station matches that at the stripping station.

Optionally stripping station 100 is equipped with a waste substrate bin 109 configured for the disposal of waste resulting from the stripping operation, typically into a designated waste box (not shown).

Thus, without limitation to the context or the figures, some embodiments relate techniques for stripping away portion(s) of substrate while the substrate itself is in motion (e.g. horizontal motion). However, it is appreciated that the motion of the substrate is not necessary, and that the substrate may be subjected to the stripping process while stationary.

The cutting and/or creasing (e.g. at optional cutting and/or creasing station) may be performed according to any technique known in the art including but not limited to laser cutting and standard die-counter-die mechanical cutting.

As illustrated in FIG. 3A, the substrate (not shown in FIG. 3A) is horizontally supported so that the flat-thin substrate defines a 'substrate-plane.' (not labeled in FIG. 2A—labeled as 98 in subsequent figures) For example, the conveyer belt (or strip(s) or strap(s)) may provide this substrate-support functionality.

The term 'conveyer belt' may refer to a single belt or to multiple straps or strips laterally spaced from one another to collectively form a 'conveyer belt.'

FIG. 3B shows a close-up of stripping station 100. In the non-limiting example, first 110 and second 120 rotation-based stripping assemblies respectively rotate around respective rotation axes so as to strip away portion(s) (e.g. 'waste' portion(s) of substrate).

In different embodiments, stripping station 100 and/or first 110 and/or second 120 rotation-based stripping assemblies or any portion thereof are mounted—i.e. above or below the substrate or a substrate plane 98—for example, mounted at a pre-determined location (or range of locations).

The rotation motion (e.g. complete or partial motion) of impact elements of stripping station or any portion thereof may, in some embodiments, be driven by a motor such as an electric motor which functions as a 'rotation drive'. The skilled artisan will appreciate that other propulsion devices other than electric motors may be employed.

Figure 3C:
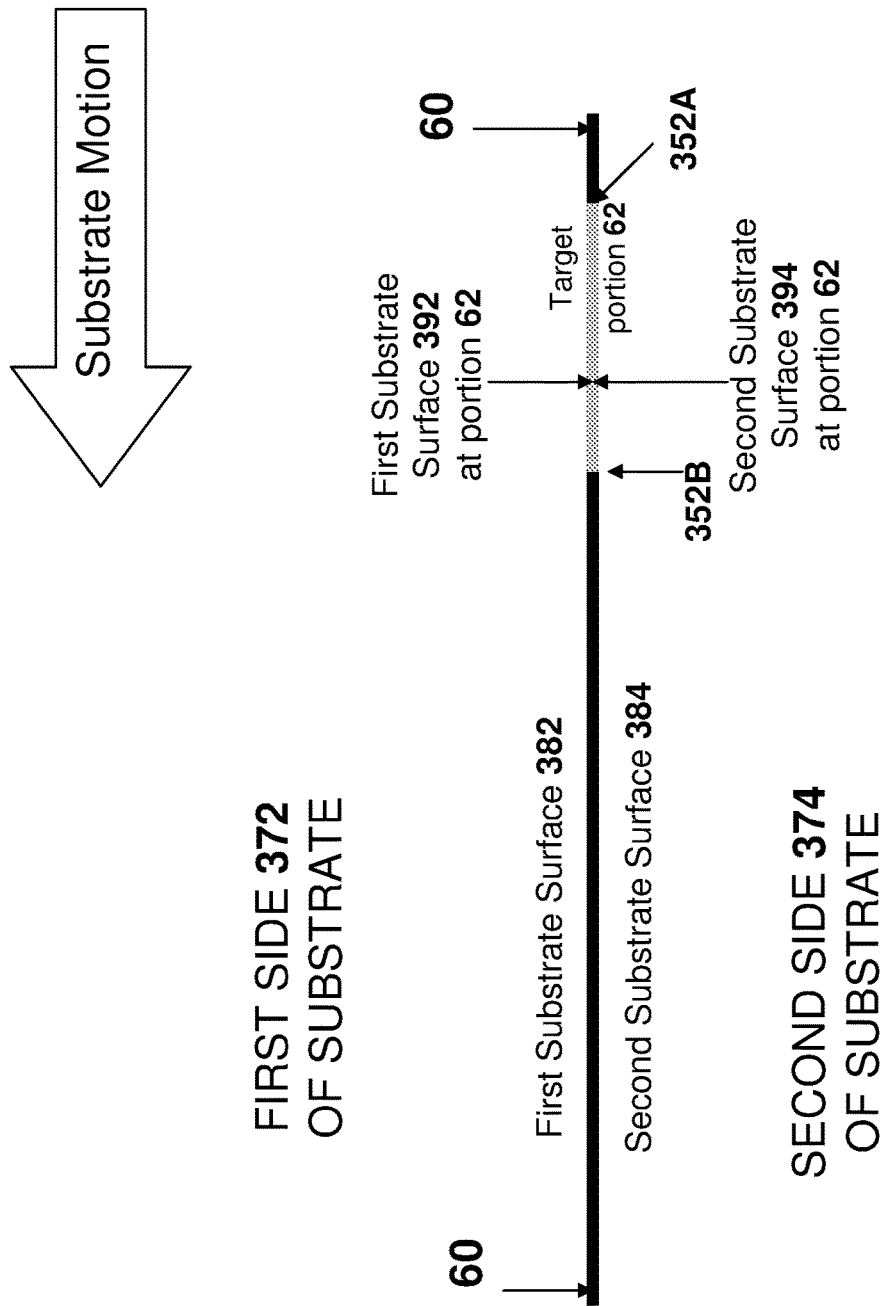
FIG. 3C is a side-view of substrate to be subjected to a stripping project.

FIG. 3C illustrates the substrate 60 to be stripped. The substrate includes first 382 and second 384 substrate surfaces respectively facing to 372 and second 374 sides of the substrate 60.

Also illustrated in FIG. 3C is a target portion 62 of substrate to be stripped away. The first and second substrate surfaces within target portion 62 are respectively labeled 392 and 394. Before stripping, first 392 and second 394 surfaces of portion 62 respectively face to 372 and second 374 sides of the substrate 60.

In FIG. 3C, the substrate is shown in horizontal motion—e.g. at a velocity of at least 10 cm/sec or at least 25 cm/sec or at least 50 cm/sec or at least 1 meter/sec. The horizontal velocity may be substantially constant and/or sustained for a period of time of at least 10 seconds or at least 30 seconds or at least 1 minute during which the substrate is subjected to stripping. For example, a series of sheets of substrate longitudinally spaced from each other may each be subjected to stripping one-after-another and may move at substantially the same horizontal velocity (e.g. on a conveyer belt or propelled by a web substrate system).

Figure 4A:
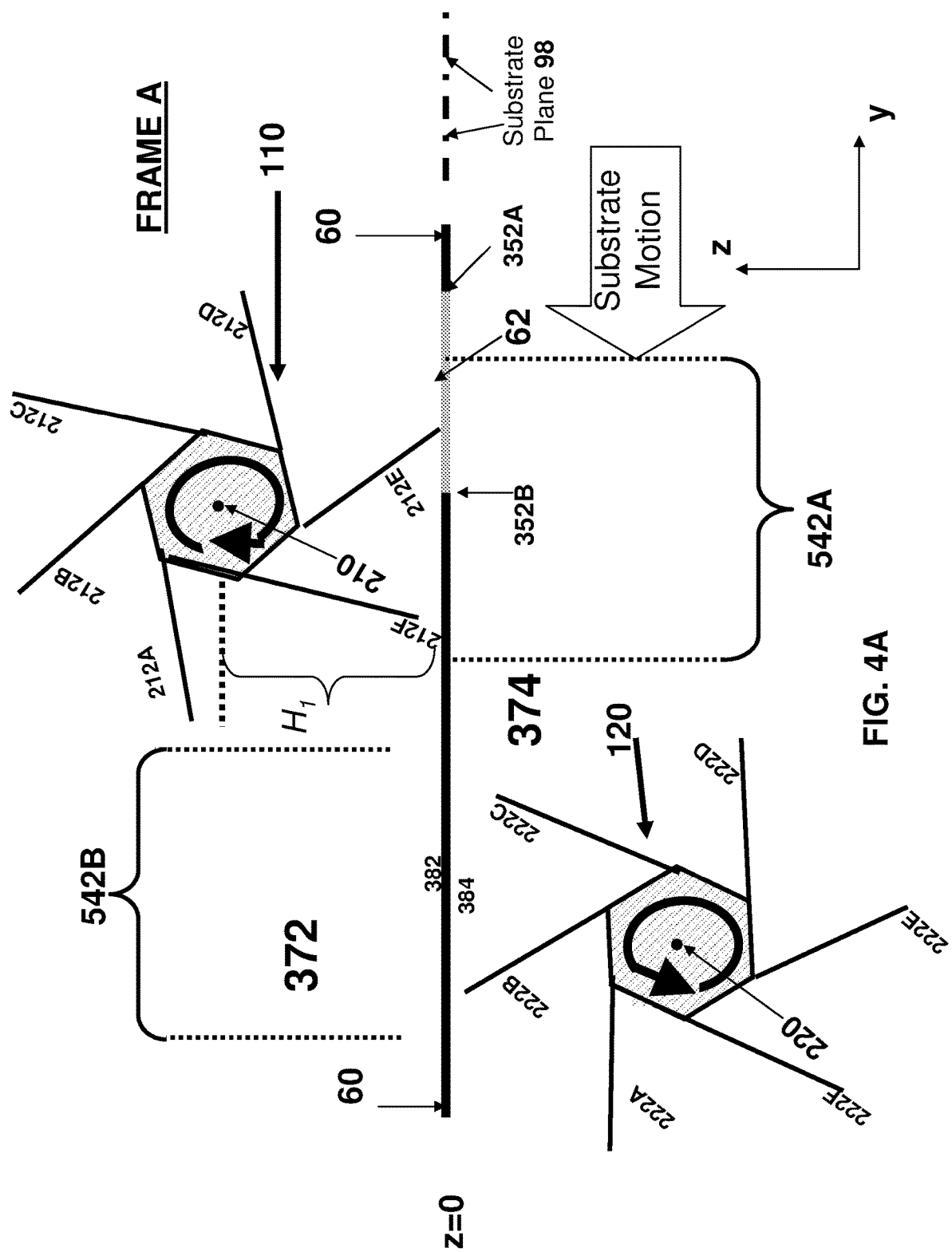
Figure 4B:
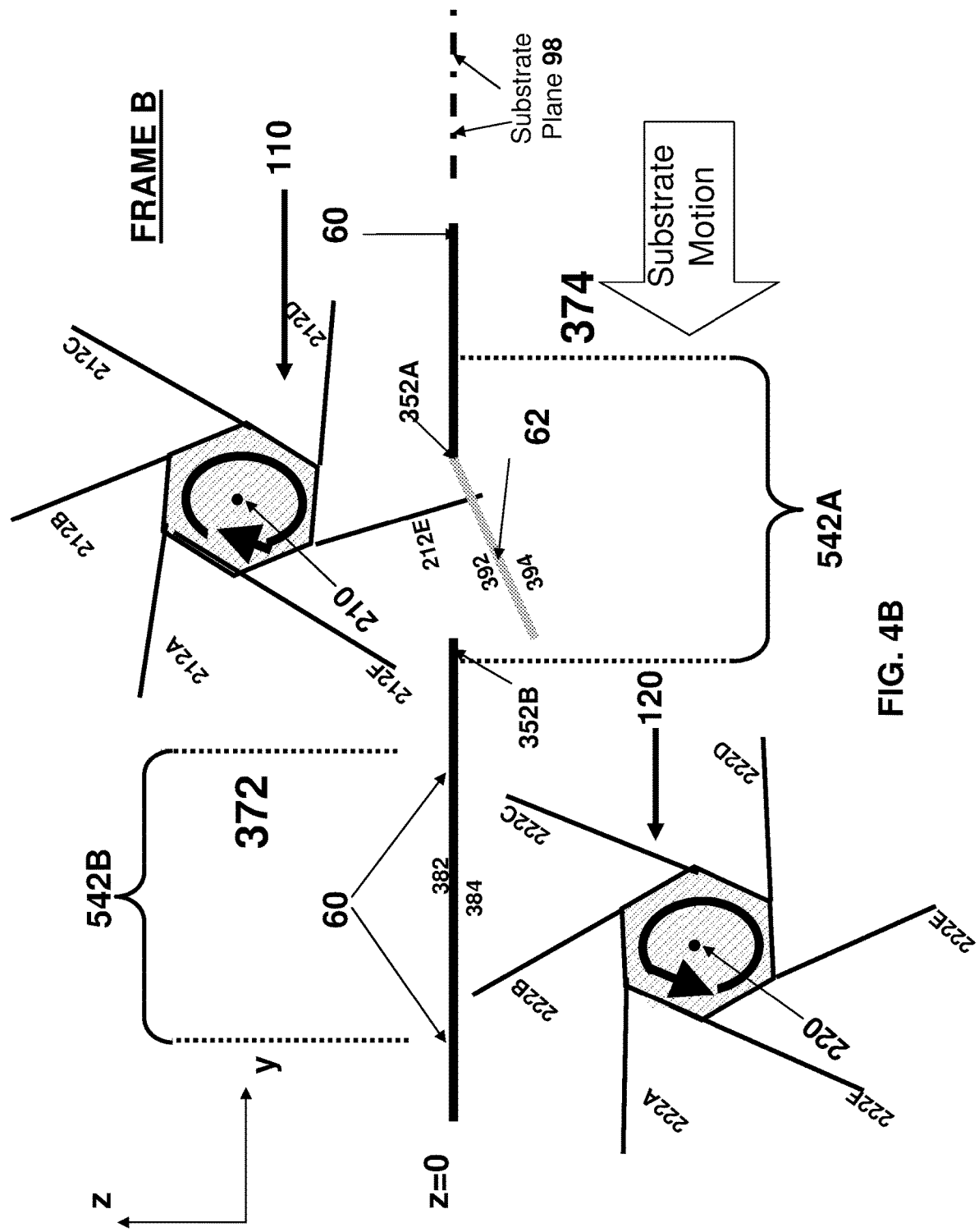
Figure 4C:
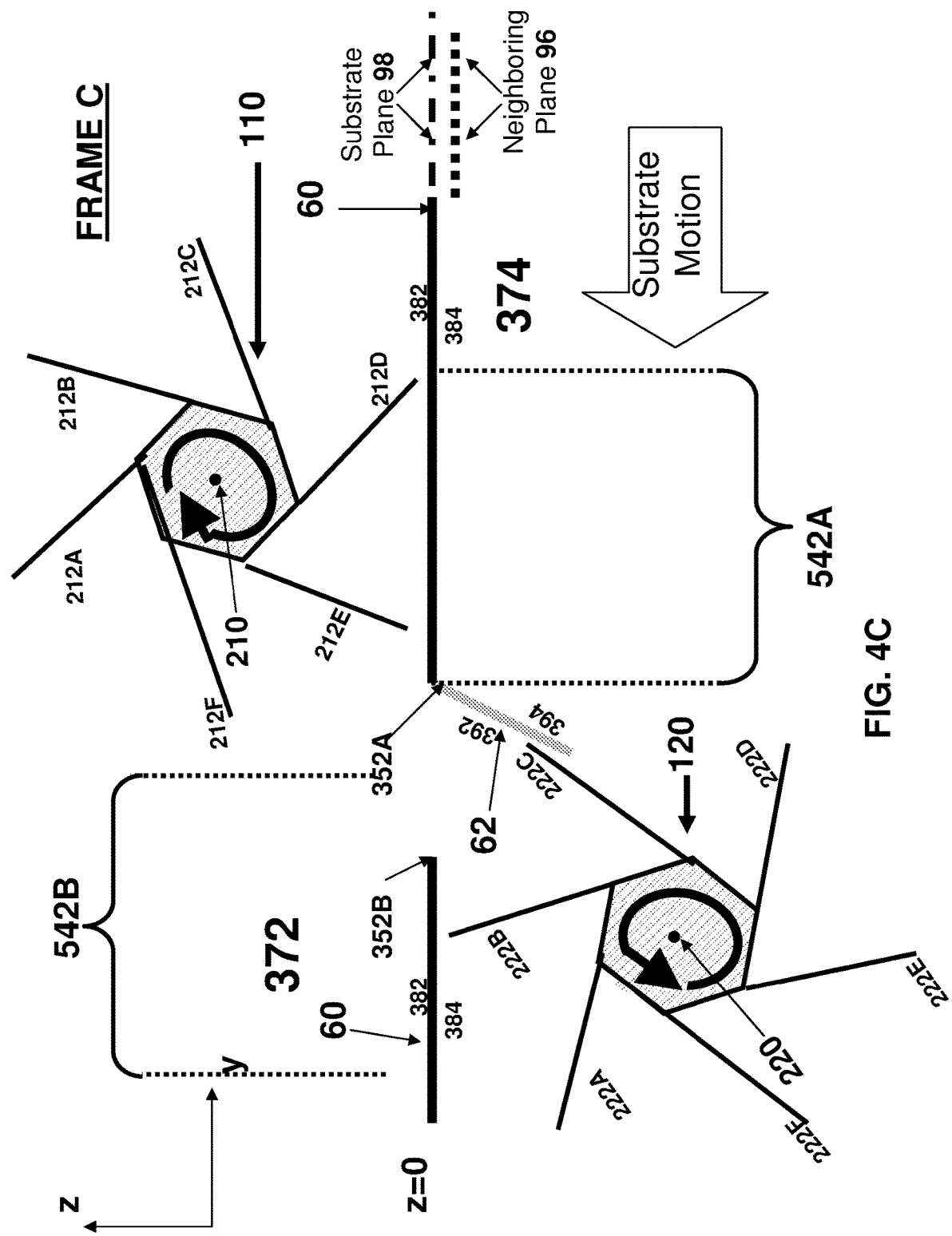

FIGS. 4A-4C are schematic side-views of the first 110 and second 120 rotation-based stripping assemblies stripping away a first portion 62 substrate from a second portion 60 thereof. In particular, FIGS. 4A-4C relate to first second and third 'frames' at different points in time. In the embodiment shown in FIGS. 4A-4C, first stripping assembly is mounted above the substrate 60 (or a plane 98 thereof) at a height $H_1$.

As illustrated in FIGS. 4A-4C, first stripping assembly 110 defines a first rotation axis 210 and second stripping assembly 120 defines a second rotation axis 220. First stripping assembly 110 comprises a first plurality of impact elements 212 (e.g. 'flexible and/or soft impact elements') rotating around a rotation axis 210—e.g. a rotation-drive (NOT SHOWN—e.g. including a motor—for example, an electric motor) cause the rotation of the first plurality of impact elements 212 (e.g. ' flexible and/or soft impact elements') around the rotation axis 210.

One example of an 'impact element' is a flap (see FIGS. 4A-4C)—for the present disclosure, whenever an 'impact element' is mentioned, it is to be understood that in some embodiments, the impact element may be a flap.

In some embodiments, during a time of any type of collision the impact element (e.g. flap) may be dragged along a surface of substrate—these 'types' of collision may include collisions where the impact element (e.g. flap(s)) remains on one side of the substrate, or collisions where the flap (e.g. impact element) partially dislodges substrate or collisions where the flap (e.g. impact element) completely strips away substrate.

Second stripping assembly 120 comprises a second plurality of impact elements 222 (e.g. ' flexible and/or soft impact elements') rotating around a rotation axis 220—e.g. a rotation-drive (NOT SHOWN—e.g. including a motor for example an electric motor) cause the rotation of the second plurality of impact elements 222 (e.g. ' flexible and/or soft impact elements') around the rotation axis 220.

In some embodiments, at least one of first stripping assembly 110 and/or second stripping assembly 120 is situated above the substrate plane. In some embodiments, at least one of first stripping assembly 110 and/or second stripping assembly 120 is situated below the substrate plane.

When impact element 212 partially dislodges and/or completely strips away a piece of substrate, a peripheral portion (e.g. a tip) of the impact-element 212 (crosses the substrate plane defined by substrate 60—e.g. to open an orifice in the substrate. Momentum transferred by the impact-element 212 facilitates stripping of substrate portion 62 from portion 60. For example, the momentum from impact-element(s) of a single stripping assembly 110 may be sufficient to fully separate substrate portion 62 from portion 60.

Thus, in some embodiments, only one of first stripping assembly 110 and second stripping assembly 120 is present—either above the substrate plane or below the substrate plane.

In some embodiments, second 120 rotation-based stripping assembly operates so that a peripheral portion of the impact-element 222 crosses substrate plane 98. For example, rotation drive (for example, a motor such as an electric motor—NOT SHOWN) of second 120 rotation-based stripping assembly may repeatedly drive a peripheral portion of impact element 222 into contact with and/or across substrate plane 98. Alternatively, in some embodiments, second 120 rotation-based stripping assembly operates so that no portion of any impact element 222 ever crosses or ever contacts substrate plane 98.

In some embodiments, rotation drive (for example, a motor such as an electric motor—NOT SHOWN) of second 120 rotation-based stripping assembly may repeatedly drive a peripheral portion of impact element 222 across a neighboring plane 96 that is close to substrate plane 98—i.e. displaced therefrom by at most 1 cm or at most 5 mm or at most 3 mm or at most 1 mm.

In some embodiments, second 120 rotation-based stripping assembly operates so that no portion of any impact element 222 ever crosses substrate plane 98.

In some embodiments, a cross-section of the peripheral element as it crosses the substrate plane is at most 5 mm$^2$ or at most 4 mm$^2$ or at most 3.5 mm$^2$. In some embodiments, the impact element 212 is formed of a material (e.g. polyurethane or another polymer) having a material density of at most 4 gm/cm$^3$ or at most 3 gm/cm$^3$ or at most 2.5 gm/cm$^3$ or at most 2 gm/cm$^3$ or at most 1.5 gm/cm$^3$.

In some embodiments, a radial distance between the peripheral portion (e.g. a tip) and the rotation axe 210 or 220 is at least 1 cm or at least 2 cm or at least 3 cm and/or at most 15 cm or at most 20 cm or at most 5 cm.

In some embodiments, a vertical displacement of a rotation axes 210 and/or 220 from the substrate plane is X and a horizontal displacement between rotation axes Y (i.e. in the y-direction) is Y. For example, a value of X is at least 1 cm or at least 2 cm or at least 3 cm and/or at most 15 cm or at most 20 cm or at most 5 cm.

For example, a value of Y is at least 1 cm or at least 2 cm or at least 3 cm and/or at most 15 cm or at most 20 cm or at most 5 cm.

For example, a ratio Y/X (this can be adjustable in the machine—according to type of substrate, thickness of substrate, or any other parameter or combination thereof) is at least 0.5 or at least 0.75 or at least 1 or at least 1.25 or at least 1.5 and/or at most 2 or at most 1.5 or at most 1.25 or at most 1.

In the example of FIGS. 4A-4C, first 110 stripping assembly may cause substrate portion 62 to rotate out of the substrate plane while remaining attached (e.g. at a 'pivot' location) to substrate portion 60, as schematically shown in FIG. 4B. Second 120 stripping assembly may further rotate portion 62 causing it to be separated from substrate portion 60 so that portion 62 may fall away.

Also illustrated in FIGS. 4A-4B are side views of first 352A and second 352B borders (i.e. at least mechanically weakened) of substrate piece 62.

Furthermore, it is noted that in FIGS. 4A-4B, contact/impact element 212 of stripping assembly 110 is an elongate contact element 212 (e.g. having a relatively 'small' cross section—e.g. at most 100 mm$^2$ or at most 50 mm$^2$ or at most 25 mm$^2$ or at most 10 mm$^2$ or at most 5 mm$^2$) that radially extends from rotation axis 210 around which it rotates. Alternatively or additionally, contact/impact element 222 of stripping assembly 120 is an elongate contact element 222 (e.g. having a relatively 'small' cross section—e.g. at most 100 mm$^2$ or at most 50 mm$^2$ or at most 25 mm$^2$ or at most 10 mm$^2$ or at most 5 mm$^2$) that radially extends from rotation axis 220 around which it rotates.

In different embodiments, for any impact element disclosed herein, a ratio between (i) a length thereof and (ii) a square root of a cross section thereof it at least 10 or at least 20.

It is noted that in contrast with stripping assembly 110 where a peripheral portion of the impact element does, in fact, cross the substrate plane 98, Also illustrated in FIGS. 4A-4C is the concept of a 'stripping location'—the stripping location of stripping assembly 110 is labeled as 542A and the stripping location of stripping assembly 120 is labeled as 542B. The 'stripping location' is the horizontal location where substrate, if placed at a suitable vertical height (e.g. substrate plane 98), will be subjected to collisions with impact element(s) 212 when they rotate around their axis and hence, is location where the stripping assembly 212 may strip away portion(s) of substrate 60.

Thus, in different embodiments, the substrate handling arrangement is adapted to deliver substrate to the 'stripping location 542.' The substrate handling arrangement may also define the substrate plane 98. Thus, in different embodiments, the substrate handling arrangement adapted to deliver substrate to the stripping location so that, at the stripping location, the substrate is maintained at a substrate plane causing the substrate to simultaneously fulfill two conditions: (i) presence at the stripping location and (ii) presence at the substrate plane.

In the non-limiting example where two stripping assemblies 110, 120 are arranged in sequence (e.g. assembly 110 is 'upstream' and assembly 120 is 'downstream'), the substrate plane 98 happen to correspond—it is appreciated that this is not a limitation, and in embodiments each stripping assembly may be associated with it's own suitable height-range for a respective 'substrate plane' depending, for example, on a height of the rotation and length of impact-elements.

Figure 5B:
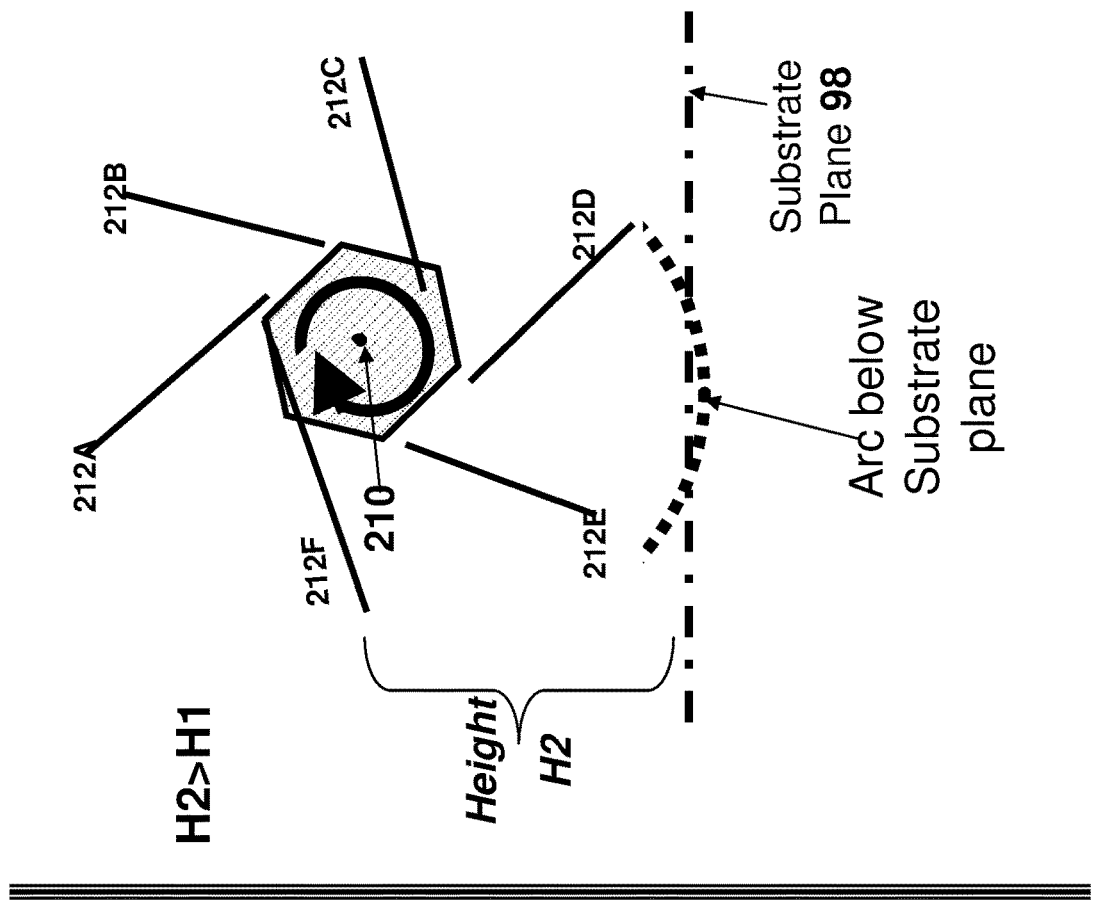
FIGS. 5A-5B illustrates a peripheral portion of an impact element sweeping through an arc.
Figure 5A:
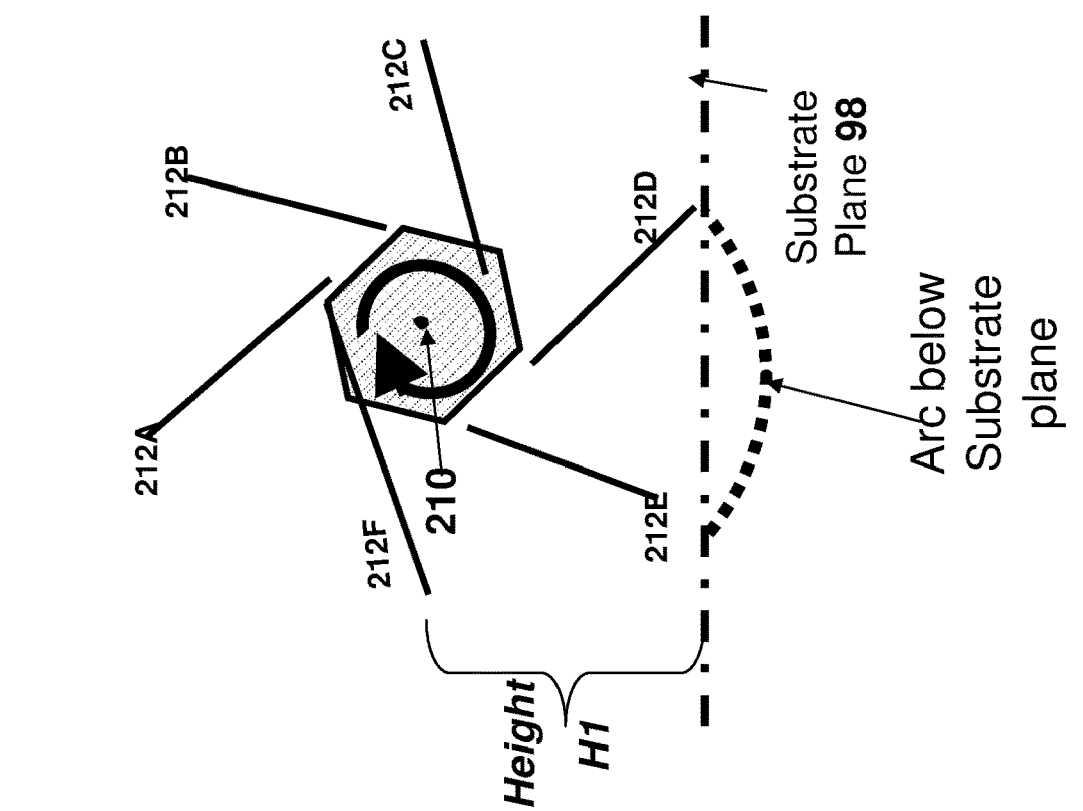

As shown in FIG. 5A, in some embodiments, a peripheral portion (e.g. tip) of impact element 212 may sweep through an arc on an opposite side of substrate plane as the rotation axis 210—e.g. rotation axis 210 may be above the substrate plane and the 'arc-sweep' of the peripheral portion (e.g. tip) of impact element 212 may be below the substrate plane. This arc-sweep may be (i) at least 5 degrees (i.e. out of 360 degrees) or at least 10 degrees or at least 15 degrees or at least 20 degrees or at least 30 degrees and/or (ii) at most 50 degrees or at most 40 degrees or at most 30 degrees or at most 20 degrees or at most 10 degrees.

FIG. 5B is similar to FIG. 5A except that a vertical displacement/height H2 between rotation axis 210 and substrate plane 98 exceeds the vertical displacement/height H2 between rotation axis 210 and substrate plane 98 for the example of FIG. 5A. Therefore, the portion of the 'arc' below substrate plane 98 in the example of FIG. 5A is greater than the portion of the 'arc' below substrate plane in the example of FIG. 5B. In some embodiments, the stripping arrangement of FIG. 5A may be considered more 'aggressive' because the fraction of the arc below substrate plane 98 is greater. As will be discussed below, some embodiments relate to apparatus and methods for regulating (e.g. dynamically regulating) the height H (vertical displacement) between the rotation axis 210 and the substrate plane 98 in accordance with a desired 'aggressiveness' of the stripping treatment.

In some embodiments, a linear speed of the impact element upon crossing the substrate plane is at least at least 0.1 meters/second or at least 0.3 meters/second or at least 0.5 meters/second or 1.4 meters/second. This linear speed may be sustained for at least 1 or at least 5 or at least 10 or at least 100 or at least 1000 or at least 2000 rotations.

In some embodiments, a rotational (RPM) of the impact assembly (i.e. either assembly 110 and/or 120) is at least 10 rotations per minute or at least 25 rotations per minute or at least 50 rotations per minute or at 75 rotations per minute or at least 100 rotations per minute or at least 200 rotations per minute or at least 300 rotations per minute or at least 500 rotations per minute or at least 700 rotations per minute or at least 1000 rotations per minute—this may be sustained for at least 1 minute or at least 5 minutes or at least 10 minutes.

Figure 6:
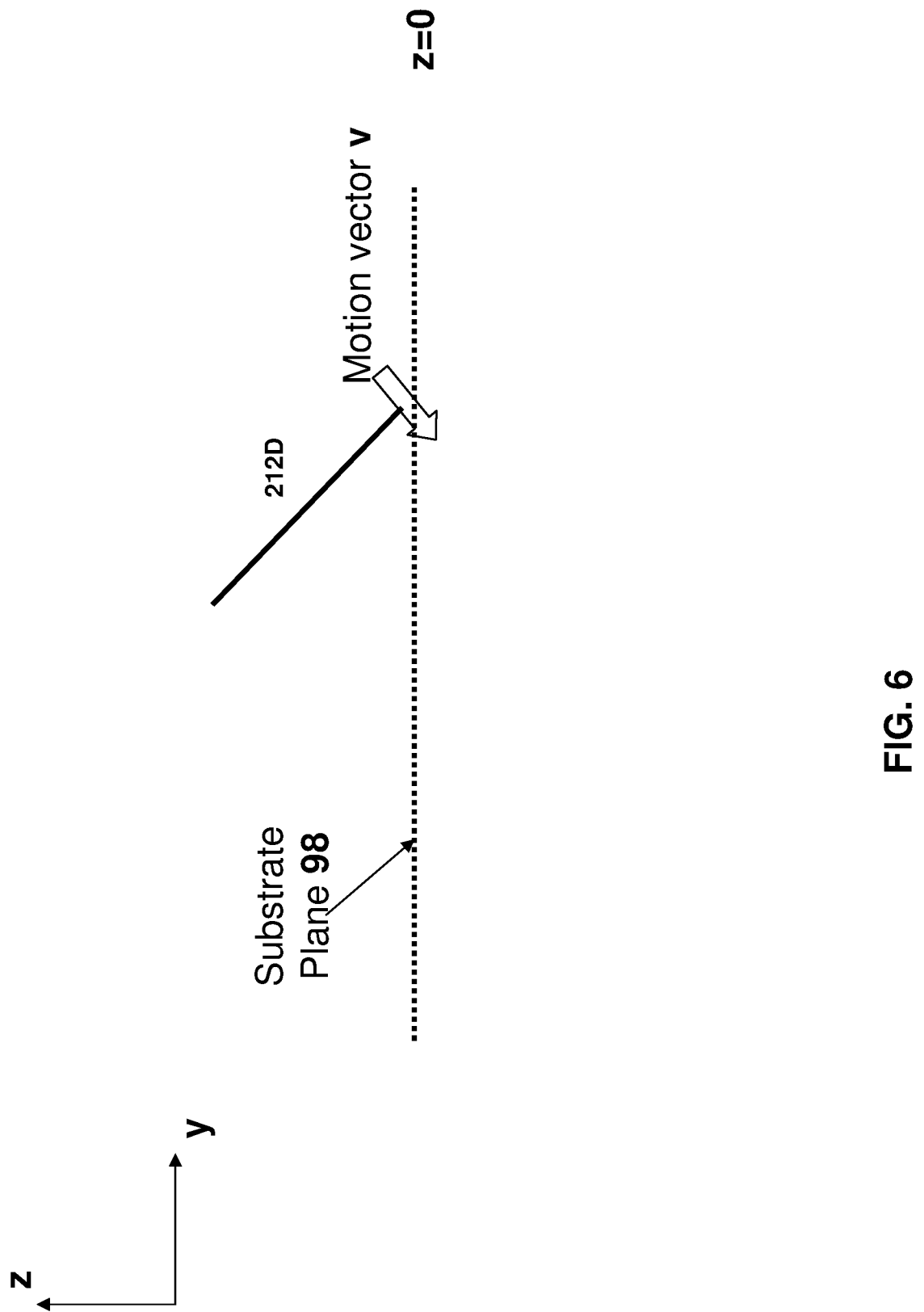
FIG. 6 illustrates a motion vector of a peripheral portion (e.g. tip) of an impact element.

As shown in FIG. 6, when the peripheral portion (e.g. tip) of impact element 212 reaches and/or contacts substrate plane, a vector of motion of the peripheral portion (e.g. tip) of impact element 212 may be non-perpendicular to the substrate plane—e.g. non-perpendicular by at least 10 degrees or at least 20 degrees or at least 30 degrees or at least 40 degrees or at least 50 degrees or at least 60 degrees or at least 70 degrees or at least 80 degrees.

In different embodiments, when the peripheral portion (e.g. tip) of impact element 212 reaches and/or contacts substrate plane, a vector of motion of the peripheral portion (e.g. tip) of impact element 212 may be non-parallel to the substrate plane—e.g. at an angle deviating from substrate plane 98 by at least 10 degrees or at least 20 degrees or at least 30 degrees or at least 40 degrees or at least 50 degrees or at least 60 degrees or at least 70 degrees or at least 80 degrees.

In one example, (i) impact element 212 (or element 222) undergoes full rotations at a rate of 300 rotations per minute and (ii) a mass of the impact element 212 is 20 grams. In this example, a distance between a peripheral portion of the impact element 212 and the peripheral portion which collides with the substrate is 50 mm. In this embodiment, a linear velocity of the peripheral portion (e.g. tip) in the instant immediately before collision with the substrate surface is 1570 mm/sec.

In various embodiments, in the instant immediately before collision between a peripheral portion of the impact element 212 and the substrate, a translational velocity of a peripheral portion of the impact element is (i) at least 100 mm/sec, or at least 250 mm/sec, or at least 500 mm/sec, or at least 750 mm/sec, or at least 1,000 mm/sec or at least 2,000 mm/sec, or at least 4,000 mm/sec and/or (ii) at most 10,000 mm/sec or at most 5,000 mm/sec or at most 3,000 mm/sec or at most 2,000 mm/sec.

In various embodiments, the amount of momentum transferred from the impact element to the substrate in each collision therebetween is (i) at least 500 grams*mm/sec or at least 1,000 grams*mm/sec or at least 2,500 grams*mm/sec or at least 5,000 grams*mm/sec and/or (ii) at most 20,000 grams mm/sec or at most 10,000 grams*mm/sec or at most 5,000 grams*mm/sec.

FIGS. 7A-7B illustrate an impact element immediately before (FRAME A) contact with the substrate plane, upon contact/crossing with the substrate plane (FRAME B) and immediately after crossing substrate plane (FRAME C). Because contact element is flexible and/or soft, the contact with the substrate may bend impact element 212.

The impact elements 212, individually and/or collectively, may have a Shore D Hardness of at least 30, at least 35, at least 40, at least 45, at least 50, at least 55, or at least 60 or at least 70 or at least 80 or at least 90 or at least 100. Alternatively or additionally, the Shore D Hardness may be at most 120 or at most 115 or at most 110 or at most 105 or at most 100 or at most 95 or at most 90 or at most 85, at most 80, at most 75, at most 70, or at most 65.

In the example of FIG. 7A, the collision between impact element 212D and the substrate is effective to completely strip away piece 62, while in the example of FIG. 7B is effective to only partially dislodge piece 62.

For any impact element (e.g. see FIGS. 4A-4B or any other embodiment) a mass of each impact element is at most 100 grams or at most 50 grams or at most 30 grams or at most 20 grams or at most 10 grams or at most 5 grams or at most 3 grams or at most 2 grams or at most 1 grams.

In some embodiments, in the absence of centrifugal force the impact element is unable to sustain it's own weight and may exhibit (i.e. even to the naked eye) a certain degree of sagging which would be even more visible under small forces like 1 kg or 500 gm or 300 gm.

FIGS. 4A-4C relate to the situation where a collision between impact element 212 and substrate 60 is enough to partially dislodge or even completely strip away a target portion 98. In such a situation, and as illustrated FIGS.

4A-4B and FIG. 5, at least a portion of impact element 212 may cross substrate plane 98.

Figure 8B:
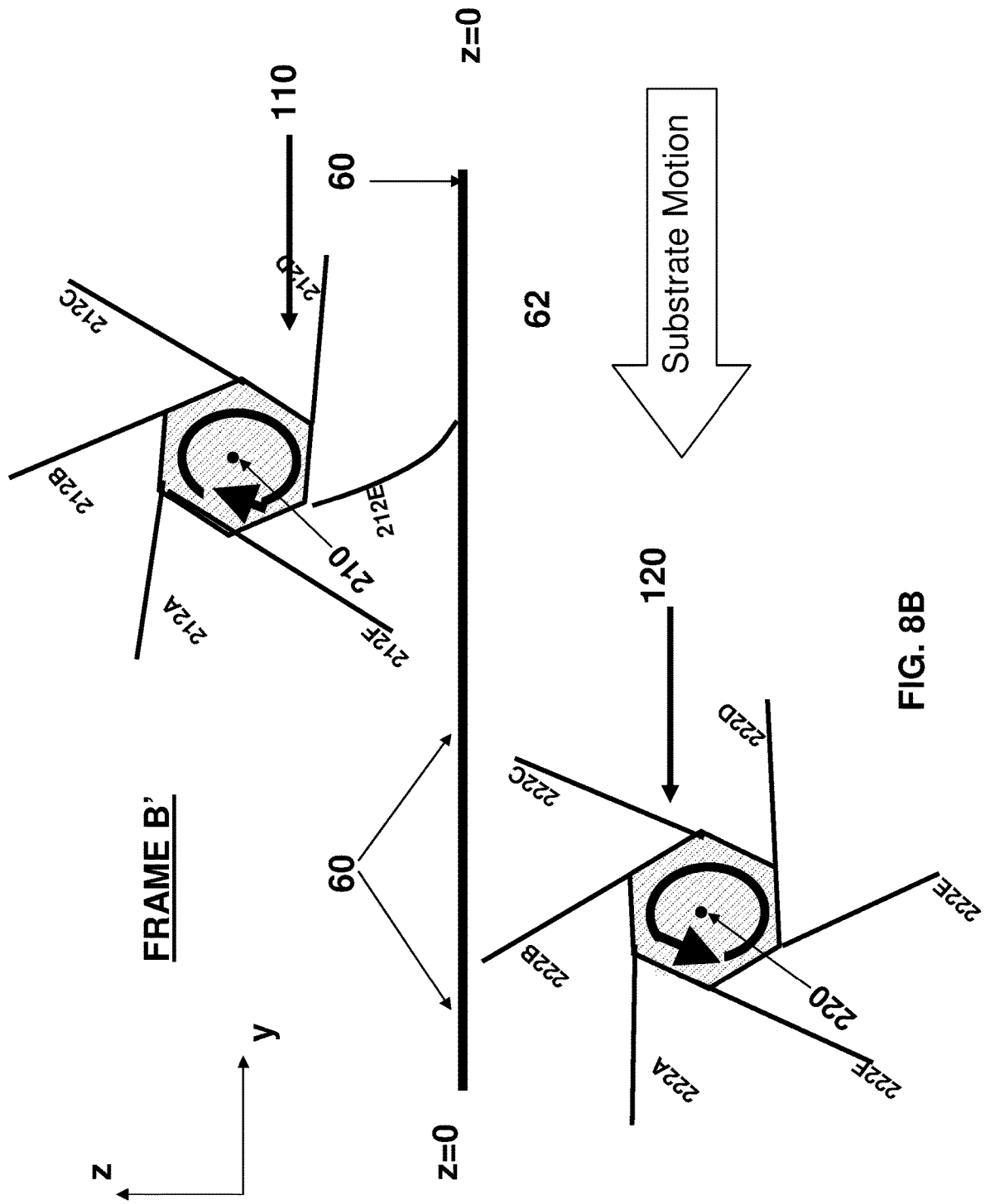

FIG. 8A-8C relates to another situation where the same rotating impact element does not strip substrate or even partially dislodge substrate—for example, the impact element may collide with substrate in a location away from pre-cut or pre-mechanically-weakened locations of the substrate. In the situation of FIGS. 8A-8C, impact element 212 does not cross substrate plane 98 and only caresses a surface of substrate 60 without stripping away a portion of substrate.

In some embodiments, at least some or at least a majority of the collisions between the impact element 212 and the substrate 60 do not subject the substrate to any substrate-separations. A 'substrate separation' is defined as least one of: (i) a partial dislodging of a piece of substrate; (ii) a stripping away (i.e. complete) of a piece of substrate; or (iii) a cutting of substrate.

A number of presently disclosed stripping techniques are disclosed. In any embodiment, the stripping technique may be practiced in the context of the method described in FIG. 2B. In any embodiment, adhesive material (e.g. inactive) may be present on the substrate surface at a location where impact elements collide with the substrate surface.

In some embodiments, the adhesive is subsequently activated after the stripping. In some embodiments, an impact element is 'dragged' for at least some distance over the surface of the substrate—e.g. during collisions that do not strip away or dislodge substrate. In this way, the impact elements do not 'stick' to the surface of the substrate during stripping.

A 'stripping' of substrate may rely on a pre-weakening (or previous cutting or creasing) of substrate and may be understood to be different from 'cutting' the substrate. Thus, in different embodiments, collision or contact between impact element 212 and substrate 60 is a 'non-cutting' event.

Figure 15:
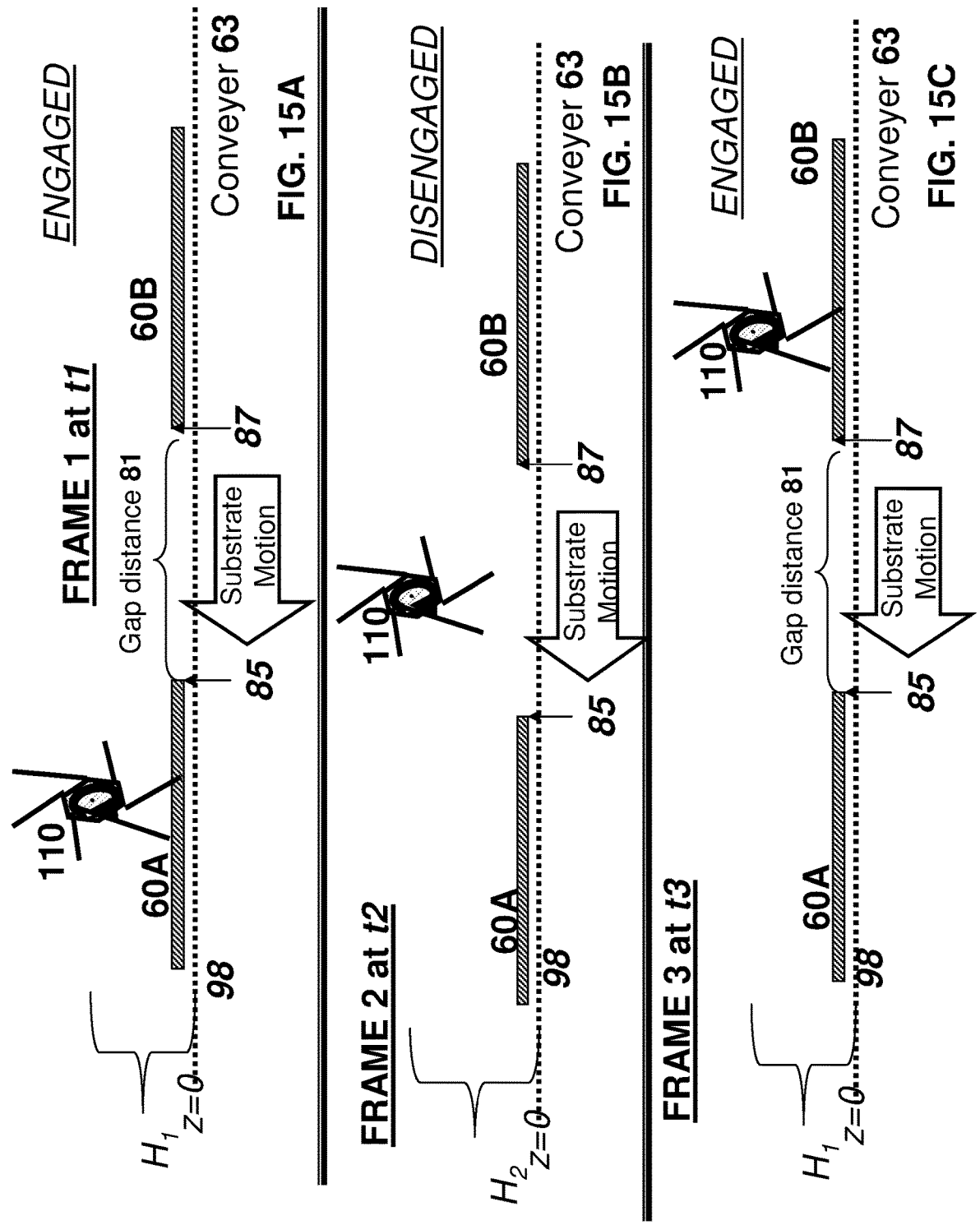

In different embodiments, the same impact-element that caresses a surface of substrate 60 for some rotations (i.e. complete or partial rotation) (e.g. as in FIGS. 8A-8C) succeeds in partially dislodging substrate or stripping away substrate for other rotations. For example, the impact-element may be in continuous rotation (i.e. complete rotations or 'back-and-forth' partial rotations as illustrated in FIG. 15) and for some rotations, there is only 'caressing' and in other rotations, there is partial dislodging or complete stripping away.

As noted above, FIGS. 4A-4C relate to a two-step process where the first collision does completely strip away a target portion 62, but rather only partially dislodges it. This is a not a limitation—see FIG. 7A where a single collision is sufficient for stripping away a piece 62 of substrate.

Figure 9:
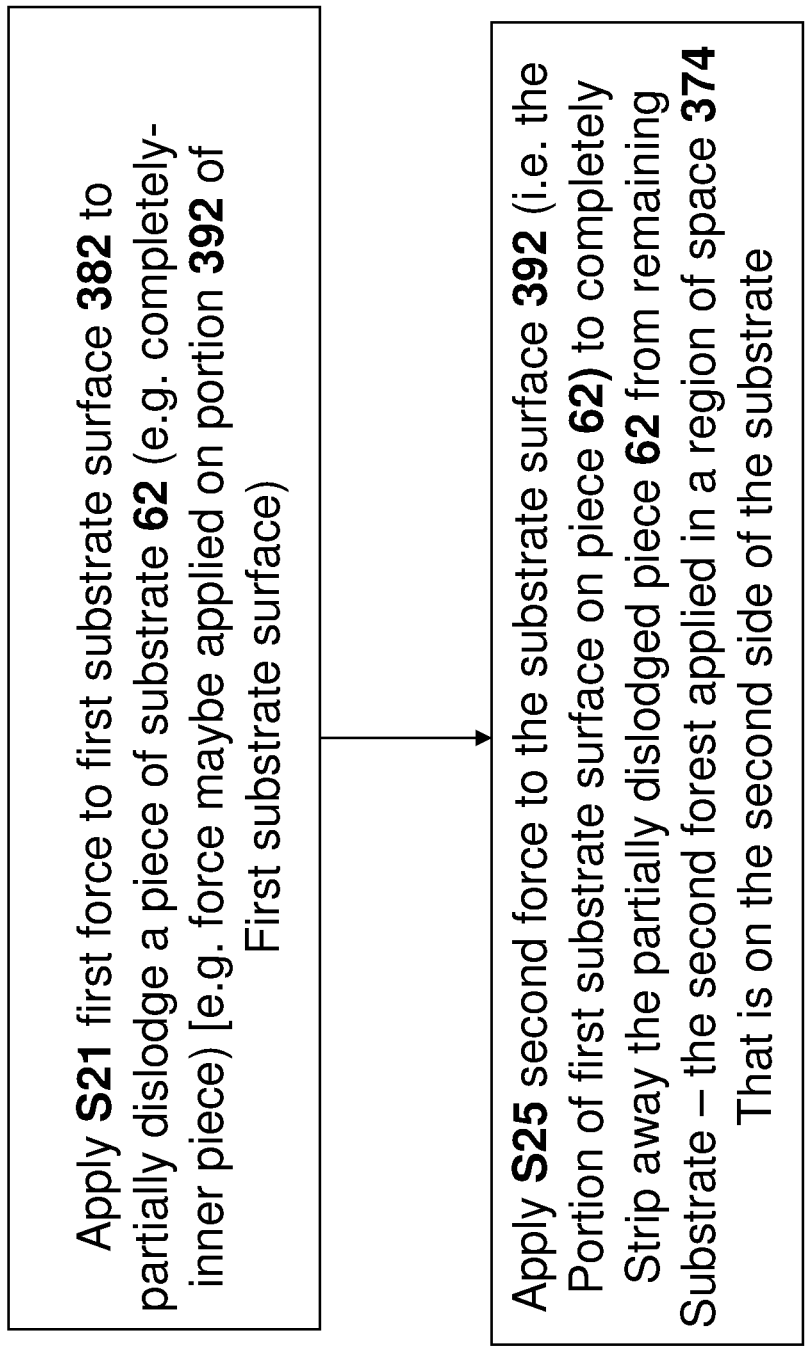
FIG. 9 is a flow-chart of the two-step process for stripping away substrate.

FIG. 9 is a flow-chart of the two-step process for stripping away substrate (e.g. see FIGS. 4A-4B). The substrate has first 382 and second 384 surfaces that respectively face away from each other to first 372 and second 374 sides of the substrate.

In step S21, a first force is applied so as to partially dislodge a piece 62 (e.g. completely-inner piece 25B of FIG. 1B) of the substrate. In some embodiments, the first force may be applied by an impact element 212 (e.g. flexible impact element) undergoing full rotation (as shown in FIGS. 4A-4C) or partial rotation (as shown in FIG. 18). As illustrated in FIGS. 4A-4B, application of the first force may rotating, in a rotation direction, the completely-inner piece around a pivot-location (e.g. 352A) via which the partially-dislodged piece remains attached to the remaining substrate. Thus, in FIG. 4B, after the first collision, piece 62 remains attached to the remaining substrate via pivot-location 352A.

Step S25 is performed subsequently and in a region-of-space that is on the second side 372 of the remaining substrate, applying a second force upon the partially-dislodged substrate on the first substrate surface 392 thereof to completely strip away the partially-dislodged piece of substrate 62 from the remaining substrate 60.

In some embodiments, step S21 and/or step S25 are performed by a rotating impact element (e.g. flexible impact element).

Figure 10A:
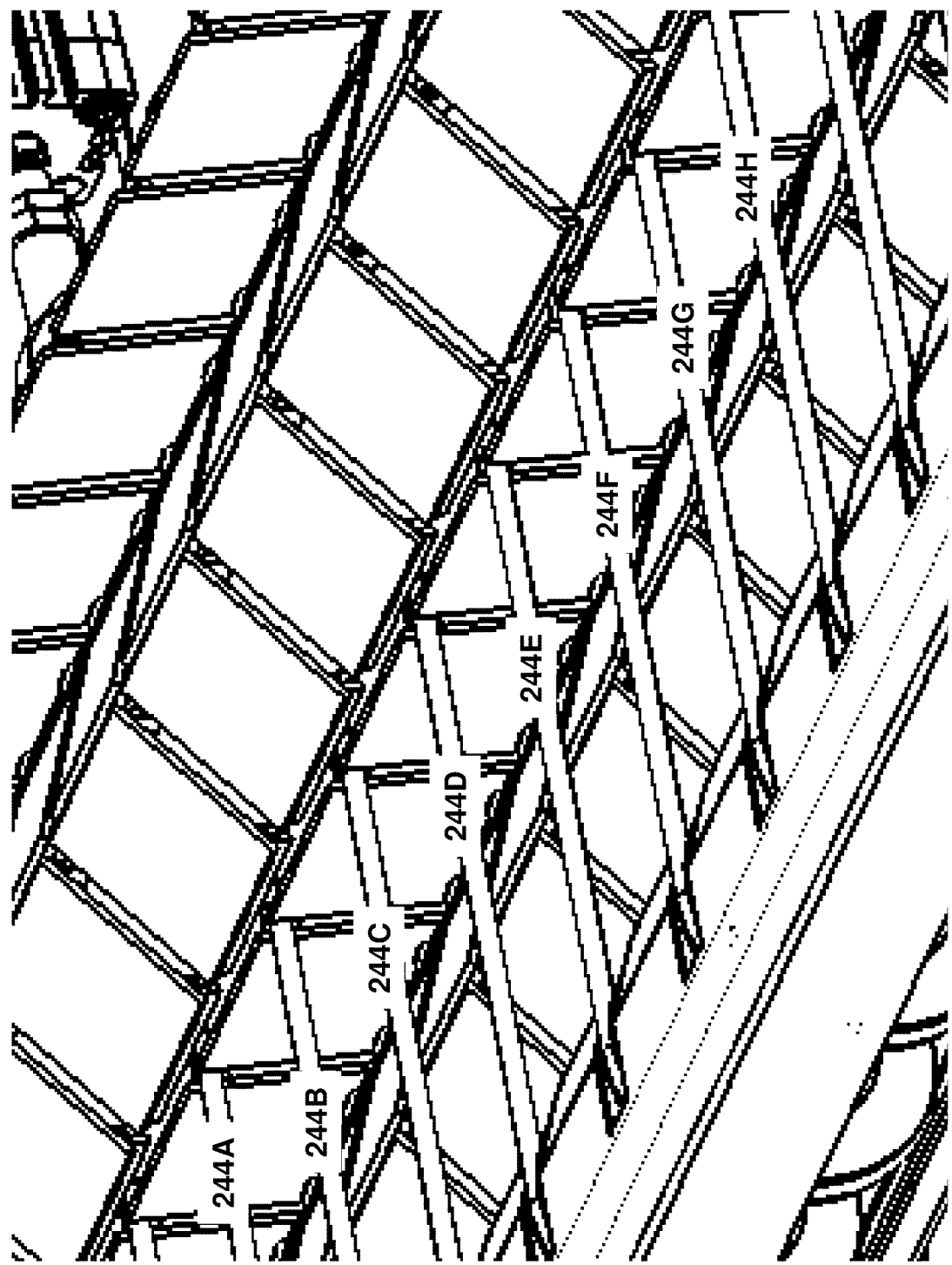

As illustrated in FIGS. 10A-10B, in some embodiments the substrate is supported by an array (i.e. at least 2 or at least 5 or at least 10 or at least 30) of laterally separated strips or straps 244. For example, in some embodiments, a ratio between (i) a lateral distance (i.e. in the x-direction) between neighboring strips/straps and (ii) strip/strap thickness is at least 0.5 or at least 1 or at least 2 or at least 3 or at least 5 or at least 10.

Figure 11A:
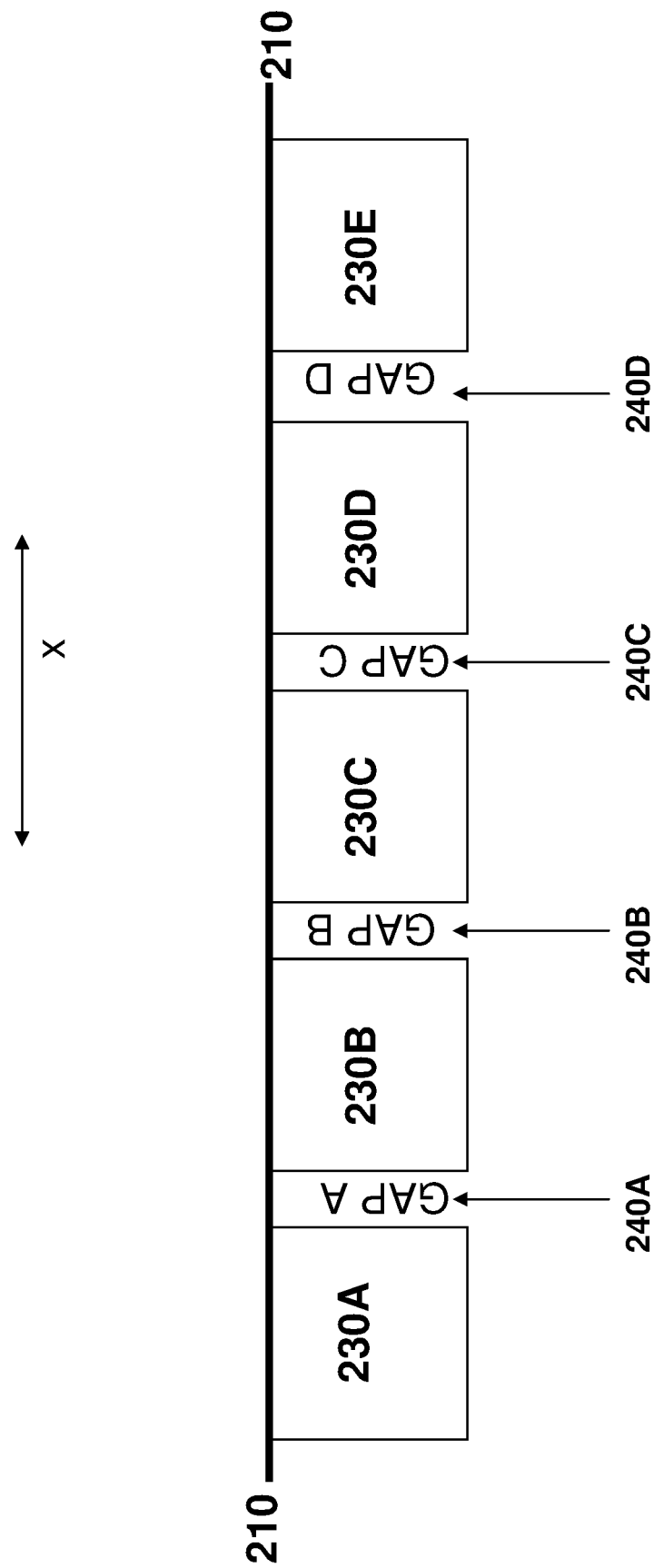
FIGS. 11A-11B illustrates groups of impact elements are laterally spaced from each other to defined gaps between adjacent groups of impact elements.

As illustrated in FIG. 11A, impact elements may be laterally spaced to include lateral 'gaps' 240 to accommodate the strips or straps. Thus, axis 210 is a lateral axis along the 'lateral direction (shown as the 'x axis' in FIG. 2A).

Figure 11B:
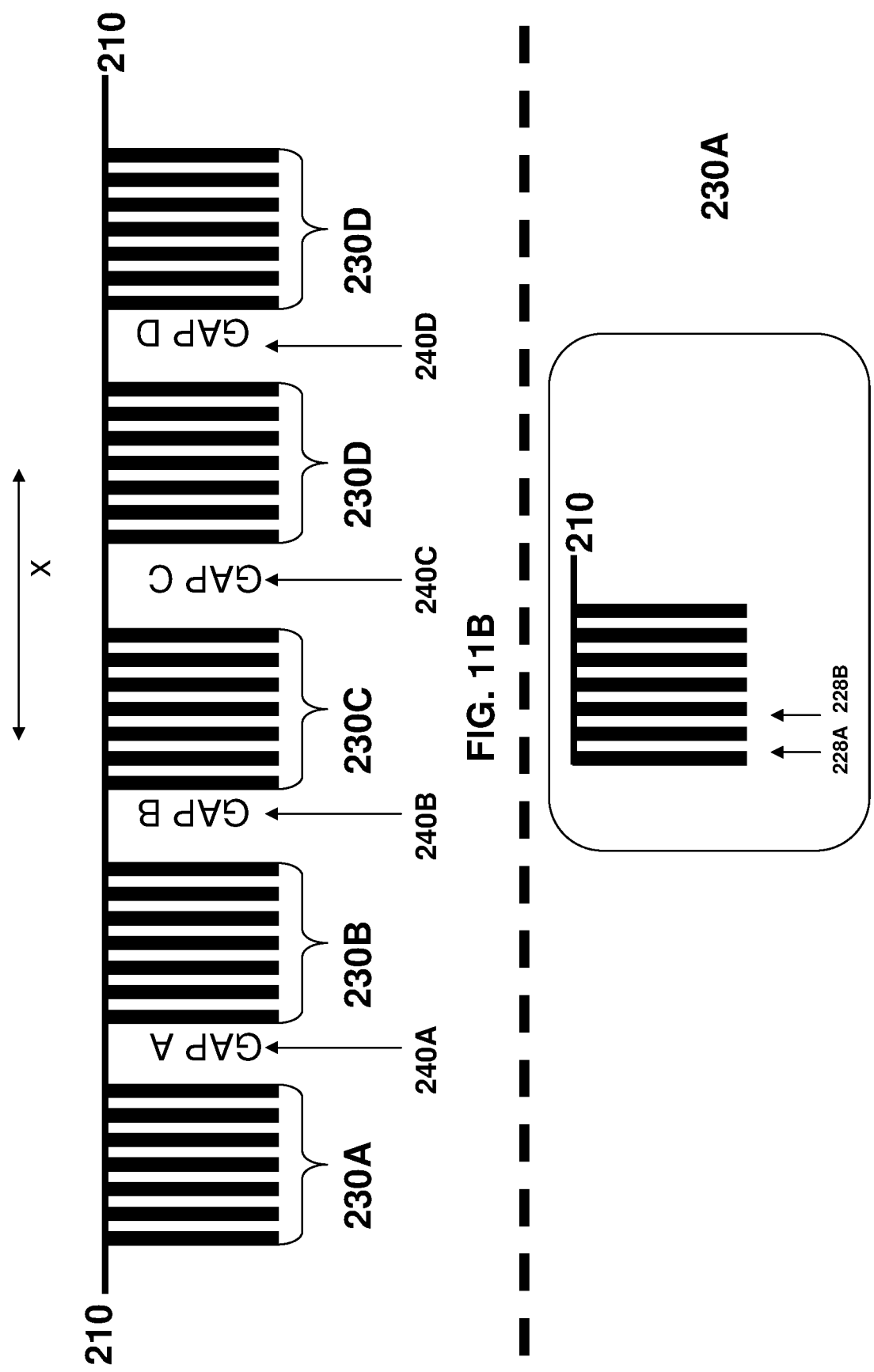

In FIG. 11B, it is noted that a single impact element group 230 may be broken up into a plurality or array of individual impact elements 228.

It is now disclosed a method of mechanically stripping away a portion of a substrate, the substrate having first and second surfaces that respectively face away from each other to first and second sides of the substrate, the method comprising: for a first impact-element array of at least 10 (or at least 20 or at least 30) distinct flexible and/or soft impact elements, simultaneously maintaining every impact element of the impact-element array in continuous complete or partial rotational motion at a rotation rate of at least z RPM (preferably, a value of z is at least 10) so that peripheral portion of each flexible and/or soft impact element repeatedly collides with the first surface of the substrate so that: a. for a first subset of the collisions, the entire impact element remains on the first side of the substrate so that the peripheral portion moves across the first surface without partially or completely separating any of the substrate (i.e. this is 'caressing'); b. for a second subset of the collisions, momentum of the collision partially dislodges a piece of the substrate and/or strips away a piece of the substrate so as to open an orifice through the substrate so the peripheral portion of the impact element passes through the orifice from the first side of the substrate to the second side thereof.

In some embodiments, for every impact element of the array, both a thickness and a width thereof is at most 5 mm or at most 4 mm or at most 3 mm.

In some embodiments, each impact element of the impact-element array rotates around a common rotation axis.

In some embodiments, for a second impact-element array of at least 10 (or at least 20 or at least 30) distinct flexible and/or soft impact elements, simultaneously maintaining every impact element of the impact-element array in continuous complete or partial rotational motion at a rotation rate of at least w RPM (a value of w is at least 10) so that peripheral portion of each flexible and/or soft impact element repeatedly collides with the second surface of the substrate so that: a. for a first subset of the collisions of the second impact-element array, the entire impact element remains on the second side of the substrate so that the peripheral portion moves across the second surface without partially or completely separating any of the substrate (i.e. 'caressing'); b. for a second subset of the collisions of the second impact-element array, momentum of the collision completely strips away partially-dislodges substrate that was partially dislodged by a collision between an impact element of the first impact-element array.

Figure 12:
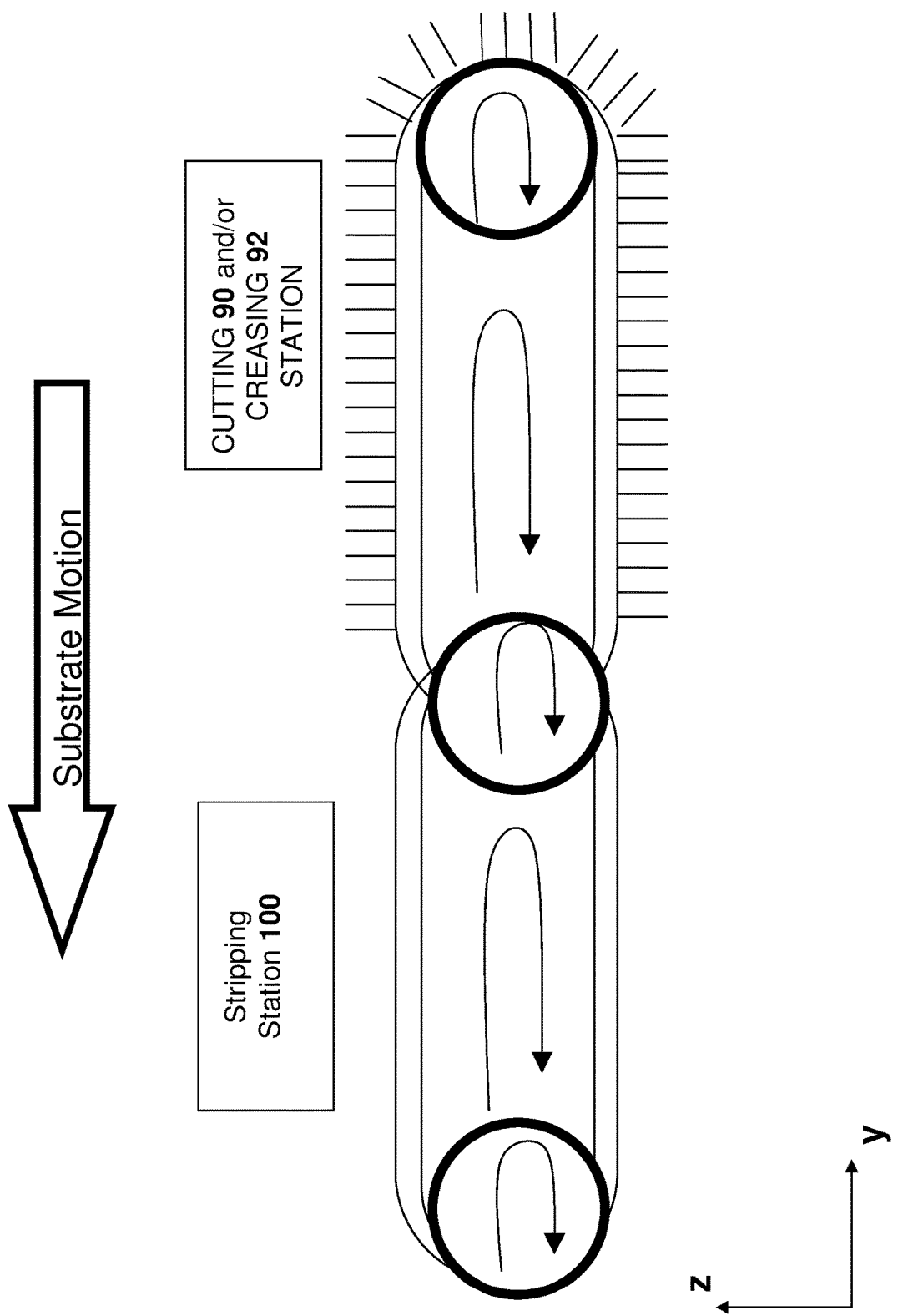
FIG. 12 illustrates an embodiment needles projects outwardly from the strips.

In some embodiments and as schematically illustrated in FIG. 12, similar strips may move the substrate under cutting and/or creasing elements—however, the strips may also include needles projecting outwards therefrom. These needles may be absent under the stripping station.

Figure 13:
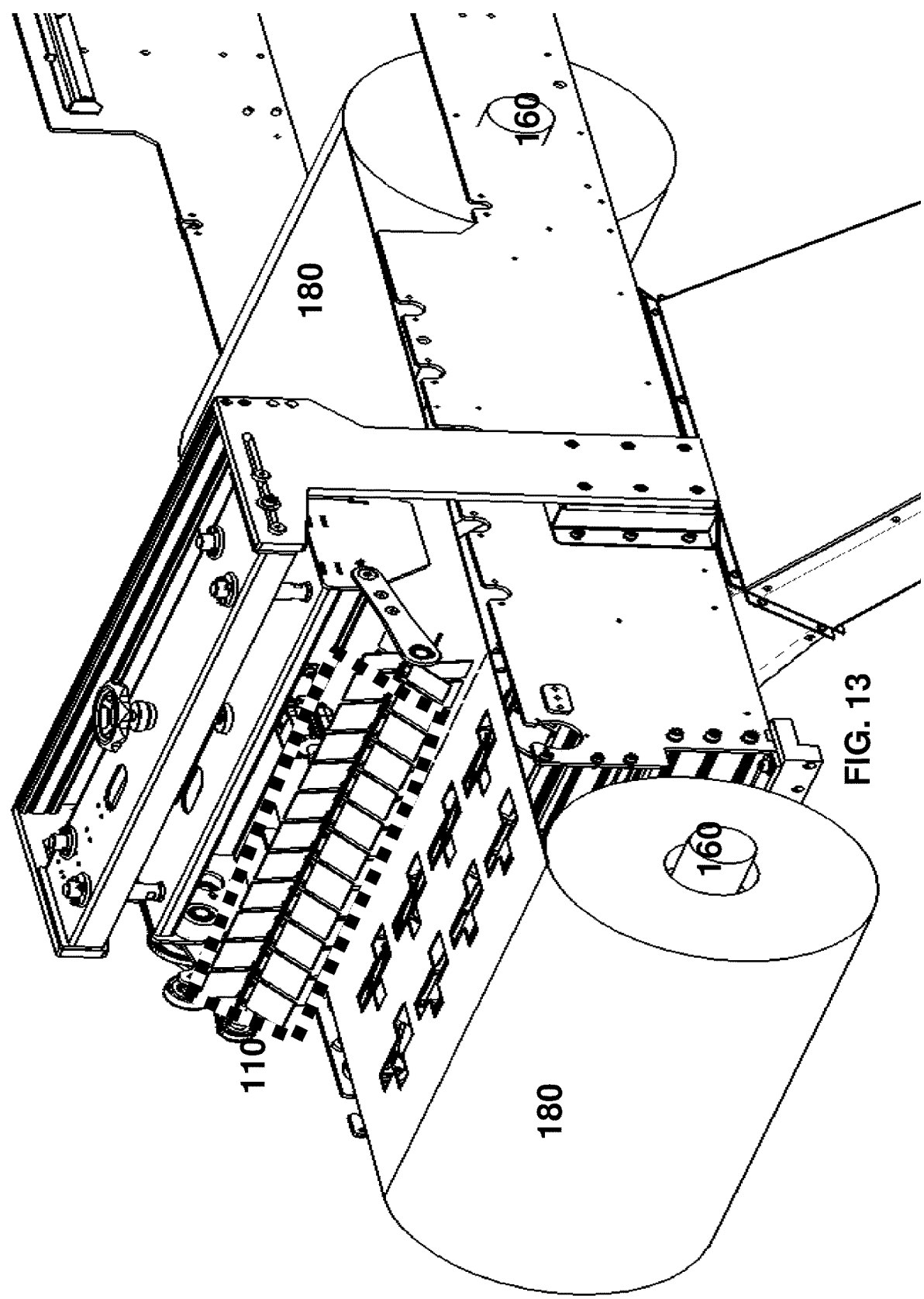
FIG. 13 shows a web-related embodiment including a web-substrate handling system.

FIG. 13 shows a web-related embodiment including a web-substrate handling system (e.g. comprising two or more rollers around which the web-substrate is deployed) Any method disclosed herein may be applied to web substrate when mounted to a web-substrate handling system—e.g. as rollers of the web-substrate handling system rotate to cause horizontal motion of web substrate mounted thereon.

For example, after stripping, portions of web may be cut (i.e. in the lateral direction to form 'sheets' or 'strips' of substrate either before are after stacking.

Figure 14:
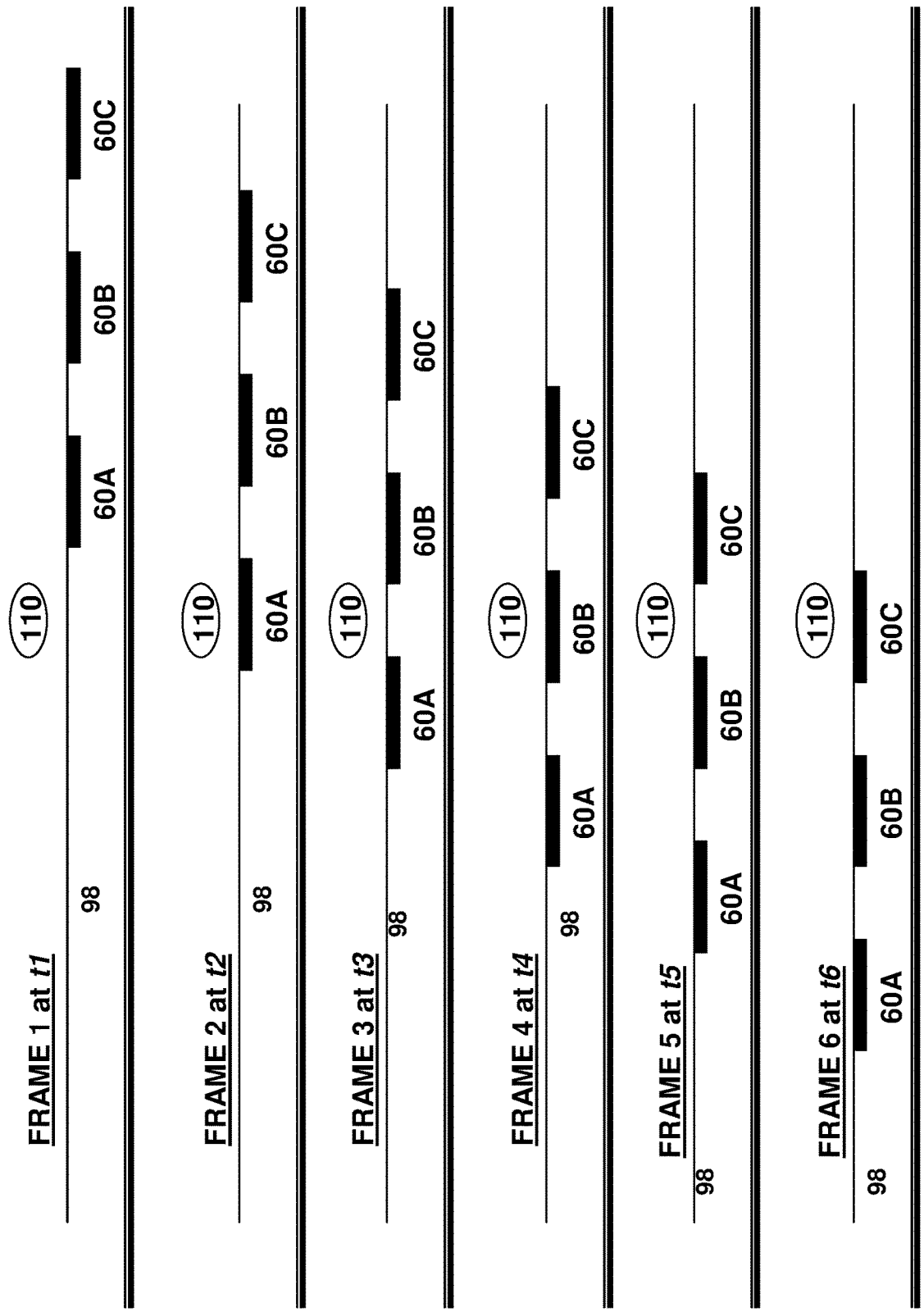
FIG. 14 illustrates a sheet-related embodiment.

FIG. 14 relates to a sheet related embodiment where a plurality of substrate-sheets 60A-60C horizontally move past (and under) stripping assembly 110 above substrate plane and/or assembly 120 (NOT SHOWN) below substrate plane 98—for example, moved by a conveyer belt. In some embodiments, the substrate sheets move at the same speed (e.g. constant speed) so that a distance therebetween is maintained. FIG. 14 illustrates 6 frames at times t1-t6. In frame 1, no substrate sheet is below stripping assembly 110 (illustrated schematically). At a later time t2, the first substrate sheet 60A is directly below stripping assembly 110 (illustrated schematically). At a later time t3, no substrate sheet is directly below stripping assembly 110 (illustrated schematically)—instead, stripping assembly 110 is above a gap between sheets 60A and 60B. At a later time t4, the second substrate sheet 60B is directly below stripping assembly 110 (illustrated schematically). At a later time t5, no substrate sheet is directly below stripping assembly 110 (illustrated schematically)—instead, stripping assembly 110 is above a gap between sheets 60B and 60C. At a later time t6, the third substrate sheet 60B is directly below stripping assembly 110 (illustrated schematically).

As noted above, in some preferred embodiments, the impact elements are flexible and/or 'soft'. By causing the flexible and/or soft impact elements to move at high speed (e.g. 'very high speeds'), it is possible to obtain a stripping process that is delicate enough to minimize damage to the substrate (or to a finish or varnish thereof or a printed image thereon) but 'robust/effective' enough to successfully strip away substrate as desired.

It is now disclosed an apparatus for stripping away portions (e.g. pre-cut partitioned, mechanically weakened portions) of a substrate, the apparatus comprising:

(a) a substrate handling arrangement adapted to horizontally support a flat, thin substrate so as to define a substrate-plane; and (b) a stripping assembly including at least one flexible impact-element and a rotation-drive positioned and configured to rotate the flexible impact-element around a rotation-axis so as repeatedly drive a peripheral portion of the impact-element across the substrate-plane.

In some embodiments, the substrate-handling arrangement further configured to horizontally propel the supported substrate along a substrate movement direction.

In some embodiments, the stripping assembly is configured to move in a direction opposite to the movement direction of the substrate. In some embodiments, the substrate is stationary during the stripping process and the stripping assembly moves.

In some embodiments, centrifugal force causes each 212 element to be extended—otherwise, it would at least sag somewhat under the force of its own weight (i.e. when horizontally oriented)

In some embodiments, a plurality of impact-elements 212 disposed around the rotation axis 210, the tip of each impact element is radially-displaced from the rotation axis by the same distance.

In some embodiments, upon impact with the substrate plane, the impact-element moves in the same direction of the substrate movement direction (e.g. see assembly 110 and FIGS. 4A-4C).

In some embodiments, a horizontal speed (e.g. in the substrate plane) of the tip upon tangential contact with the plane is at least 5 times (e.g. 10-20 times) that of the substrate.

In some embodiments, a plurality of stripping assemblies rotating in the same direction or in opposite directions. For example, both 110 and 120 may rotate in the same direction. Alternatively, 110 and 120 may rotate in opposite directions. For either 110 or 120, a horizontal component of a linear direction of a peripheral portion 212 of 120 may be the opposite of the linear direction of substrate movement, or along the linear direction of the substrate movement.

In some embodiments, the rotational rate (i.e. in RPM) of the first 110 and second 120 assemblies may be substantially the same—i.e. a ratio between an RPM speed of a first of the assemblies and a slower of the assemblies is (by definition at least 1) and at most 2 or at most 1.5 or at most 1.4 or at most 1.3 or at most 1.2 or at most 1.1—e.g. at least 1.1 or at least 1.15 or at least 2.

In some horizontal displacement (i. e. along the 'y' axis) between respective rotation-axes 210, 220 of the first and second stripping assembly being substantially equal to a vertical displacement (e.g. along the 'z' axis) between the rotation axis (e.g. 210, 220 or both) and the substrate plane.

In some embodiments, the substrate handling arrangement comprises a support assembly having a plurality of parallel and laterally separated strips, In some embodiments, a rotation speed of first rotation element exceeds that of the second rotation element by 20%.

In some embodiments, the system/stripping station operates engaged and disengaged mode—when the impact-element is configured to rotate the flexible impact-element around a rotation-axis" so that a peripheral portion contacts or crosses the substrate-plane this is in an ENGAGED MODE. There is also a DISENGAGED MODE as well where the stripping assembly (in particular axis 210) rotates to that no portion of the flexible impact element contacts or crosses the substrate-plane. Transitioning from ENGAGED MODE to DISENGAGED MODE may prevent the peripheral portion from striking the leading edge of the substrate, thereby preventing substrate jams, or at least reducing the risk of such jams. For example, there is a mechanical structure for effecting the engagement/disengagement. Another example is timing arrangement.

In some embodiments, a plurality of sheets in horizontal motion is provided to the stripping assembly—e.g. each sheet horizontally moves at the same constant speed so that a gap distance between a trailing edge 85 of a first substrate sheet 60A and a leading edge 87 of the second substrate sheet 60B remains constant—this is discussed above with reference to FIG. 14.

FIGS. 15A-15C illustrate an example where the stripping assembly 110 is raised and lowered according to locations of substrate sheets with respect to the stripping assembly. FIG. 14 as well as FIGS. 15A-15C describe 'sheet-related' embodiments where substrate sheets travel horizontally past stripping assembly 110—the example of FIG. 14 is illustrated the 'rest reference-frame' of the stripping assembly (the rotation axis 210 thereof may move horizontally, or more typically does not move horizontally) In contrast, FIGS. 15A-15C is in the 'rest reference-frame' of the substrate sheets 60A-60B which are, in fact, in absolute horizontal motion—e.g. moved by conveyer 63.

In frame 1 at time t1 (FIG. 15A) the stripping assembly 110 is engaged so that a rotation axis 210 thereof is elevated above substrate plane 98 by a height H1. At this time, a value of H1 is such that peripheral locations of impact element 110 repeatedly contacts substrate 60A and/or reaches substrate plane 98.

At a later time, in frame 2 at time t2 (FIG. 15B) the stripping assembly 110 is disengaged so that a rotation axis 210 thereof is elevated above substrate plane by a height H2. At this time, a value of H2 is such that the impact elements thereof do not reach substrate plane—thus, after time t1 and before time t2 stripping assembly 110 (and rotation axis 210) are raised to reduce the risk of a jam.

In frame 3 at time t3 (FIG. 15C) the stripping assembly 110 is engaged so that a rotation axis 210 thereof is elevated above substrate plane 98 by a height H1. At this time, a value of H1 is such that peripheral locations of impact elements repeatedly contacts substrate 60A and/or reaches substrate plane 98—thus, after time t2 and before time t3 stripping assembly 110 (and rotation axis 210) is lowered to re-engage. In all of frames 1-3 (FIGS. 15A-15C) impact elements of stripping assembly 100 remain in rotational motion around rotation axis 210.

Figure 16:
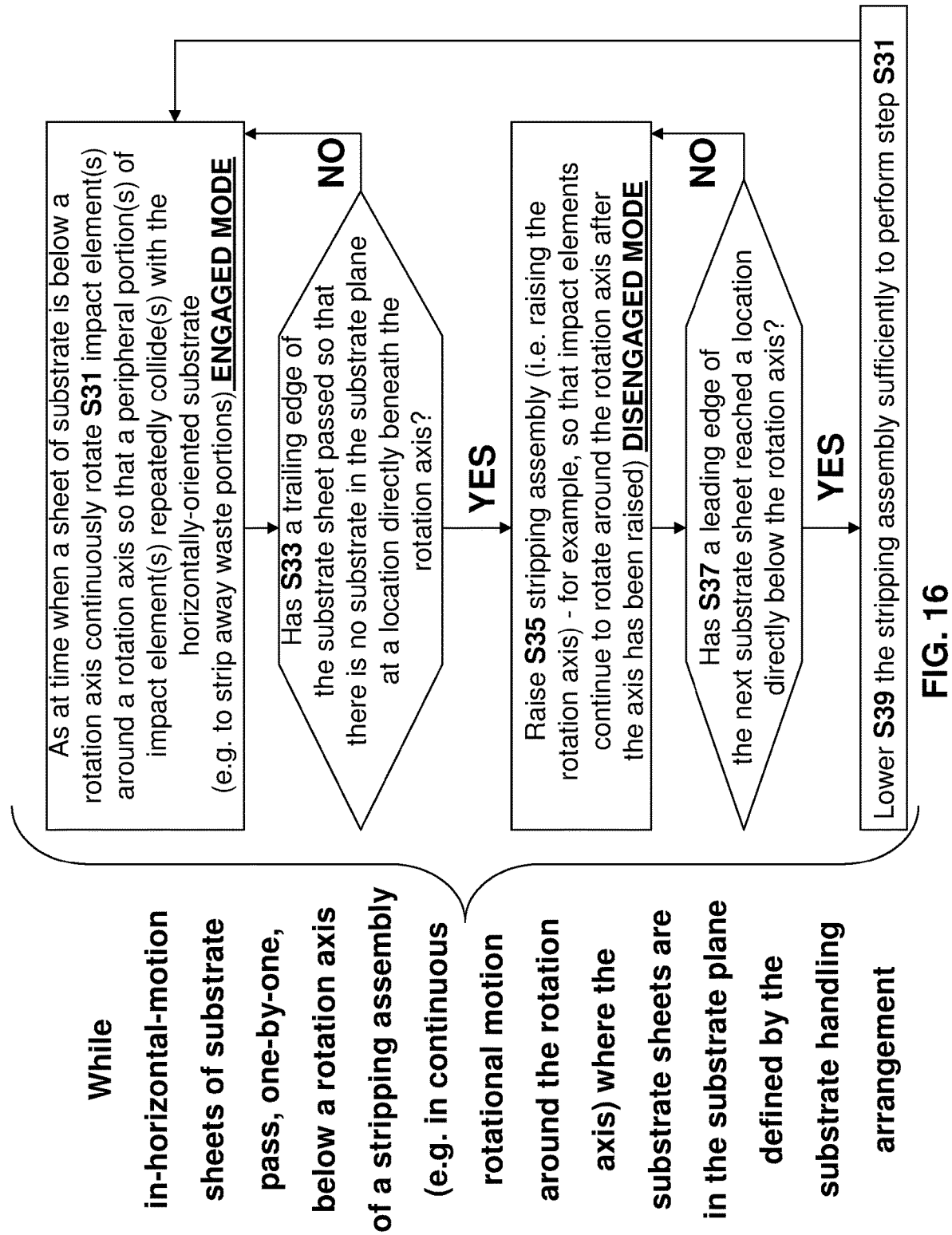

FIG. 16 is flow chart of a method for raising and lowering a stripping assembly 100 (i.e. comprising impact-elements rotating around rotation axis 210) so as to raise (transition from ENGAGE to DISENGAGE) and lower a rotation axis 210 thereof (transition from DISENGAGE to ENGAGE). In some embodiments, the entire method is performed while in-horizontal-motion sheets of substrate 60A-60C pass, one-by-one, below a rotation axis 210 of a stripping assembly 210 (e.g. in continuous rotational motion around the rotation axis) where the substrate sheets are in the substrate plane defined by the substrate handling arrangement.

In step S31, the stripping assembly 110 undergoes rotational motion so that impact elements thereof repeatedly collide with substrate directly below stripping assembly (see FIG. 15A—this is ENGAGED mode). In step S33, it is determined if a trailing edge 85 of the substrate sheet has passed directly below stripping assembly. If not, stripping assembly (FIG. 15A), stripping assembly 110 continues rotating while in ENGAGED mode. Otherwise, a height of stripping assembly 110 is raised (step S35—for example, from H1 to H2) to transition to DISENGAGED mode (FIG. 15B), thereby reducing the risk of collision between leading each 87 and an impact element, and thereby reducing the likelihood of a jam with the substrate. Once in DISENGAGED mode, it is determined in step S37 if a leading edge 87 has reached a location below the rotation axis—if so, the stripping assembly 110 is lowered (step S39)—from example from H2 to H1. At that point (FIG. 15C), stripping assembly is once more in ENGAGED mode.

Figure 17B:
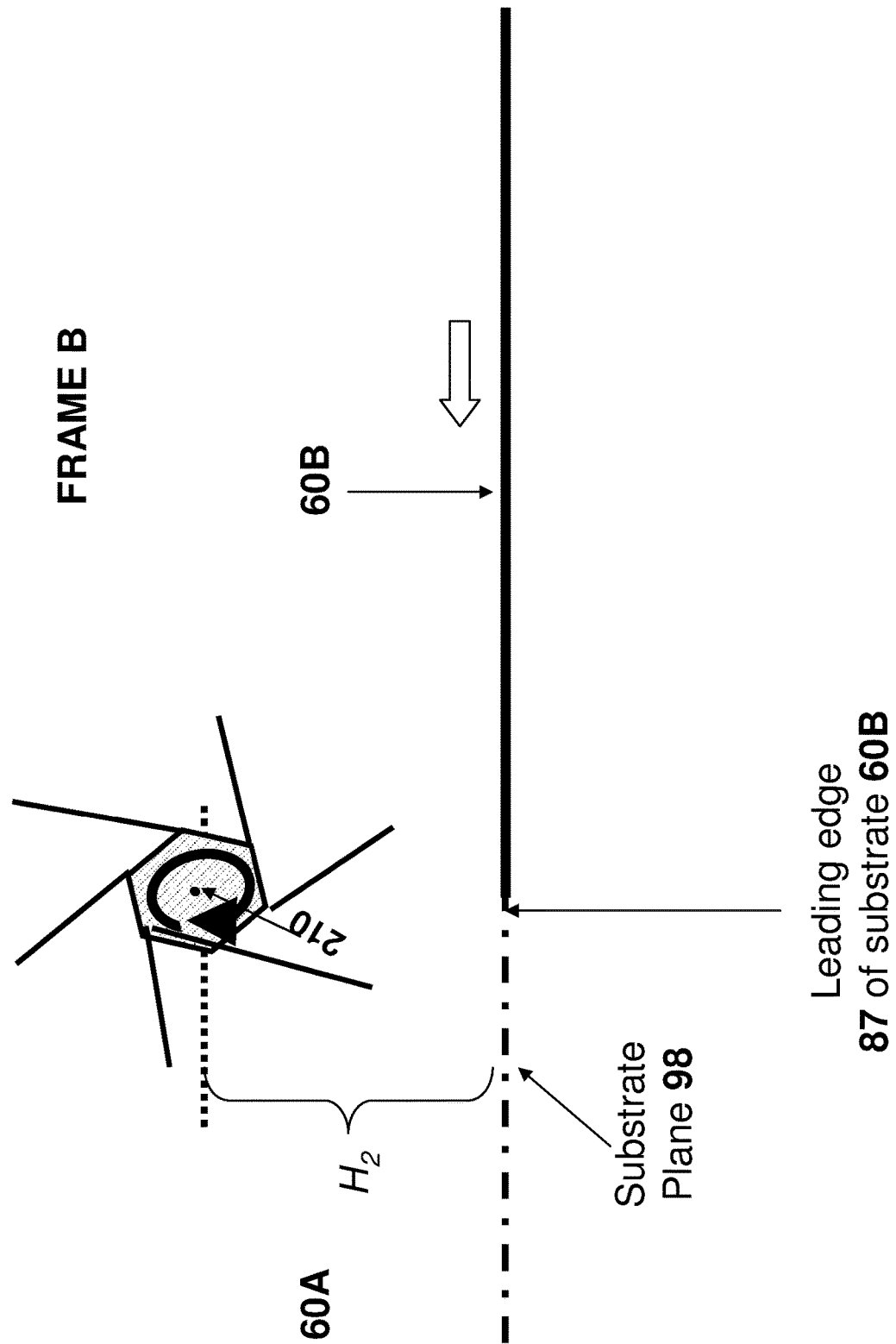

Another example is shown in FIGS. 17A-17B. In FIG. 17B, axis 210 is at a height H1 above plane 98. In FIG. 17A (immediately before step S35), stripping of a first piece 60A of substrate is complete and the first piece of substrate is transported away from the stripping assembly 110. At a later time, in order to avoid a 'jam' of substrate, stripping assembly 110 is raised—i.e. so that a height of rotation axis 210 above substrate plane 98 increases from H1 to H2—FIG. 17B illustrates the situation after the height is raised, as a new piece of substrate 60B having leading edge 87 approaches a location beneath stripping assembly 110 for stripping treatment.

In FIGS. 4A-4C, impact-element 212 rotated around axis 210 in full rotations. FIG. 18 relate to the case of only 'partial rotation' of impact-element 212.

The system of FIG. 18 strips away portions of a substrate by rotating at least one flexible and/or soft impact element(s) 212 around a rotation axis on a first side of the substrate so as to repeatedly cause a peripheral portion of the impact element to collide with the substrate. One such collision occurs in frame 3 of FIG. 18 at time t3. After the collision, the impact element continues its rotation—now on the opposite site of plane 98. In frame 4 of FIG. 18 at time t4, rotational motion ceases, and impact element reverses a direction of rotation. In frame 5 at t5, the impact element is now rotating in the opposite direction.

Thus, in some embodiments, FIGS. 15-17 relate to a system whereby: i. the stripping assembly 110 (and hence rotation axis 210) is vertically movable such that (A) when the rotation axis is in a first and lower height-range (e.g. at height H1 of FIG. 17A), the rotating flexible and/or soft impact-element(s) reach the substrate plane 98 at the stripping location and (B) when the rotation axis is in a second and higher height-range (e.g. at height H2 of FIG. 17B, the rotating flexible and/or soft impact-element(s) always remain above the substrate plane at the stripping location; ii. the stripping assembly comprises a translation-drive system (NOT SHOWN—typically powered by a motor (e.g. electrical motor) or any other suitable propulsion element known in the art), configured to raise and lower the stripping assembly to respectively raise (e.g. from H1 to H2) and lower (e.g. from H2 to H1) the rotation-axis thereof to move the rotation axis back and forth between the first and second height-ranges; and iii. the substrate handling arrangement is adapted to deliver sheets of substrate (60A, 60B, . . . ) to the stripping location (e.g. see 542A of FIGS. 4A-4B), each sheet 60 having a respective leading-edge 87 and trailing edge 85; iv. the system further comprises a controller (NOT SHOWN—e.g. comprising electronic circuitry) configured to regulate operation (e.g. by sending mechanical and/or electrical signal) of the translation-drive system to: A. raise S35 the stripping assembly 110 from the first height-range to the second height-range in response to a trailing edge 85 of a first substrate-sheet 60A exiting the stripping location 542A (e.g. due to horizontal motion provide by the substrate handling system); and B. subsequently, lower S39 the stripping assembly 110 from the second height-range (e.g. H2) to the first height-range (e.g. H1) in response to a leading edge 87 of a subsequent substrate-sheet 60B reaching the stripping location 542A.

FIG. 18 relates to an example of 'partial rotation.'

In FIG. 18, the collision is effective to partially dislodge a portion 62 of substrate. In other embodiments, the collision may completely strip away the portion 62 of substrate.

Similar to the full rotational motion of FIGS. 4A-4C and 8A-8C, the 'back-and-forth' partial rotation illustrated in FIG. 18 may also be repeated (e.g. continuously).

In some embodiments, i. for each of at least some of the collisions between the impact element and the substrate strip, the impact element crosses the substrate plane 98 to strip away a partially dislodged or respective completely-inner piece from the substrate; ii. the method is performed so that the flexible and/or soft impact element undergoes only partial rotation and repeatedly changes rotation-direction at least twice between subsequent collisions.

In some embodiments, a multi-purpose hybrid machine including a laser cutting station and a stripping station—the substrate moves (e.g. at a common speed but not necessarily at a common speed) first under the cutting station and then under the stripping station—a true continuous process In some embodiments, there is an interface between two types of parallel strips—in the laser-cutting portions the strips include needles that provide distance between the focal plane of the substrate (above the plane of the strips) and the plane of the strips. In the stripping portion these needles are not necessary and may hinder the operation.

Any stripping process disclosed herein may be performed 'statically'—i.e. the rotation rates of the impact-elements may be constant and/or the same group of impact-elements may always be crossing the substrate plane. Alternatively, as will now be discussed, it is possible to perform any presently-disclosed stripping process 'dynamically.' For example, at some times a more 'aggressive stripping process' (e.g. higher rotation rate) may be performed and at other times a 'less aggressive stripping process' may be performed. As will be discussed below, this may be performed in response to changing attributes of substrate being directed to stripping apparatus.

Experiments performed by the present inventors have indicated that while the presently stripping process is certainly useful, in some situations it is not 100% reliable. Thus, the techniques explained above may increase the reliability—e.g. course-stripping followed by fine stripping or dynamically adjusting the operating parameters. Nevertheless, in any implementation there is always a chance/risk of 'stripping failure'—i.e. waste pieces that are supposed to be removed from the substrate in fact do not get removed.

FIGS. 20-25 relate to techniques for attempting to avoid stripping failure, while FIGS. 26-33 relate to techniques for recovering from stripping failure. Any technique for reducing error may be combined with any other technique for reducing error or with any technique for recovering from error(s). Any technique for recovering from error(s) may be combined with any other technique for reducing error or with any technique for recovering from error(s).

Furthermore, experiments conducted by the present inventors have shown that different operating parameters may be appropriate in different circumstances, depending, for example, on the dimensions and/or area of 'enclosed' waste portion (or 'completely inner' portion(s)) (see element 25B of FIG. 1b) to be stripped away from substrate-retained portions.

Figure 19B:
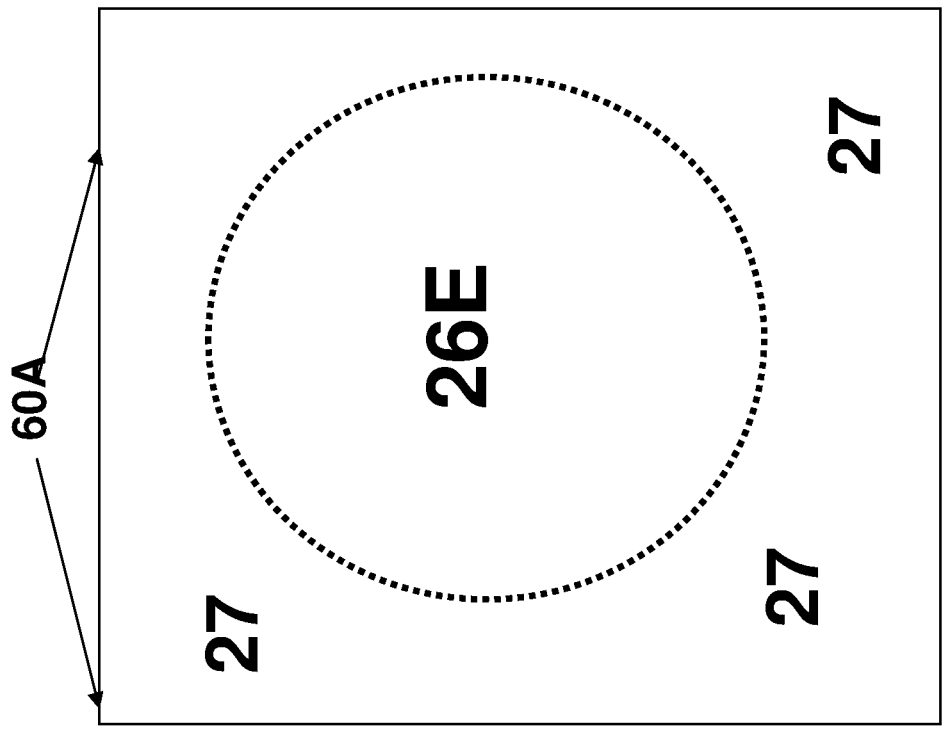
FIGS. 19A and 19B respectively present examples of substrate including stripping-targets.
Figure 19A:
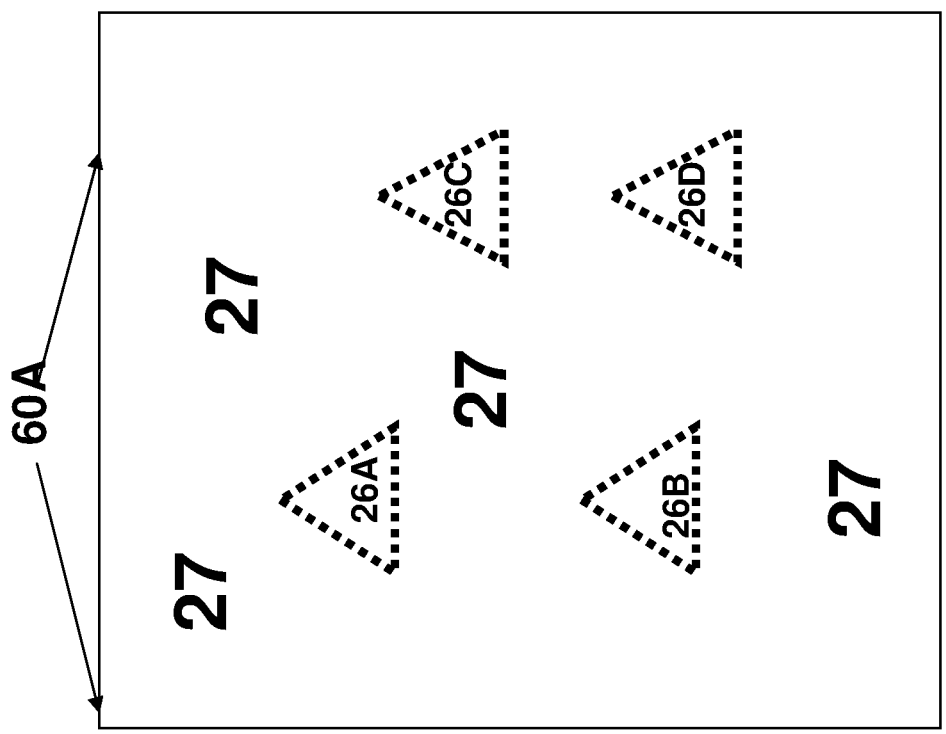

FIGS. 19A and 19B respectively present two examples. In the example of FIG. 19A, there are four stripping 'targets'—waste portions 26A-26D to be stripped away from substrate-retained portion 27. In the example of FIG. 19B, there is single stripping 'targets'—waste portions 26E to be stripped away from substrate-retained portion 27. In both of FIGS. 19A-19B, the boundary between the waste portion(s) 26A-26E and the substrate-retained portion is illustrated in a broken lines—this may indicate the location of a previous partial cut, or substrate weakening—for example, performed as cutting 90 and/or creasing 92 station.

Experiments performed by the present inventors have indicated that, in certain situations, it is preferable to the impact element to directly collide with a designated waste portion(s) or stripping target. This may be useful for minimizing the likelihood of a stripping error where, despite one or more collisions between the impact element and the substrate (e.g. the sheet of substrate where the stripping target is located), the collisions fail to strip away the stripping target.

Not wishing to be bound by theory, in the example of FIG. 19A, it may be judicious to operate the stripping assembly at a relatively 'high' rotation rate so as to maximize the likelihood of a 'direct' collision where the impact-element collides with substrate 60A at a location within one of the 'small' triangles 26A-26D that are waste portion(s). On the other hand, for the example of FIG. 19B, there might be less of a need for high rotation rates, since the 'target' 26E is relatively large and thus easier to directly collide with.

However, in the example of FIG. 19B the amount of momentum per collision required to dislodge and/or strip away 'large' waste portion(s) 26E may be greater than the per-collision momentum required to dislodge and/or strip away 'smaller' waste portion(s) 26A-26D of FIG. 19A. Thus, in the example of FIG. 19B, it may be advisable, for example, to operate stripping assembly 110 so that a rotation-axis 210 thereof is closer (i.e. less vertical displacement) than in the example of FIG. 19A. See the discussion above with reference to FIGS. 5A-5B showing that when the vertical displacement is less, the length of 'arc' on the opposite side of substrate plane 98 is greater, giving a more 'aggressive treatment.'

FIGS. 20-25 relate to methods for dynamically operating a stripping assembly—i.e. during operation, adjusting one or more operating parameter(s). For example, if sheets of thicker substrate are in the queue, or sheets of substrate with 'larger' targets, or sheets of substrate of 'tougher' material, it may be useful, in response to property(ies) of incoming substrate (e.g. material properties, geometric properties, properties related to waste portion(s) therein) to dynamically adjust the operating parameters.

Figure 20:
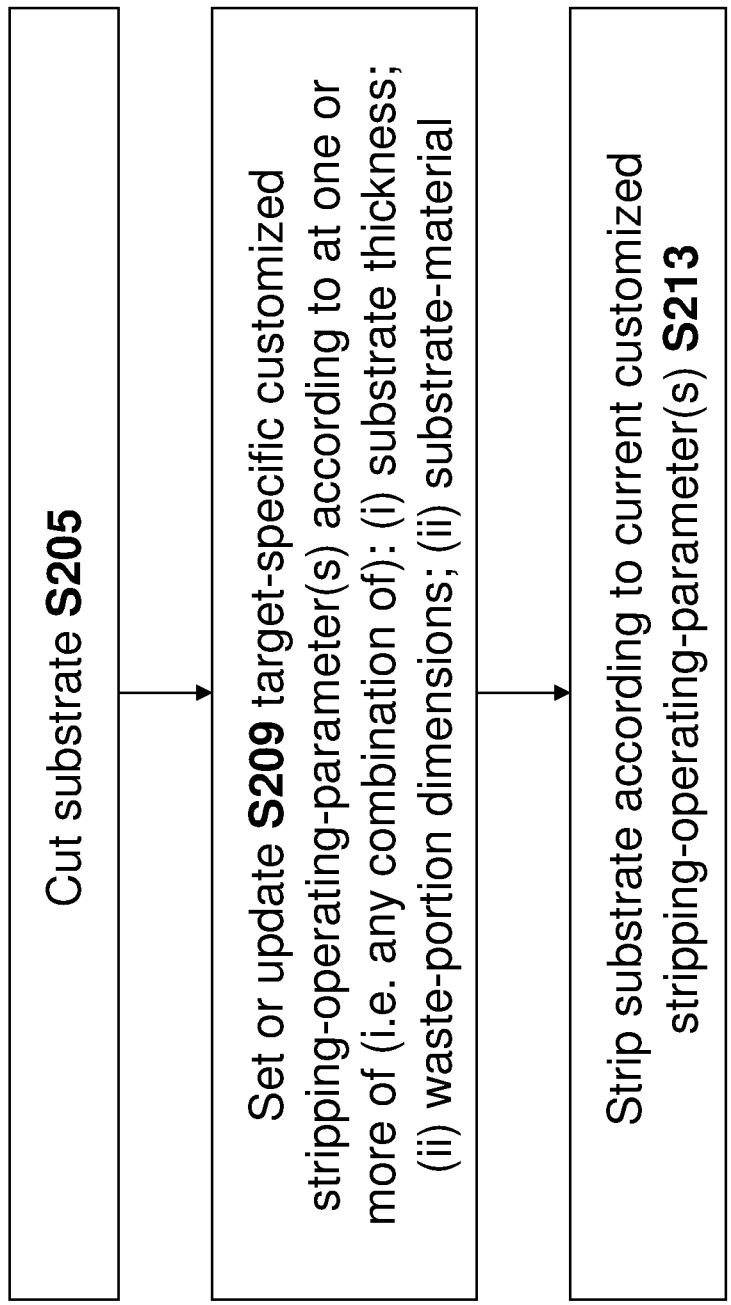
FIG. 20 is a flow-chart of a method for operating a stripping apparatus according to some embodiments.

FIG. 20 is a flow-chart of a method for operating a stripping apparatus according to some embodiments. After substrate is cut (step S205), the substrate is subjected to a customized stripping process in step S213. The 'operating parameters' of the stripping apparatus and/or process are customized in step S209 according to how 'aggressive' of a stripping treatment is required. Thus, if the substrate is relative thick, more aggressive stripping operating parameters (e.g. faster rotation rate and/or less vertical displacement between rotation axis 210 and substrate plan 98) may be employed. Alternatively or additionally, if the substrate of relatively 'tough' material (e.g. resistant to stripping because of the physical and/or chemical properties of the substrate), more aggressive stripping operating parameters may be employed. Alternatively or additionally, if the waste pieces to be stripped away are relatively 'large,' more aggressive stripping operating parameters may be employed.

Figure 21A:
FIGS. 21A-21C illustrate a heterogeneous substrate of substrate.
Figure 21B:
Figure 21C:
Figure 22:
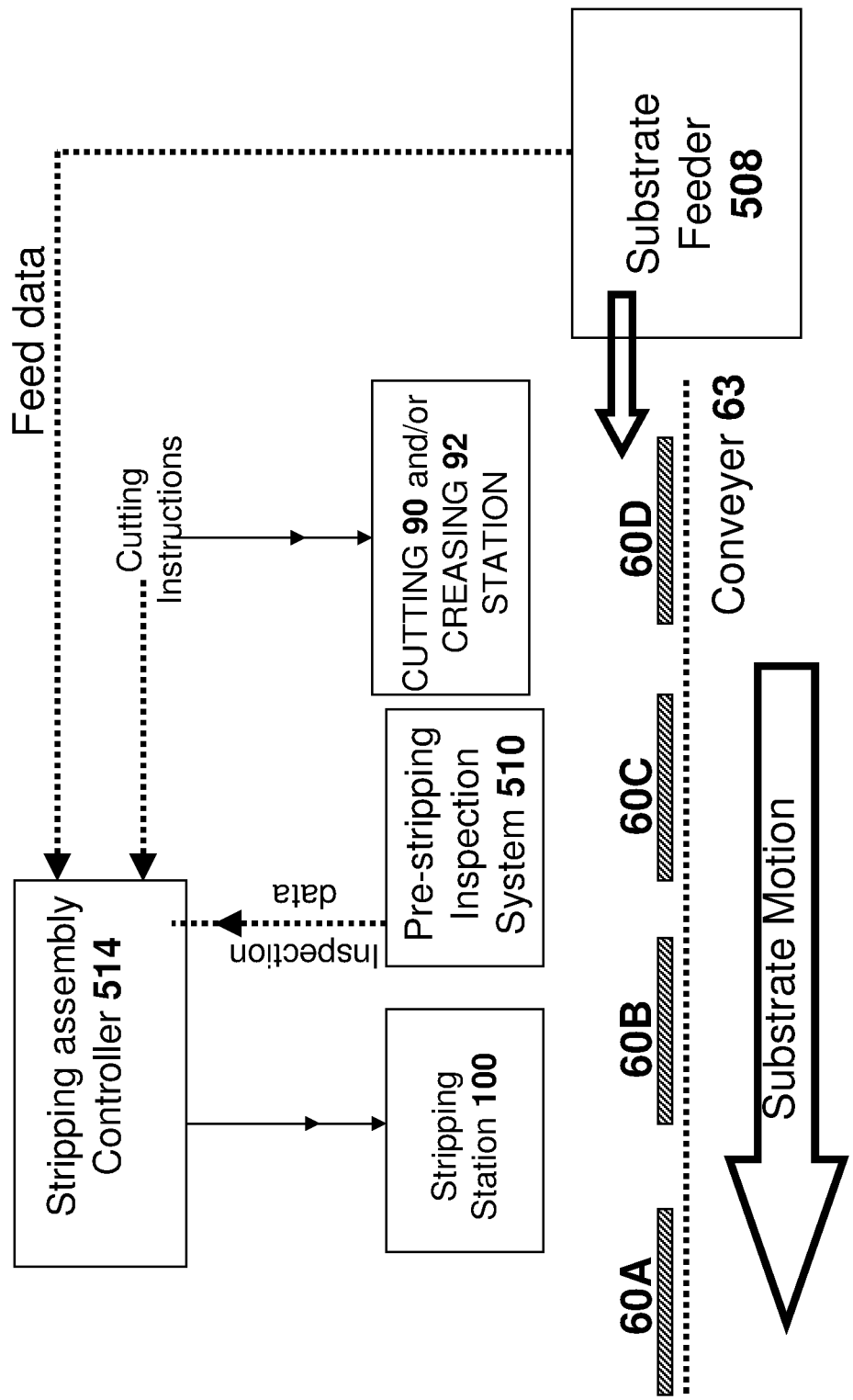
FIGS. 22-25 relate to dynamic operation of stripping assembly(ies).

In FIG. 21A-21C, it is shown that during operation, the properties of a 'current' substrate targets (e.g. pieces of substrate) may vary in time according to a sequent of stripping targets. In the example of FIG. 20A, first substrate target 60A is subjected to stripping, then second substrate target 60B is subjected to stripping, and then substrate target 60C is subjected to stripping, and then substrate target 60D is subjected to stripping—e.g. there may be a sequence of such substrate pieces on a conveyer belt. Targets 60A and 60C. where the 'waste portions' (in grey). are relatively large may require a more aggressive stripping treatment than targets 60B and 60D.

Thus, according to some embodiments related to the method of FIG. 20 and FIG. 21A, (A) first a stripping apparatus is operated according to 'more aggressive operating parameter(s)' (e.g. higher rotation rate) to subject target 60A to stripping, (B) then (i.e. after a change of stripping operating parameters in step S209) the stripping apparatus is operated according to 'less aggressive operating parameter(s)' (e.g. lower rotation rate) to subject targets 60B and 60C to stripping, (C) then (i.e. after another change of stripping operating parameters in step S209) the stripping apparatus is operated according to 'more aggressive operating parameter(s)' (e.g. higher rotation rate) to subject target 60D to stripping.

This technique used for 'target sequence 1' (FIG. 21A) may also be applied for target sequence 2 (FIG. 21B) where the substrate pieces are heterogeneous with respect to thickness (e.g. the thicker pieces require a 'more aggressive' stripping process) and for target sequence 3 (FIG. 21C) where even though the substrate pieces all have the same thickness, they are heterogeneous with respect to material (e.g. the pieces of 'tougher material' require a 'more aggressive' stripping process)

This may be implemented in any number of ways. Several techniques are now discussed with reference to FIG. 22—any one or any combination of these techniques may be used. In one example, a substrate feeder 508 (e.g. sheet or web feeder—this may be considered part of the substrate handling arrangement) may supply data to stripping station 100 (e.g. optionally via cutting and/or creasing station) according to feed data—e.g. data representing patterns illustrated in FIG. 21B or 21C. This feed data may be made available to stripping assembly controller 514 (e.g. comprising electronic circuitry) which then may instruct one or more stripping assemblies (e.g. of stripping station 100) to operate according to updated parameters—e.g. to accelerate the rotation rate and/or to modify the vertical offset or height H between substrate plane 98 and rotation axis 210. Towards this end, stripping station 100 may include a translation-drive (NOT SHOWN—e.g. including one or more motors or any other appropriate mechanical components) for reducing (or increasing) a vertical displacement between the rotation axis 210 and the substrate plane 98. Furthermore, the stripping assembly controller 514 may also regulate the rotation-drive (NOT SHOWN) to regulate the rotation rate of impact element(s) around their rotation axis 210.

Thus, in one example, stripping assembly controller 514 operate according to feed data. Alternatively or additionally, stripping assembly controller 514 may operate according to cutting instructions—e.g. if there is a particular cutting sequence—e.g. first cut the substrate according to the pattern of FIG. 19A and then cut the substrate according to the pattern of FIG. 19B. Information about the cutting instructions may be useful, for example, for determining that substrate according to the patterns of FIG. 21A will be directed to the stripping station. Alternatively or additionally, stripping assembly controller 514 may operate according to input from a pre-stripping inspection system 510.

An 'inspection system' (e.g. pre-stripping 510 or post-stripping as discussed below) obtains data about the substrate before or after stripping including but not limited to one or more of (any combination of) locations of cut-lines, crease-lines, substrate thickness, substrate materials, locations of voids (e.g. internal voids or voids bordering an edge of substrate) after stripping, or any other property of a substrate. In some embodiments, inspection system may include electronic circuitry.

The inspection system (510 or 524) may include any combination of (one or more of) image acquisition (e.g. camera) and/or image-processing components, magnetic detector, capacitive detector, optical detector (e.g. beams of light and photodetectors or any other optical components), mechanical detectors (e.g. a mechanical scale may determine a weight of pre-stripping or post-stripping substrate) or any combination thereof.

Optionally (and in particular, for post-stripping inspection system 524) inspection system 510 or 524 includes electronic circuitry (e.g. based on artificial-intelligence and/or image-processing) for determining an 'extent' of stripping errors.

Figure 23:
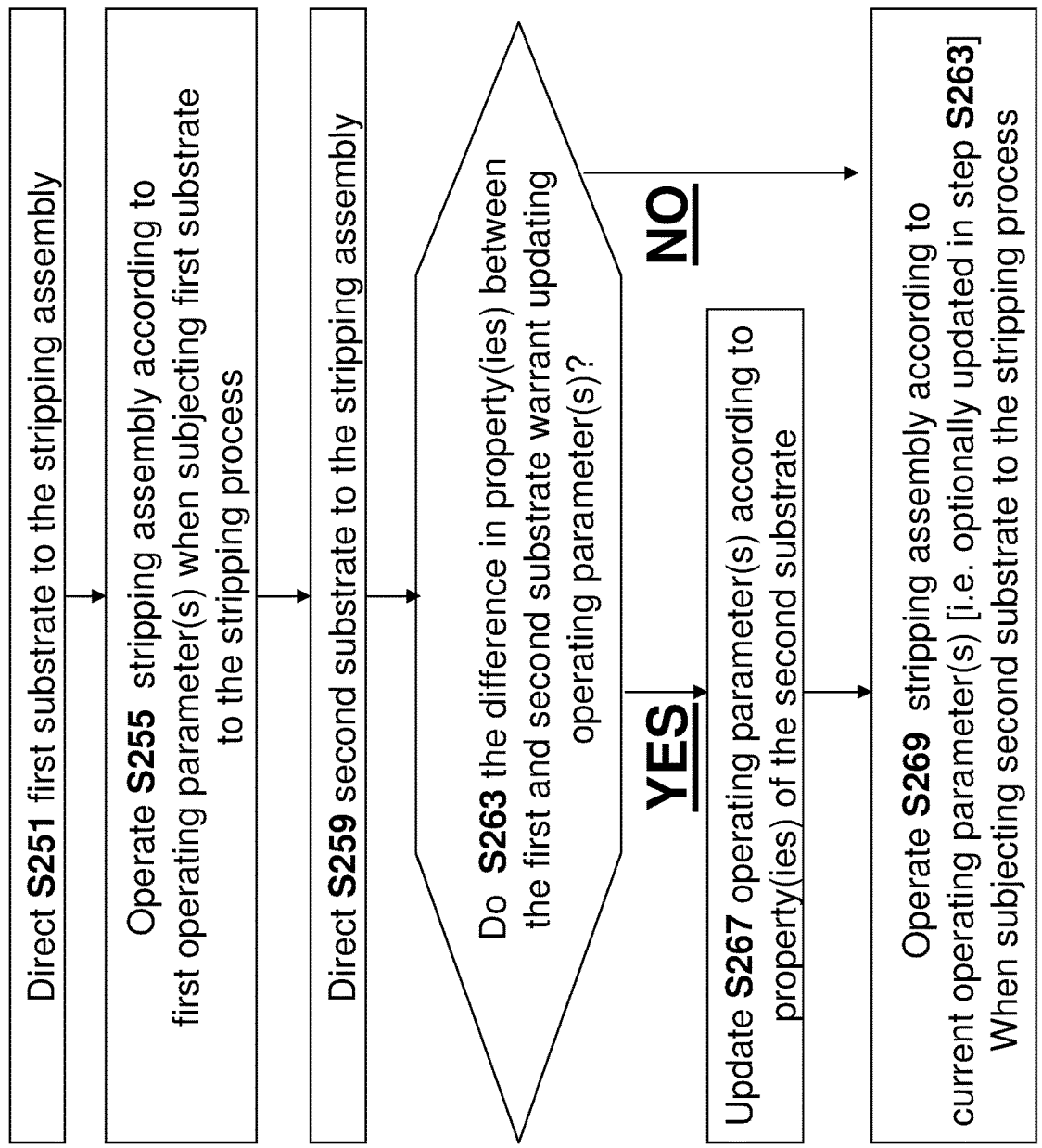
Figure 24:
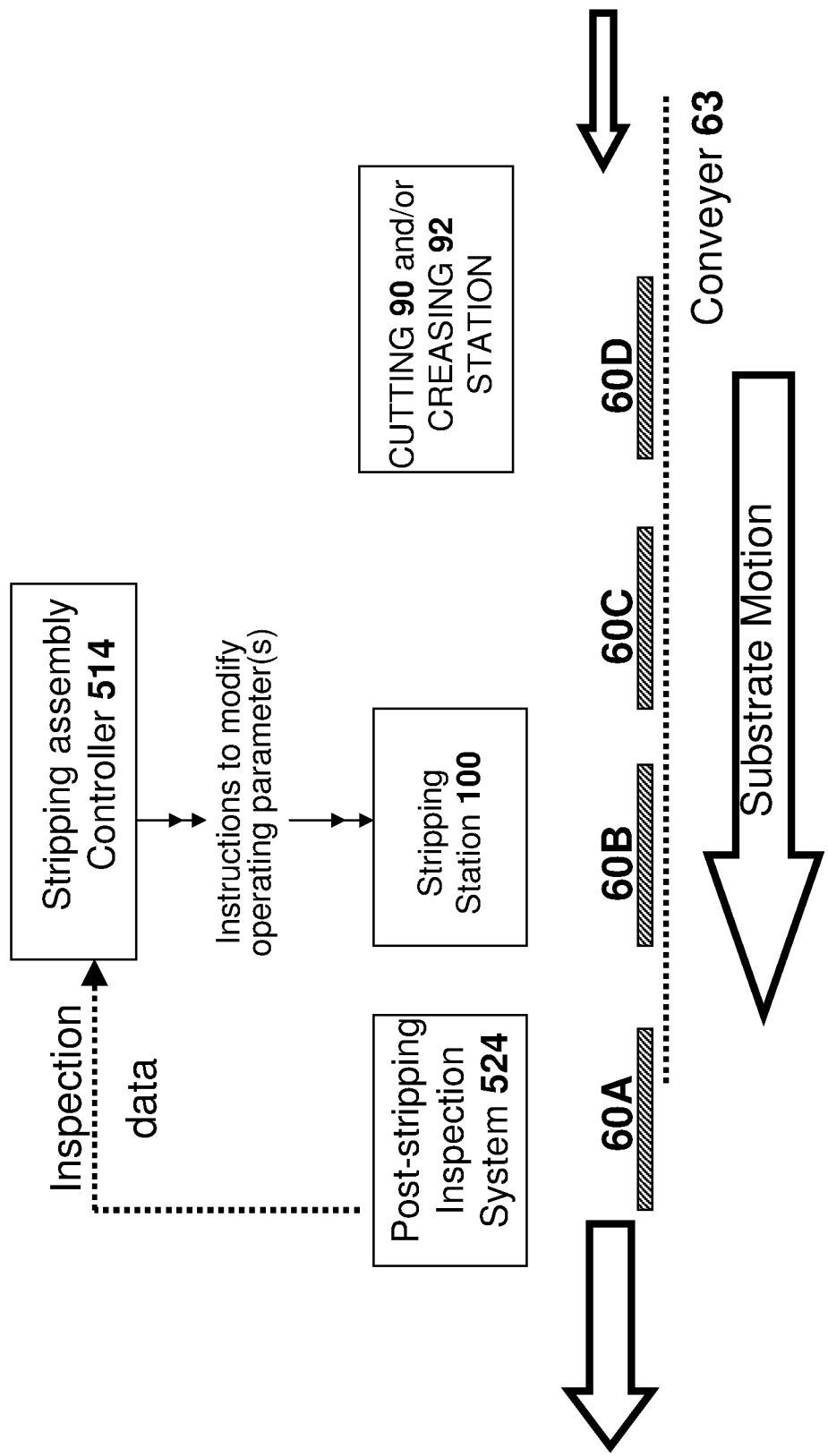

FIG. 23 is a flow-chart of a method for dynamically regulating operating parameter(s) of a stripping assembly. In step S251, first substrate is directed to a stripping assembly 110. The first substrate is subjected to a stripping processes by stripping assembly 110 according to a first set of operating parameter(s) in step S255. In step S259, second substrate is directed to the stripping assembly. In step S253, it is determined if there is a 'difference in property(ies) between the first and second substrate. Substrate 'properties' may include one or more thickness, material, size or number of waste portion(s) (e.g. as defined by partial cuts or substrate weakening), or other properties.

If the difference in properties warrants updating the operating parameter(s) (e.g. substrate 60B of FIG. 21B is significantly thicker than substrate 60A of FIG. 21B), then in step S267 the operating parameter(s) are updated—e.g. controller 514 sends an instruction to one stripping station 110.

In step S269, stripping assembly subjects second substrate to a stripping process—e.g. according to updated parameters if, in fact, they were updated.

As noted above, in some embodiments, there may be some sort of estimated or known correlation between substrate property(ies) and operating parameters (or expected success thereof) of the stripping station. This is not a requirement.

Alternatively or additionally, it is possible to dynamically regulate operating parameter(s) of stripping station 100 by inspecting post-stripping substrate—if the stripping was relatively successful, there may be no need to update the parameters. On the other hand, in response to detection (e.g. by post-stripping inspection system 524 configured to acquire data about substrate that has been subjected to the stripping process at stripping station 100) of stripping-errors (or a quantity thereof), it may be possible to attempt to 'correct' the situation to attempt to reduce the number of stripping errors subsequently-processed substrate.

For the present disclosure, an 'extent' of stripping error may refer to a presence or absence of stripping errors, a number of stripping errors, or a density of stripping errors. Alternatively, some sort of scoring system may be established where certain stripping errors (e.g. larger waste-portion(s) in some embodiments, smaller waste-portion(s) in other embodiments) are considered more important.

Any inspection system disclosed herein may optionally be configured to compute, from inspection data of substrate, an 'extent' of stripping errors.

Figure 25:
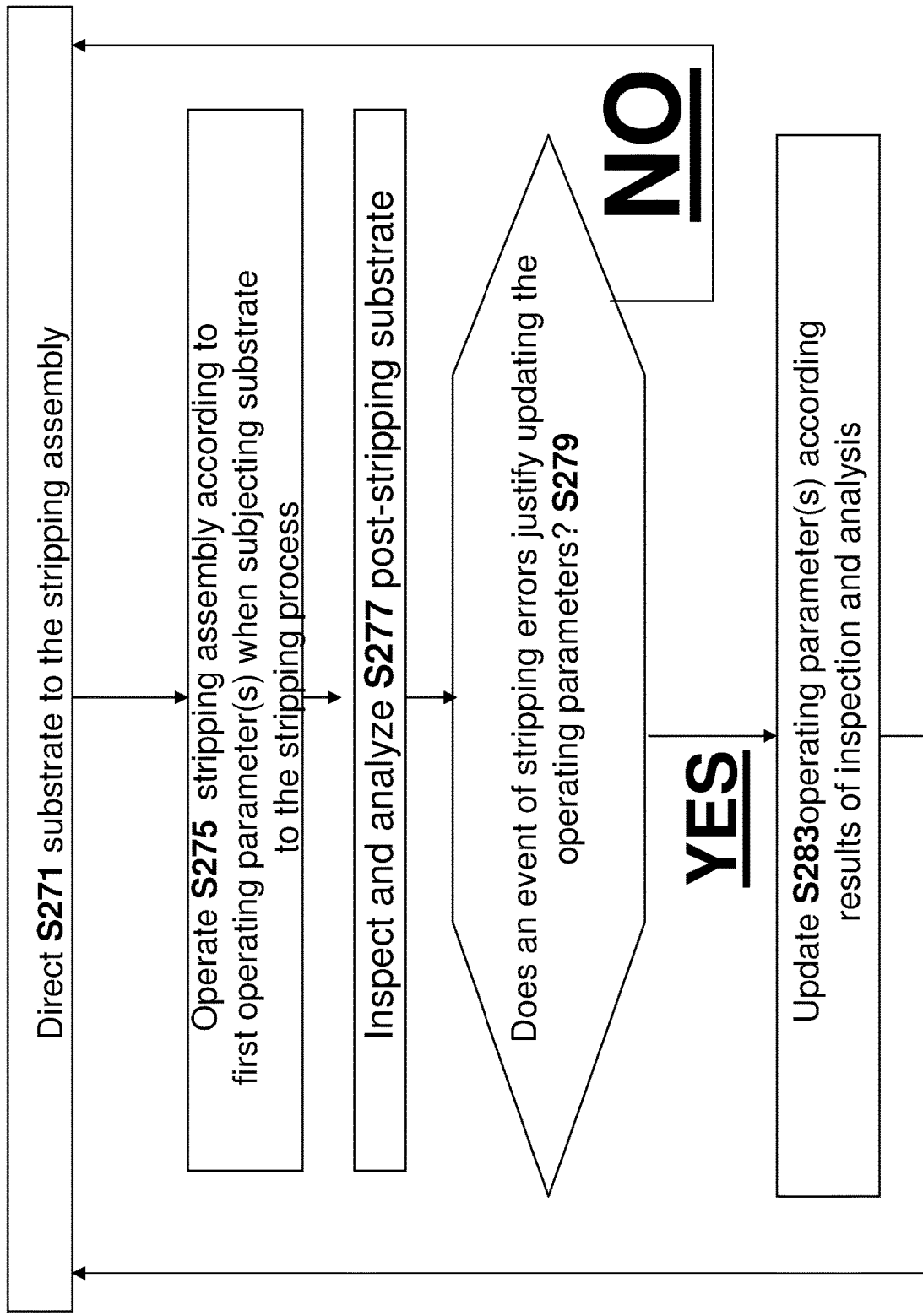

FIG. 25 is a method for dynamically regulating operating of stripping station 100 according to inspection data from post-stripping substrate.

In step S271, substrate is directed to a stripping assembly 110. The substrate is subjected to a stripping processes by stripping assembly 110 according to a first set of operating parameter(s) in step S275. In step S277, the post-stripping substrate is inspected and the data is analyzed. In step S279 it is determined if an 'extent' of stripping error(s) (if any) justified updating the operating parameters—e.g. the extent of stripping error(s) may exceed some sort of (optionally pre-determined) threshold.

If so, in step S283, operating parameter(s) of stripping station 100 (e.g. rotation speed or vertical displacement) is updated.

In some embodiments, the operating parameter(s) may be iteratively updated. For example, a 'learning' or 'closed-loop' control system may be provided where (i) various operating parameters are employed, (ii) the post-stripping status of substrate is determined (e.g. by inspection system 524)—for example, to determine 'extent' of stripping errors. Thus, the system may be configured to closed-loop control to iteratively In the event that different substrate is sent to the stripping station, information about this substrate may be not be required a-priori—if the different substrate causes an increase in stripping errors, the system may automatically respond by updating to the operating parameter(s) best suited to the different substrate, even if multiple trials are required.

Figure 26A:
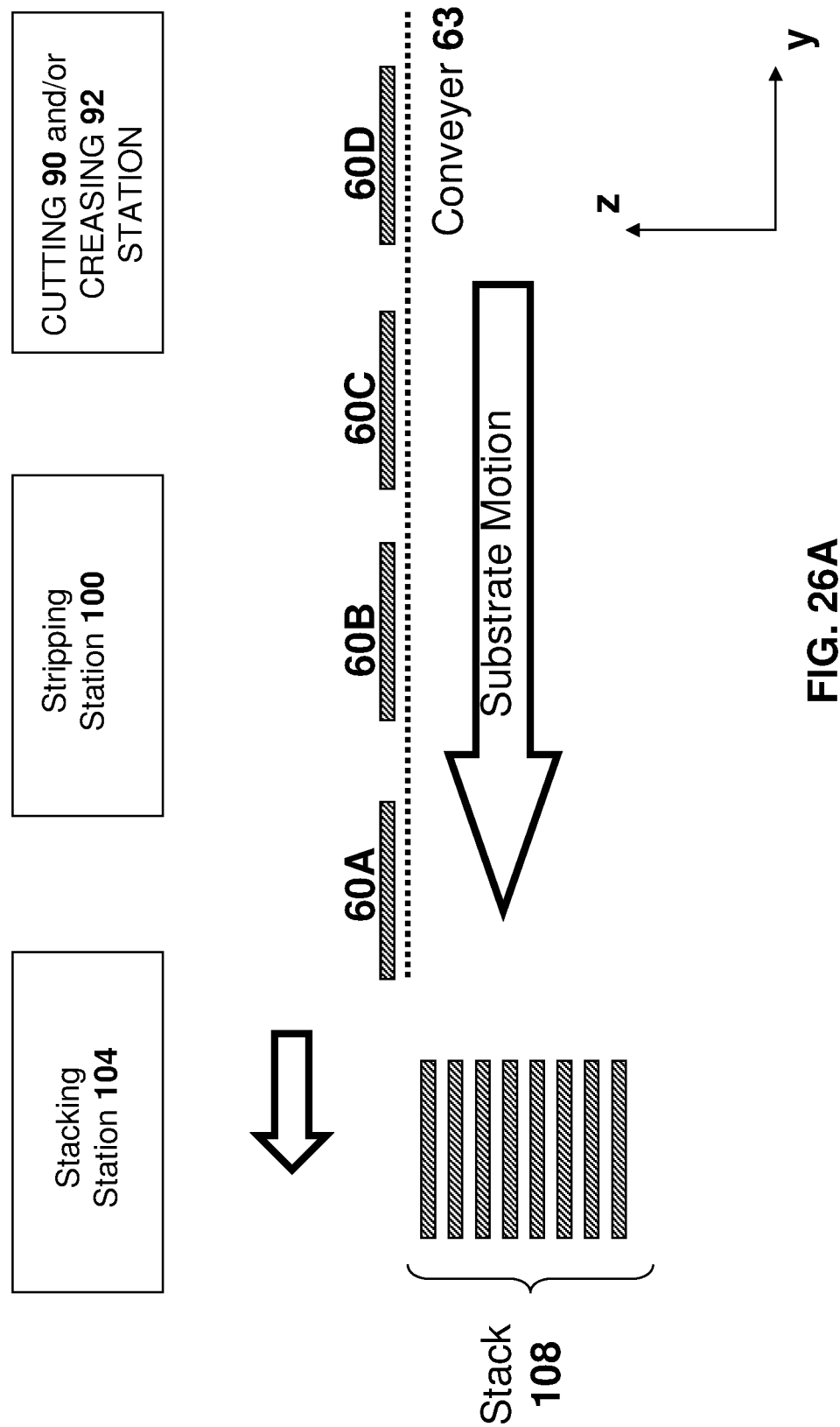
FIGS. 26A-26B respectively describe a system and method for stacking post-stripping substrate.
Figure 26B:
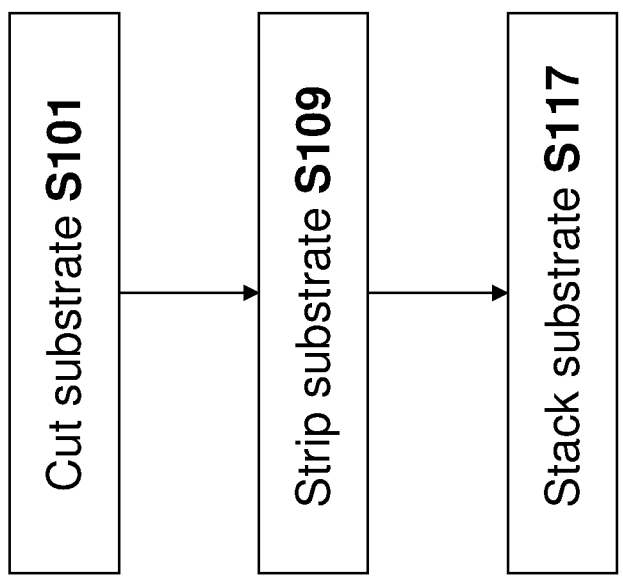

FIG. 26A illustrates a system comprising (A) a cutting 90 and/or creasing 92 station (B) a stripping station 100 and (C) a stacking station 104, in accordance with some embodiments of the invention. In some embodiments, the stripping station 100 is horizontally displaced from the stacking station 104. In some embodiments, the stripping station 100 is horizontally displaced from the cutting 90 and/or creasing 92 station.

As illustrated in FIG. 26A, substrate 60 is conveyed between the stations on a conveyer system 63 (e.g. comprising a belt). The post-stripping substrate may be stacked at stacking station 104 to form a stack 108 of substrate. As illustrated in FIG. 26B, the order of the steps may be first cutting S101, then stripping S109 and then stacking S117. In any embodiment discussed herein, post-stripping substrate may be aggregated into a stack 108, for example, at a stacking station 104. As noted above, during or after stacking, the stacked substrate (i.e. object-layers formed from substrate) is bonded to form the 3D object.

In some embodiments, not every portion (e.g. sheet) of post-stripping substrate is stacked—conditional or contingent or selective stacking may be performed. This may be useful, for example, when high-quality or high-value post-stripping product is to be sent, and stripping errors are unacceptable—if the stripping station cannot operate perfectly, it may be preferable to detect this and to divert post-stripping substrate from the stack to be shipped.

Figure 27:
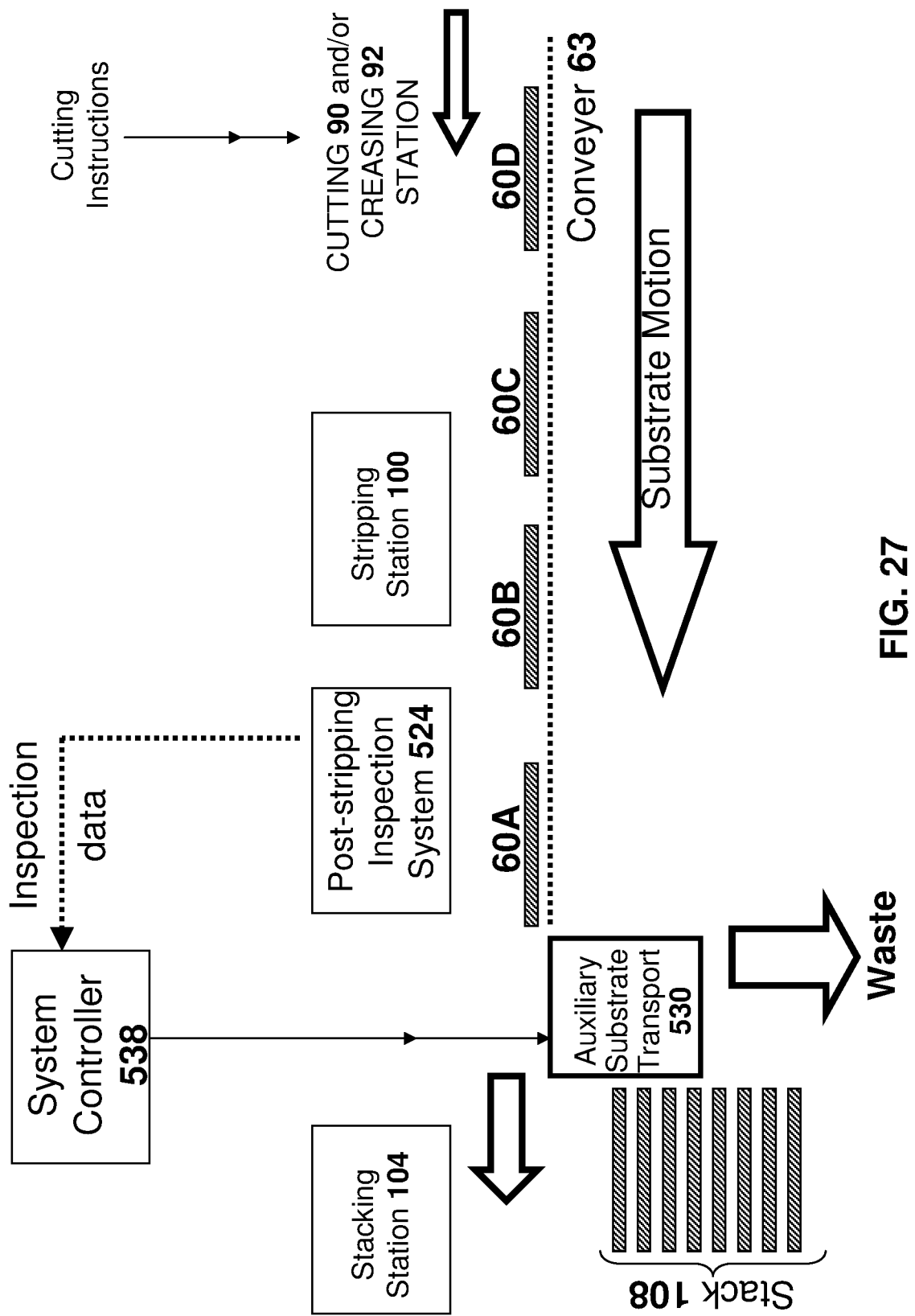
FIGS. 27-28 relate to selective stacking according to inspection data.

As shown in FIG. 27, the post-stripping substrate may be inspected to generate inspection data and this inspect data may be analyzed—e.g. by system controller 538 which may include electronic circuitry. In the event that the inspection data indicates 'poor stripping' (e.g. the 'extent of stripping error(s))' is unacceptable, the system controller auxiliary substrate transport 530 is activated (e.g. by system controller 538) to prevent post-stripping substrate from reaching the stack.

The system controller auxiliary substrate transport 530 may include vacuum(s), blower(s) or belt or conveyer belt (or associated apparatus) any other component known in the art to modify motion (e.g. translation motion) of substrate.

Figure 28:
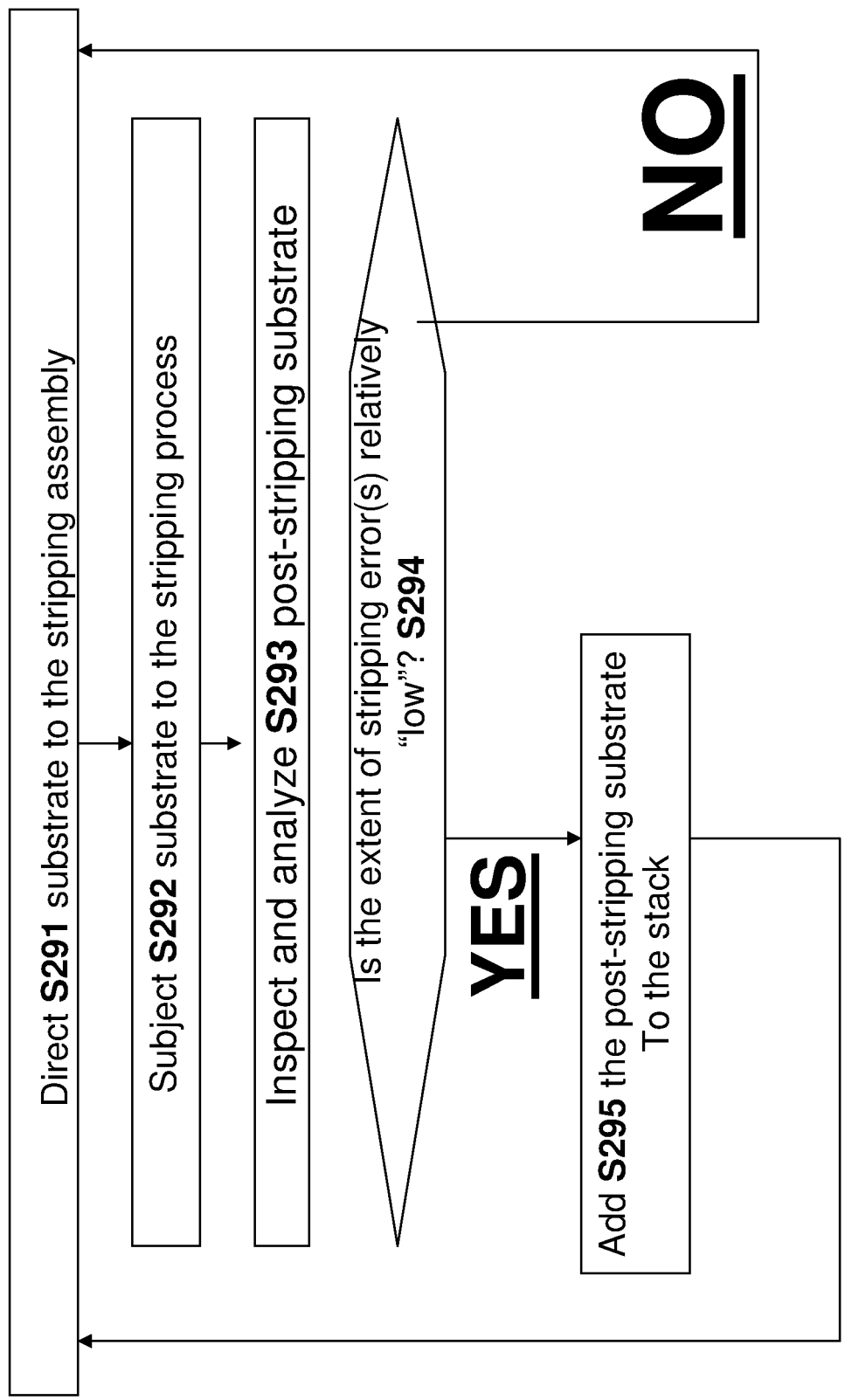

A related method for conditional stacking is illustrated in FIG. 28. In step S201, substrate is directed to a stripping assembly 110. The substrate is subjected to a stripping processes by stripping assembly 110 according to a first set of operating parameter(s) in step S292. In step S293, the post-stripping substrate is inspected and the data is analyzed. In step S294 it is determined if an 'extent' of stripping error(s) is relatively 'low' (according to standard parameter(s) or customizable parameter(s)—based on a scoring system), then the post-stripping substrate is added to the stack in step S295. Otherwise, the post-stripping substrate may be diverted from or prevented from being added to the stack—e.g. by auxiliary transport system 530—for example, sent to the waste and/or to recycling.

Another novel technique for recovering from 'stripping failure' is now presented with reference to FIGS. 29-32. FIG. 29 is a specific example illustrating 9 cutting patterns P1-P9—after the cutting, waste is removed from the substrate according to the cutting patterns. FIGS. 30A-30F relate to a 'first example' of stripping of waste portions from substrate. The example of FIGS. 31A-31H relates to a technique for recovering from detected stripping errors.

Reference is now made to FIGS. 30A-30F which respectively present six frames A-F—each frame is associated with a different point in time $t_1$-$t_6$. In all of FIGS. 30A-30F, substrate moves first to a cutting and/or creasing station, then to a stripping station 100, and then optionally to a stacking station 104 (NOT SHOWN in FIGS. 30A-30F). The 'output sequence' shown in FIGS. 30A-30F illustrates substrate targets (e.g. pieces or sheets of substrate) that have been successfully cut and then subjected to a 'successful' stripping process where waste portions are successfully stripped away—each substrate target in output sequence (and in the sequence under stripping and cutting/creasing stations) is identified by its cutting pattern P1-P9 (see FIG. 29).

Thus, in Frame 'A' of FIG. 30A, (i) a piece or sheet of substrate cut to pattern P1 was already successfully stripped away; (ii) stripping station 100 is currently subjected to stripping a piece or sheet of substrate previously cut to pattern P2 and (iii) cutting station 90 is forming pattern P6 in a piece or sheet of substrate.

In Frame 'B' of FIG. 30B, (i) piece or sheet of substrate cut to patterns P1 and P2 were already successfully stripped away; (ii) stripping station 100 is currently subjected to stripping a piece or sheet of substrate previously cut to pattern P3 and (iii) cutting station 90 is forming pattern P7 in a piece or sheet of substrate.

This behavior continues in FIGS. 30C-30F with no stripping errors.

FIGS. 31A-31F relate to a method for recovering from stripping errors—in the example of FIGS. 31A-31F, only a single stripping error occurs in FIG. 31A where (i) a piece or sheet of substrate cut to pattern P2 is not properly stripped and (ii) this is then detected—for example, by stripping quality detector 97.

Instead of being sent to an output sequence (e.g. on a stack 108), the improperly stripped substrate target (e.g. piece or sheet) may be diverted to waste and optionally recycled. However, if the procedure were to continue as before, this would disrupt the intended 'output sequence' P1; P2; . . . ; P9. In particular, the output sequence would be modified to P1, P3, P4, P5 . . . P9.

Therefore, additional substrate targets (e.g. pieces or sheets) are discarded and the 'cutting behavior' of the cutting station may also be modified. Thus, in frame FIG. 24B, instead of cutting pattern P7 at cutting station 90 (which would occur in the absence of the stripping error to piece or sheet P2 in FIG. 31A), cutting station 90 modifies its behavior according to the detected 'downstream error' and forms pattern P2.

Furthermore, in FIGS. 31B-31G, substrate targets (e.g. pieces) are diverted from the 'output sequence'—e.g. not added to stack 108. Thus, the stacking process is also performed according to detected 'stripping errors.' Only when all sequence-inappropriate substrate targets are diverted away from the output sequence is a new substrate target (e.g. piece of substrate) added to the output sequence (e.g. stack 108) in FIG. 31H.

Figure 32:
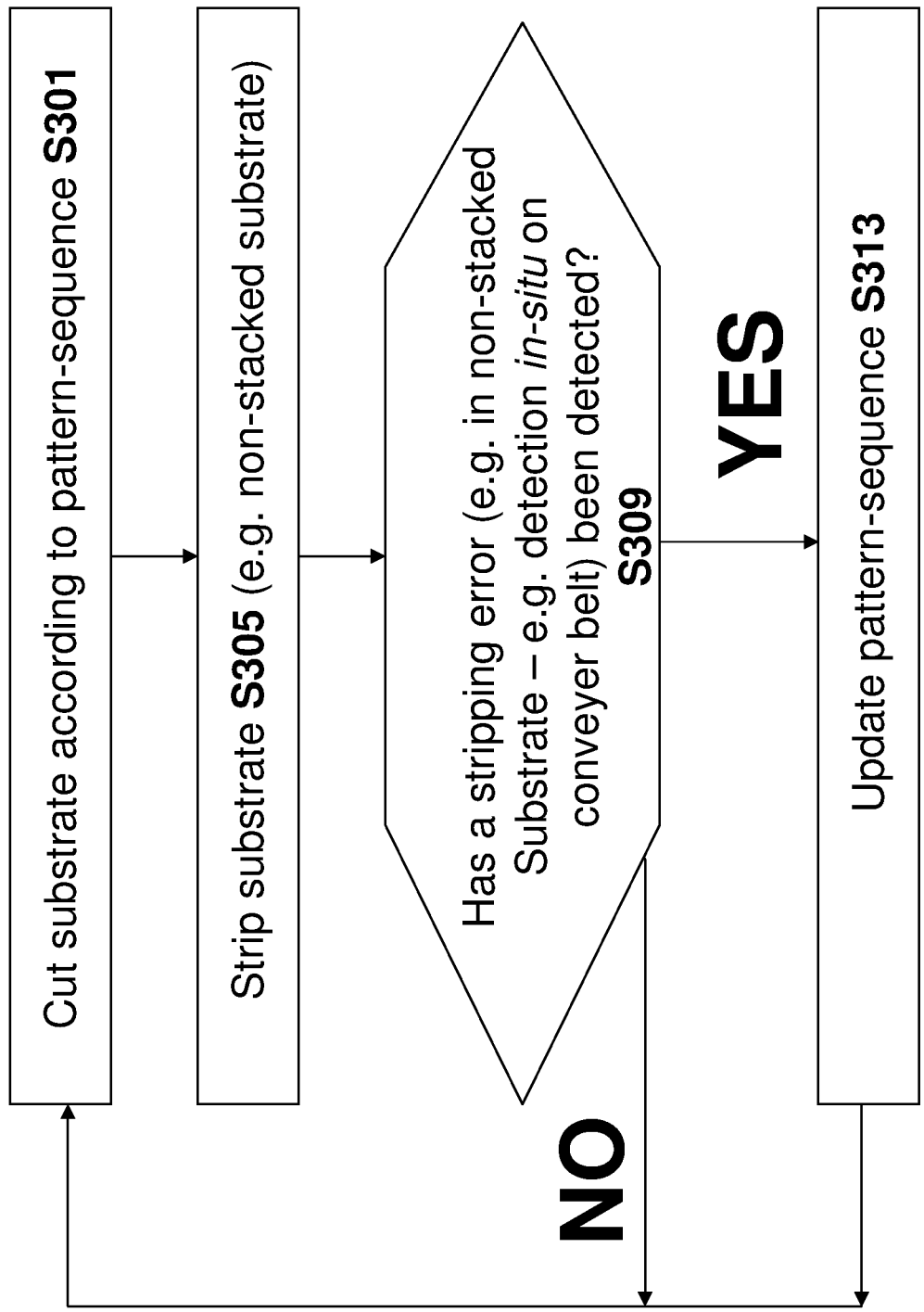
FIG. 32 is a flow-chart of a method for recovering from stripping error(s).
Figure 33:
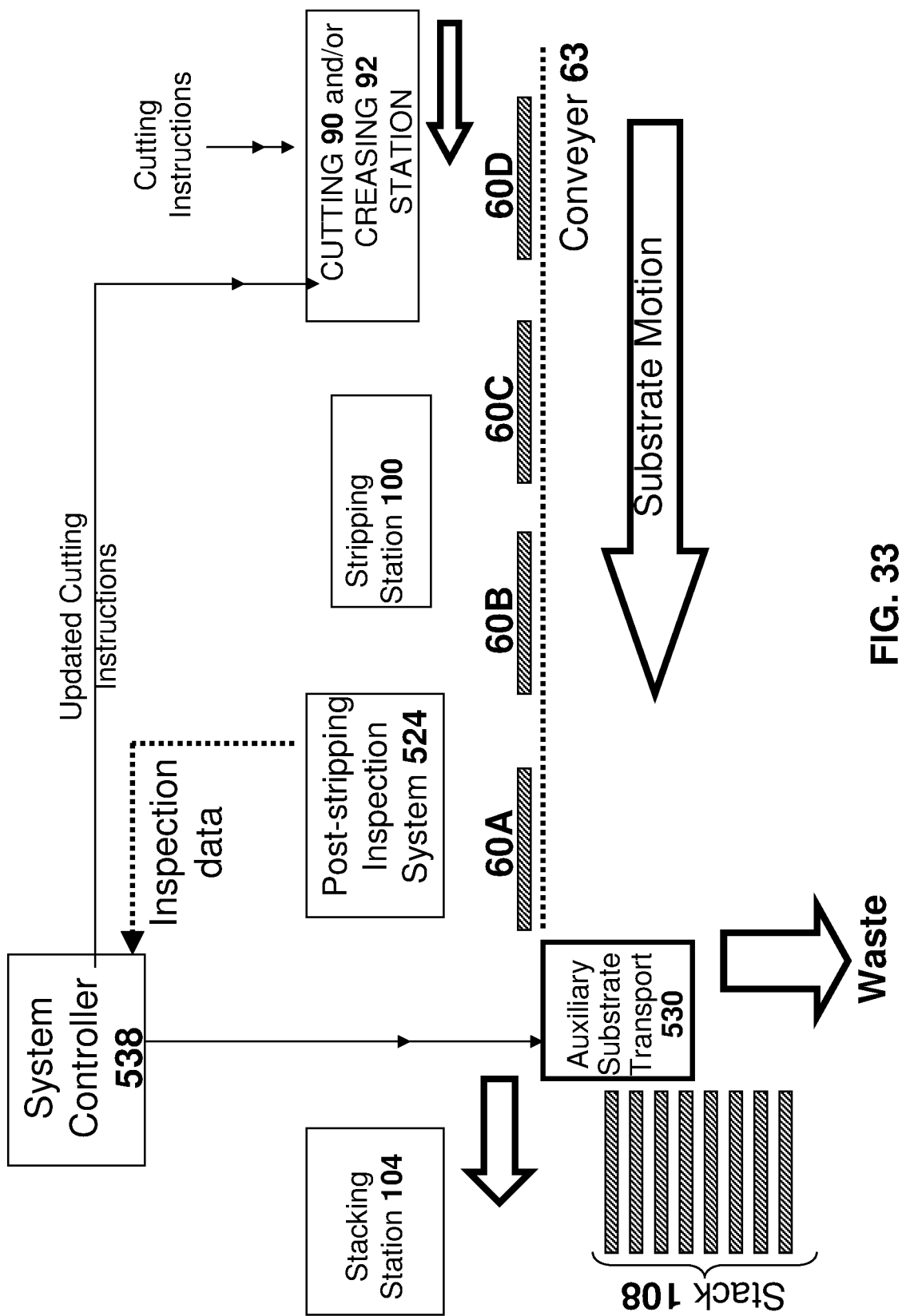
FIG. 33 is an apparatus configured to recover from stripping error(s).

FIG. 32 is a flowchart of a method for recovering from detected stripping errors—e.g. the stripping error of FIG. 31A. In step S301, substrate is cut (e.g. at a cutting station) according to a pattern sequence of 'cutting patterns' (e.g. P1, P2, P3 . . . P9). Each piece of substrate to a stripping process in step S305—for example, a single sheet or web portion and before stacking. In step S309, a determination is made if a stripping error has been detected. In step S313, in response to a positive determination' that, in fact, an error has been detected, the pattern sequence is update. Thus, in the example of FIGS. 31A-31H, the pattern sequence 'P7; P8; P9; P1; P2; P3' of cutting patterns is replaced with the sequence 'P2; P3; P4; P5; P6; P7.'

Figure 34A:
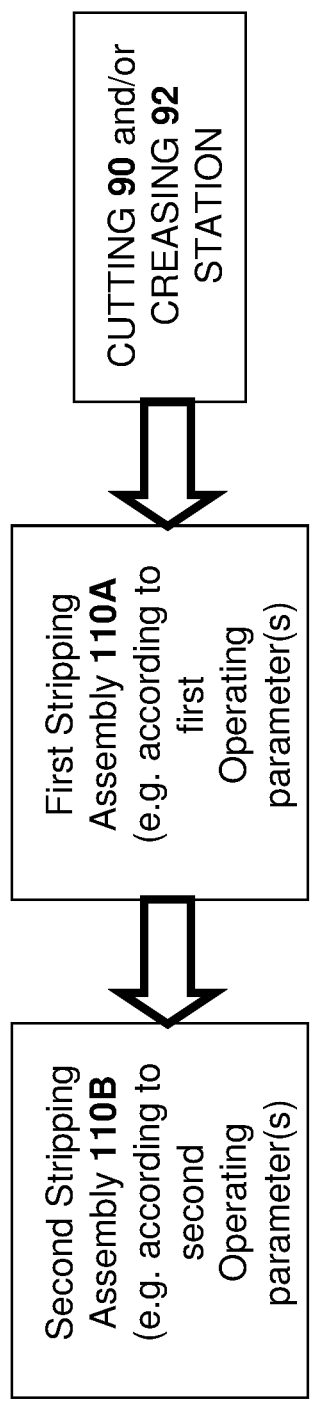
FIGS. 34A-34B and 36 describe systems including multiple stripping assemblies arranged in series.
Figure 34B:
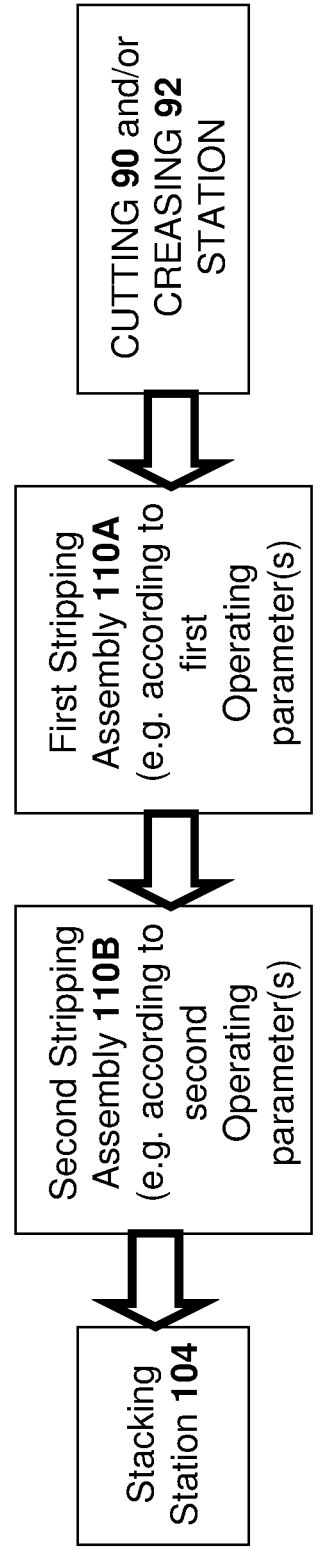
Figure 35:
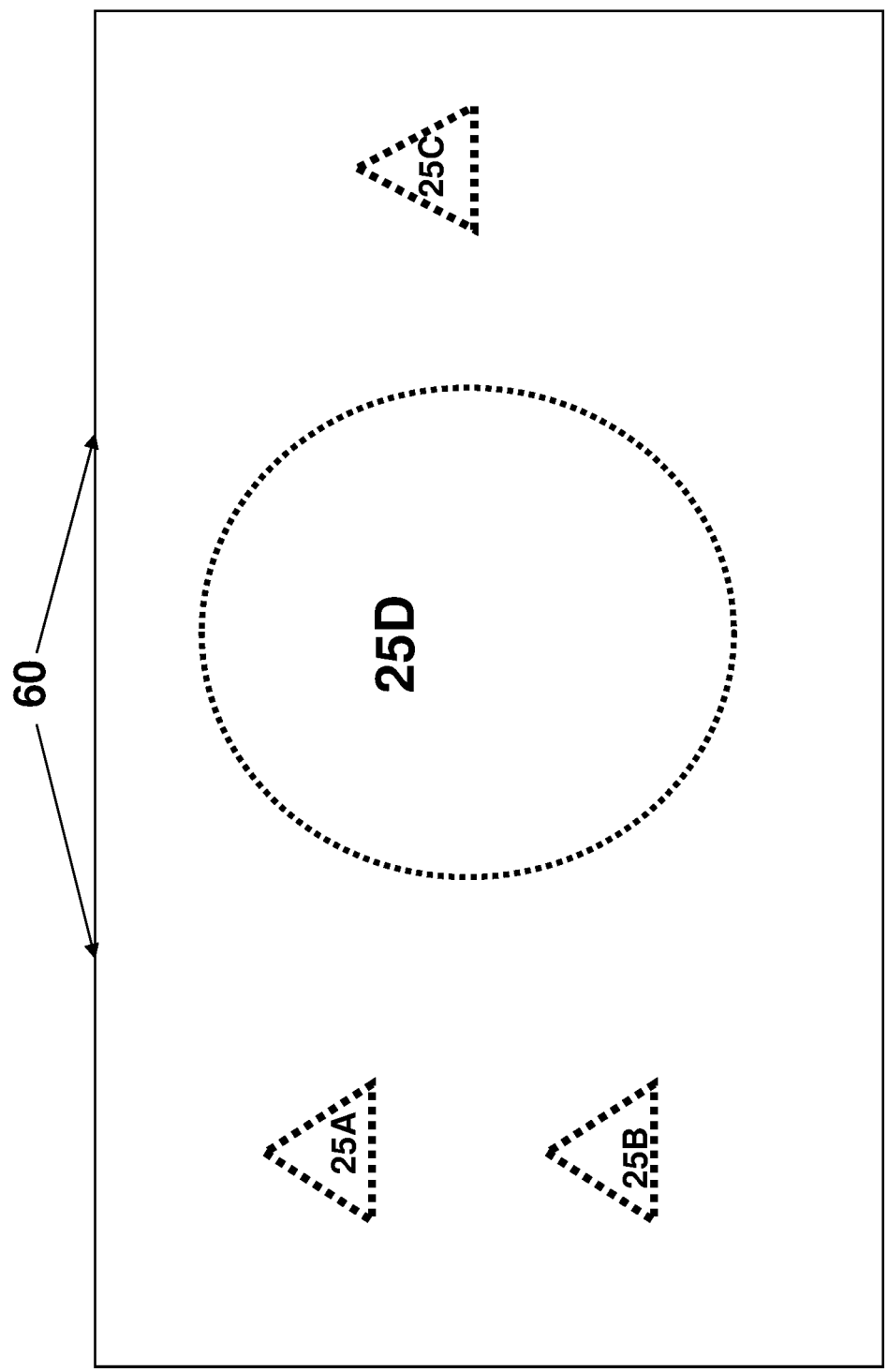
FIG. 35 illustrates substrate including both small and large waste-portions.
Figure 36:
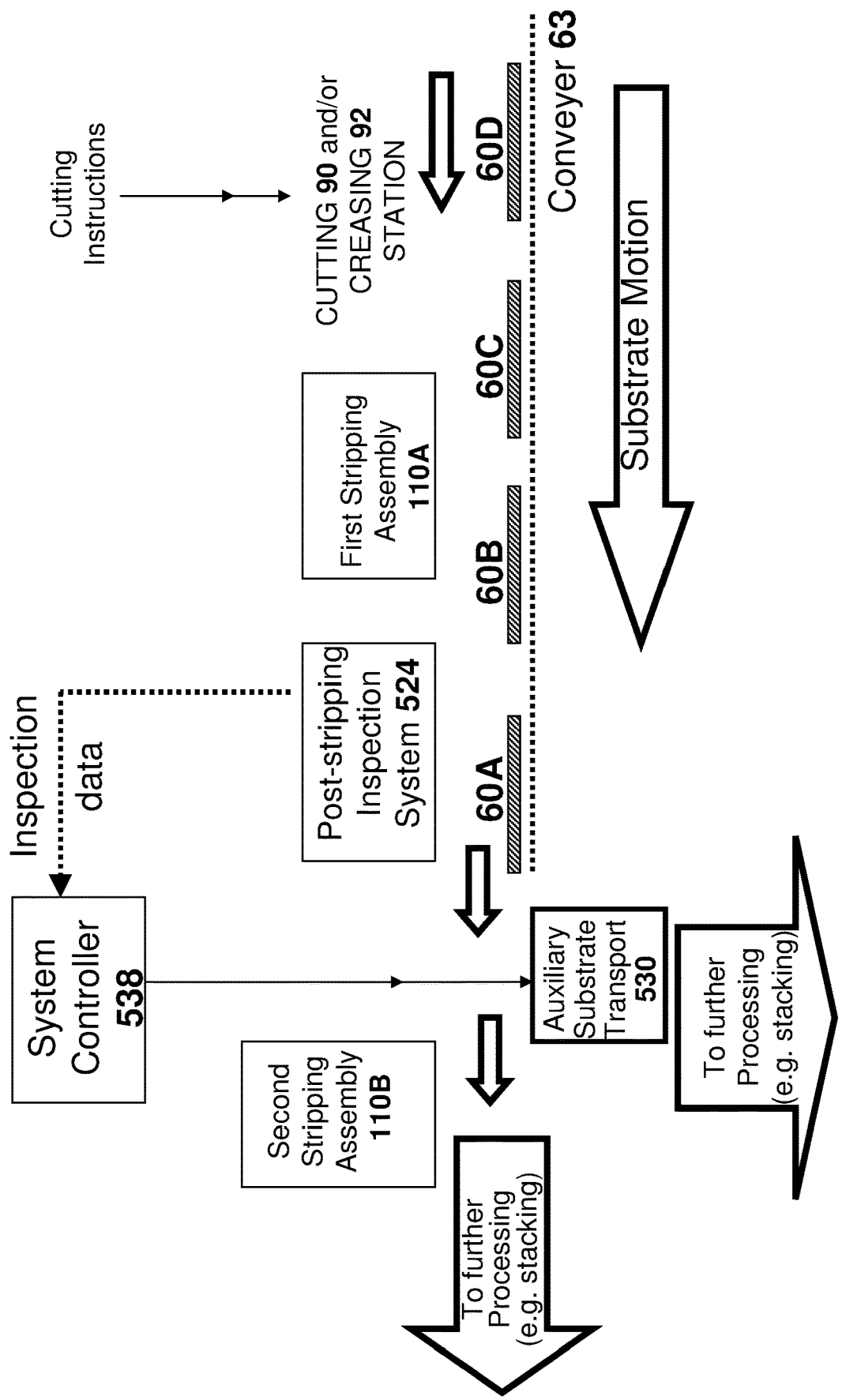

Reference is now made to FIGS. 34-36. Some embodiments relate to techniques for stripping where (i) first, substrate is subjected to a first stripping process at 'upstream' stripping assembly 110A and (ii) subsequently, the substrate is transported to a second or 'downstream' stripping assembly 110B where it is subjected to a second stripping process. The stripping assemblies may be horizontally displaced from each other.

As shown in FIGS. 4A-4C and 8A-8C, the first and second stripping assemblies (e.g. rotation axis of the impact elements) may be disposed on opposite sides of a substrate plane. Alternatively (NOT SHOWN), they may be disposed on the same side of substrate plane.

The sequential stripping process of FIGS. 34A-34B may be useful, for example, for the piece of substrate 60 illustrated in FIG. 19. As illustrated in FIG. 35, the substrate includes both 'small' 25A-25B and 'large' 25D waste-portions that need to be stripped away.

Thus, in one example, (i) at the first stripping assembly 110A the rotating impact elements 212 are relatively 'heavy' and/or 'dense' and are thus appropriate for removing 'larger' pieces of waste from the substrate (e.g. 25D) for 'coarse' stripping; and (ii) at the second stripping assembly 110B the impact elements 212 are relatively 'light' and are thus appropriate for removing 'smaller' pieces of waste from the substrate (e.g. 25A-25B) for 'fine' stripping Alternatively or additionally, at the second stripping assembly 110B the impact element(s) are rotated at a higher rotational velocity than at the impact element(s) at the first stripping station 100A in order to increase a probability of a 'direct collision' between impact element(s) and waste portion(s).

Some embodiments relate to an apparatus for stripping away portions of a substrate, the apparatus comprising: a. first (e.g. upstream) 110A and second 110B (e.g. downstream) stripping assemblies, each stripping assembly including a respective group of flexible and/or soft impact-element(s) that are respectively and rotatably mounted to a respective rotation-axis, the first and second stripping assemblies respectively defining first and second stripping-locations thereunder; b. a substrate handling arrangement adapted to (i) deliver substrate to the first stripping location so that substrate is maintained at a first substrate-plane when at the first stripping location; and (ii) subsequently deliver substrate from the first to the second stripping location so that the substrate is maintained at a second substrate-plane when located at the second stripping location; and c. one or more drive system(s) (NOT SHOWN), the drive system(s) configured to respectively drive rotational motion, at first and second rotation-rates, of the flexible and/or soft impact-element(s) of the first and second stripping assemblies around their respective rotation-axes, wherein the stripping assemblies, substrate-handling system and drive-system(s) are configured so that i. rotation of the flexible and/or soft impact-element(s) of the first stripping assembly around a rotation axis thereof causes the flexible and/or soft impact-element(s) thereof to repeatedly reach the first substrate-plane to repeatedly collide with substrate simultaneously disposed at the first stripping location and at the first substrate-plane, thereby stripping away first portion(s) of the substrate; ii. rotation of the flexible and/or soft impact-element(s) of the second stripping assembly around a rotation axis thereof causes the flexible and/or soft impact-element(s) thereof to repeatedly reach the second substrate-plane to repeatedly collide with substrate simultaneously disposed at the second stripping location and at the second substrate-plane, thereby stripping away second portion(s) of the substrate after the first portion(s) have been stripped away, wherein the drive system(s) operates so that the second rotation-rate exceeds the first-rotation rate.

In some embodiments, the first substrate plane i.e. 98A under stripping assembly 110A (not shown) and second substrate plane i.e. 98A under stripping assembly 110B (not shown) have a common elevation. Alternatively, first and second substrate planes are at different elevations.

In some embodiments, a ratio between the second and first rotation rates is at least 1.1 or at least 1.25 or at least 1.5 or at least 2 or at least 3 or at least 5 or at least 7.5 or at least 10.

In some embodiments, collisions between flexible and/or soft impact-element(s) of the first and second stripping assemblies respectively transfer downward momentum to substrate respectively at the first and second stripping location such that a ratio between (i) an average per-collision momentum-magnitude transferred to substrate at the first stripping location and the first substrate-plane and (ii) an average per-collision momentum-momentum transferred to substrate at the second stripping location and the second substrate-plane, is at least 1.1 or at least 1.25 or at least 1.5 or at least 2 or at least 3 or at least 5 or at least 7.5 or at least 10.

In some embodiments, a ratio between a maximum mass of impact element(s) of the first stripping assembly and a maximum mass of impact element(s) of the second stripping assembly is at least 1.1 or at least 1.25 or at least 1.5 or at least 2 or at least 3 or at least 5 or at least 7.5 or at least 10.

In some embodiments, a ratio between an average mass of impact element(s) of the first stripping assembly and an average mass of impact element(s) of the second stripping assembly is at least 1.1 or at least 1.25 or at least 1.5 or at least 2 or at least 3 or at least 5 or at least 7.5 or at least 10.

In some embodiments, the system further comprises d. an inspection system 524 configured to analyze post-stripping substrate; and/or e. a controller configured to control substrate handling arrangement so that the delivery of substrate from the first to the second stripping location is conditional upon output of the inspection system.

In some embodiments, d. an inspection system configured to analyze post-stripping substrate to detect stripping error(s); and/or e. a controller configured to control substrate handling arrangement so that the delivery of substrate from the first to the second stripping location is conditional upon a level of the stripping error(s) exceeding a error-threshold.

Referring once again to FIGS. 34A-34B and 36, it is noted that after the substrate is subjected to the first stripping process (e.g. coarse process and/or at a first stripping assembly 110A), the substrate is inspected/measured/analyzed to determine if the first stripping process was adequate. In the embodiment shown in FIG. 36, an auxiliary substrate transport 530 is operatively linked to system controller 538'. Alternatively or additionally, the image may be viewed by an operator who in turn, provide routing instruction relating to the inspected substrate, as will be detailed below.

In the event that the first stripping process is 'successful' and/or of 'high quality,' there is no need for auxiliary substrate transport 530 (e.g. conveyer-belt based) to route the post-stripping substrate (i.e. after the first stripping process) to the second stripping assembly 110B. In this case, the substrate may be stacked without requiring a second stripping process—e.g. system controller 538 may route the 'successfully-stripped' substrate to stacking station 104 without any need for undergoing a second stripping process before stacking.

However, in the event that the first stripping process is 'unsuccessful', ' partially successful' and/or of 'low quality,' auxiliary substrate transport 530 may route the post-stripping substrate (i.e. after the first stripping process) to the second stripping assembly 110B to undergoing the second stripping process (e.g. the 'fine' process). Auxiliary substrate transport 530 may also route the substrate to further manual processing (not shown) or mark it as rejected/to be disposed of.

The present application discloses a number of embodiments and features—all particular embodiments or features disclosed anywhere in the application (e.g. specification, drawings, claims) can be combined in all possible ways (and are hereby supported as such), even combinations that are not explicitly listed. The skilled artisan familiar with combinatorics would note that if Features A, B, C, D . . . are described in the application, the various combinations are: at least Feature A and B, at least Feature A and C . . . , at least Feature A, B and C, at least Feature A, B and D, and so on. All such combinations are hereby explicitly supported. Whenever a claim recites a 'method of previous claim(s) i.e. 'any preceding claim or only specific claim),' there is intended support for method "a method, system or apparatus of any other presently-presenting claim including preceding claims and later claims. Similarly, whenever a claim recites a 'system' or 'apparatus' of previous claim(s) i.e. 'any preceding claim or only specific claim),' there is intended support for method "a method, system or apparatus of any other presently-presenting claim including preceding claims and later claims.

The Applicant hereby gives notice that support exists for any combination of features even those which (for reasons of space, fees, PCT rules, etc) are not explicitly set-forth as-such. Furthermore, if features are described in two separate independent claims, it is noted that in some embodiments these features may be combined with each other.

The terms 'system,' 'device,' and 'apparatus' may be used interchangeably.

Whenever a 'system,' 'device,' or 'apparatus' is described, support is provided for any method of operating the 'system,' 'device,' or 'apparatus'. Whenever a method is described, support is provided for a suitable 'system,' 'device,' or 'apparatus' configured to perform the described method.

It is further noted that any of the embodiments described above may further include receiving, sending or storing instructions and/or data that implement the operations described above in conjunction with the figures upon a computer readable medium. Generally speaking, a computer readable medium (e.g. non-transitory medium) may include storage media or memory media such as magnetic or flash or optical media, e.g. disk or CD-ROM, volatile or non-volatile media such as RAM, ROM, etc.

Having thus described the foregoing exemplary embodiments it will be apparent to those skilled in the art that various equivalents, alterations, modifications, and improvements thereof are possible without departing from the scope and spirit of the claims as hereafter recited. In particular, different embodiments may include combinations of features other than those described herein. Accordingly, the claims are not limited to the foregoing discussion.

What is claimed is:

1. A system for additive manufacture, the system comprising:
   a. mechanized stripping apparatus configured to (i) receive pre-stripping substrate comprising substrate-waste portion(s) and substrate-retained portion(s) that are attached to each other and separated from one another by cut(s) within the substrate; and (ii) to transform the pre-stripping substrate into post-stripping substrate by selectively stripping away the substrate-waste portion(s) from the substrate-retained portion(s);
   b. a stacking station configured to add an object-layer of the post-stripping substrate to a stack of previously-stacked object-layers so as to grow the stack of object-layers;
   c. a substrate handling arrangement configured to: (i) transport previously-cut substrate to the mechanized stripping apparatus; and (ii) to transport post-stripping substrate from the mechanized stripping apparatus to the stacking station,
   wherein the mechanized stripping apparatus, the stacking station and the stacking handling arrangement are configured to repeat the stripping, the substrate-transporting and the adding to further grow the stack, and wherein the system further comprises a bonding device configured to bond the stacked object-layers to build a three-dimensional object therefrom, wherein (i) the substrate handling arrangement is adapted to horizontally support a flat, thin substrate so as to define a substrate-plane; and (ii) the stripping apparatus includes:
      I. at least one flexible and soft impact-element; and
      II. a rotation-drive positioned and configured to rotate the flexible and soft impact-element around a rotation-axis so as repeatedly drive a peripheral portion of the impact-element across the substrate-plane.

2. The system of claim 1 further comprising:
   a cutting station configured to form the cut(s) in the substrate to generate the prestripping substrate, wherein the substrate handling arrangement is configured to transport the pre-stripping substrate from the cutting station to the mechanized stripping apparatus.

3. The system of claim 1 wherein the bonding apparatus (i) applies at least one of pressure, UV radiation and heat and/or (ii) delivers an adhesive material and/or (iii) delivers at least one of a polymer adhesive, a water based adhesive and an epoxy adhesive and/or (iv) activates an adhesive material and/or (v) welds layers together and/or (vi) bonds layers together by sintering.

4. The system of claim 1 wherein the bonding apparatus comprises a heated roller.

5. The system of claim 1 wherein the stripping apparatus comprises (i) a group of flexible and soft impact-element(s) that are respectively and rotatably mounted to a respective rotation-axis; and (ii) a rotation-drive system configured to drive rotation of the flexible and soft impact-element(s) around the rotation-axis, the stripping apparatus defining a stripping-location thereunder, and (ii) the substrate handling arrangement is adapted to deliver substrate to the stripping location so that, at the stripping location, the substrate is maintained at a substrate plane, the stripping apparatus and the sheet-based substrate handling arrangement configured so that when substrate is located simultaneously at the stripping-location and the substrate-plane the rotation-drive system rotates the flexible and soft impact-element(s) so that they repeatedly collide with the substrate, thereby stripping away portion(s) of substrate.

6. The system of claim 5 wherein: i. the stripping apparatus is vertically movable so that (A) when the rotation axis is in a first and lower height-range, the rotating flexible and soft impact-element(s) reach the substrate plane at the stripping location and (B) when the rotation axis is in a second and higher height-range, the rotating flexible and soft impact-element(s) always remain above the substrate plane at the stripping location; ii. the stripping apparatus comprises a translation-drive system configured to raise and lower the stripping apparatus to respectively raise and lower the rotation-axis thereof to move the rotation axis back and forth between the first and second height-ranges; and iii. the substrate handling arrangement is adapted to deliver sheets of substrate to the stripping location, each sheet having a respective leading-edge and trailing edge; iv. the system further comprises a controller configured to regulate operation of the translation-drive system to:
  A. raise the stripping apparatus from the first height-range to the second height-range in response to a trailing edge of a first substrate-sheet exiting the stripping location; and
  B. subsequently, lower the stripping apparatus from the second height-range to the first height-range in response to a leading edge of a subsequent substrate-sheet reaching the stripping location.

7. The system of claim 1 further comprising:
an inspection system configured (i) to analyze a condition of post-stripping substrate and/or (ii) to detect an extent of stripping-error(s) in the post-stripping substrate.

8. The system of claim 7 further comprising: e. a stripping-apparatus-controller configured to update operating-parameter(s) of the stripping apparatus in response to the detected extent of stripping-errors.

9. The system of claim 7 wherein the operating-parameter(s) include at least one of a rotation-speed and an elevation of the rotation axis above the substrate plane at the stripping location.

10. The system of claim 1 further comprising:
an inspection system configured to detect an extent of stripping-error(s) in post-stripping substrate sheet(s) from which portion(s) of substrate have been stripped away by the stripping apparatus; and/or
a system-controller configured to regulate operation of the substrate handling arrangement and/or of the stacker, the system-controller being configured, in response to and in accordance with the detected extent of stripping-error(s) to as to prevent at least some post-stripping sheets from (i) being supplied the stacker and/or (ii) from being stacked by the stacker.

11. The system of claim 10 further comprising
a cutting station configured to form cut(s) in sheets of substrate according to a sequence of per-sheet cut-patterns, the substrate handling arrangement being adapted to deliver substrate the sheets including the cut(s) therein from the cutting station to the stripping location, wherein the system-controller further regulates behavior of the cutting station by updating the cutting sequence in response to detect an extent of stripping-error(s) in post-stripping substrate sheets.

12. The system of claim 11 wherein, in response to a higher extent-of-error(s) in post-stripping substrate sheet(s), the system-controller: i. prevents the post-stripping substrate sheet(s) having the higher extent-of-error(s) in post-stripping substrate sheet(s) from being supplied to or stacked by the stacker, and/or ii. causes the cutting station to return to an earlier location in the cutting sequence and to proceed to cut subsequent sheet(s) according to the sequence starting from the earlier location.

13. The system of claim 1 wherein the stripping apparatus is configured so that i. in the absence of rotational motion, for at least one configuration, the impact element sags under its own weight; and ii. rotation-drive sufficiently rotates impact-element so as to fully extent the impact element to eliminate the sag.

14. The system of claim 1 wherein the impact element are configured so that:
  i. when the impact element is stationary, for at least one orientation, the impact element sags under its own weight; and ii. centrifugal force of the rotating of the flexible and soft impact element(s) causes the impact element to fully extend so as to eliminate the sag.

15. The system for additive manufacture of claim 1 where each impact-element has both of the following properties: (i) both a width and a thickness thereof is at most 5 mm; and (ii) the impact-element is sufficiently elongate such that a ratio between a length of the impact element and a cross-section thereof is at least 10.

16. The system for additive manufacture of claim 1 where each impact-element has both of the following properties: (i) both a width and a thickness thereof is at most 5 mm; and (ii) the impact-element is sufficiently elongate such that a ratio between a length of the impact element and a cross-section thereof is at least 20.

17. The system for additive manufacture of claim 1 wherein: A. the impact element(s) are mounted to a shaft and/or rod; B. rotation of the shaft and/or rod around a central axis thereof causes the repeated driving of the peripheral portion of the impact element(s) across the substrate plane so as to strip away at least one portion of the substrate, and C. the impact element(s) are mounted to the shaft and/or rod so that for at least one given element: a base of the given impact element is located closer to a central axis of the shaft and/or rod than to a tip of the given impact element.

18. A system for additive manufacture, the system comprising:
  a. mechanized stripping apparatus configured to (i) receive pre-stripping substrate comprising substrate-waste portion(s) and substrate-retained portion(s) that are attached to each other and separated from one another by cut(s) within the substrate; and (ii) to transform the pre-stripping substrate into post-stripping substrate by selectively stripping away the substrate-waste portion(s) from the substrate-retained portion(s);
  b. a stacking station configured to add an object-layer of the post-stripping substrate to a stack of previously-stacked object-layers so as to grow the stack of object-layers;
  c. a substrate handling arrangement configured to: (i) transport previously-cut substrate to the mechanized stripping apparatus; and (ii) to transport post-stripping substrate from the mechanized stripping apparatus to the stacking station,
  wherein the mechanized stripping apparatus, the stacking station and the stacking handling arrangement are configured to repeat the stripping, the substrate-transporting and the adding to further grow the stack, and wherein the system further comprises a bonding device configured to bond the stacked object-layers to build a three-dimensional object therefrom wherein:
- (A) the mechanized stripping apparatus comprises first and second stripping assemblies, each stripping assembly including a respective group of flexible and soft impact-element(s) that are respectively and rotatably mounted to a respective rotation-axis, the first and second stripping assemblies respectively defining first and second stripping-locations thereunder;
- (B) the substrate handling arrangement adapted to (i) deliver substrate to the first stripping location so that substrate is maintained at a first substrate-plane when at the first stripping location; and (ii) subsequently deliver substrate from the first to the second stripping location so that the substrate is maintained at a second substrate-plane when located at the second stripping location; and
- (C) the system further comprises one or more drive system(s), the drive system(s) configured to respectively drive rotational motion, at first and second rotation-rates, of the flexible and soft impact-element(s) of the first and second stripping assemblies around their respective rotation-axes, wherein the stripping assemblies, substrate-handling system and drive-system(s) are configured so that i. rotation of the flexible and soft impact-element(s) of the first stripping assembly around a rotation axis thereof causes the flexible and soft impact-element(s) thereof to repeatedly reach the first substrate-plane to repeatedly collide with substrate simultaneously disposed at the first stripping location and at the first substrate-plane, thereby stripping away first portion(s) of the substrate; and ii. rotation of the flexible and/of soft impact-element(s) of the second stripping assembly around a rotation axis thereof causes the flexible and soft impact-element(s) thereof to repeatedly reach the second substrate-plane to repeatedly collide with substrate simultaneously disposed at the second stripping location and at the second substrate-plane, thereby stripping away second portion(s) of the substrate after the first portion(s) have been stripped away, wherein the drive system(s) operates so that the second rotation-rate exceeds the first rotation rate.

19. The system of claim 18 wherein a ratio between the second and first rotation rates is at least 1.1.

20. The system of claim 18 further comprising:
- d. an inspection system configured to analyze post-stripping substrate to detect stripping error(s); and/or
- e. a controller configured to control substrate handling arrangement so that the delivery of substrate from the first to the second stripping location is conditional upon a level of the stripping error(s) exceeding a error-threshold.

* * * * *